United States Patent [19]
Hanzawa et al.

[11] Patent Number: 5,764,433
[45] Date of Patent: Jun. 9, 1998

[54] SHORT-SIDE-LOADING TAPE CASSETTE RECORDING AND/OR REPRODUCING APPARATUS

[75] Inventors: Hisashi Hanzawa, Tokyo; Yasuhiro Yamaguchi, Kanagawa, both of Japan

[73] Assignee: Sony Corporation, Tokyo, Japan

[21] Appl. No.: 569,203

[22] PCT Filed: May 22, 1995

[86] PCT No.: PCT/JP95/00978

§ 371 Date: Jan. 16, 1996

§ 102(e) Date: Jan. 16, 1996

[87] PCT Pub. No.: WO95/32501

PCT Pub. Date: Nov. 30, 1995

[30] Foreign Application Priority Data

May 20, 1994 [JP] Japan ................................. 6-189087

[51] Int. Cl.$^6$ .......................... G11B 15/675; G11B 5/54
[52] U.S. Cl. .......................... 360/96.6; 360/93; 360/105
[58] Field of Search ..................... 360/93, 96.1, 96.5, 360/96.6, 105

[56] References Cited

U.S. PATENT DOCUMENTS

| | | | |
|---|---|---|---|
| 3,913,136 | 10/1975 | Kelch et al. | 360/96.6 |
| 4,188,647 | 2/1980 | Tanaka | 360/96.6 |
| 4,208,681 | 6/1980 | Hatchett | 360/96.6 |
| 4,335,409 | 6/1982 | Yokota et al. | 360/96.6 |
| 4,374,401 | 2/1983 | Takai | 360/96.6 |
| 4,405,962 | 9/1983 | Haruta | 360/96.6 |
| 4,649,453 | 3/1987 | Iwasawa | 360/137 |
| 4,739,423 | 4/1988 | Ida | 360/93 |
| 4,802,037 | 1/1989 | Tanaka et al. | 360/93 |
| 5,055,954 | 10/1991 | Kato | 360/96.5 |
| 5,067,036 | 11/1991 | Ozawa | 360/96.5 |
| 5,097,367 | 3/1992 | Ida et al. | 360/96.6 |
| 5,432,660 | 7/1995 | Kono et al. | 360/96.6 |
| 5,434,727 | 7/1995 | Kage et al. | 360/96.6 |

FOREIGN PATENT DOCUMENTS

| | | | |
|---|---|---|---|
| 0367190 | 5/1990 | European Pat. Off. | |
| 52-55614 | 5/1977 | Japan | 360/96.6 |
| 1-300462 | 12/1989 | Japan | 360/96.6 |
| 4-146557 | 5/1992 | Japan | 360/96.6 |

*Primary Examiner*—Jefferson Evans
*Attorney, Agent, or Firm*—Jay H. Maioli

[57] ABSTRACT

A tape cassette recording and/or reproducing apparatus using, as a recording medium, a tape cassette having a rectangular plane surface shape includes a body formed to have a rectangular plane surface shape, a recording and/or reproducing unit provided in the body and including a magnetic head for recording and/or reproducing information signals to/from a magnetic tape contained within the tape cassette, and a cassette holding mechanism including a cassette holder into which the tape cassette is inserted with one of a pair of opposing short sides being the front end in the insertion direction thereof. The cassette holding mechanism is disposed with a short side of the body being a supporting end, and is pivotably supported between a position where the inserted tape cassette is fully loaded into the recording and/or reproducing unit and a position where the tape cassette inserted into the cassette holding mechanism is away or detached from the recording and/or reproducing unit. The cassette holding mechanism is adapted so that when the recording and/or reproducing unit is in the recording and/or reproducing mode, ejection of the tape cassette is prohibited. The cassette holding mechanism is provided with a cassette movement operation mechanism for ejecting the tape cassette when the tape cassette is moved to a position that is away or detached from the recording and/or reproducing unit.

23 Claims, 25 Drawing Sheets

1

SHORT-SIDE-LOADING TAPE CASSETTE RECORDING AND/OR REPRODUCING APPARATUS

This application was filed under 35 U.S.C. 371 and is a national stage filing based upon PCT/JP95/00978 filed May 22, 1995.

TECHNICAL FIELD

This invention relates to a recording and/or reproducing apparatus using a tape cassette as a recording medium. More particularly, this invention relates to a recording and/or reproducing apparatus such as a tape recorder, for example, in which a cassette holding mechanism is pivotably disposed, the apparatus including therein a recording and/or reproducing unit adapted for carrying out recording and/or reproduction of information signals with respect to a recording medium such as a magnetic tape, for example, accommodated within the tape cassette, the apparatus shaped to resemble a thin box with a planar rectangular surface to allow the cassette holding mechanism to hold the tape cassette to load (mount) the tape cassette into the recording and/or reproducing unit.

BACKGROUND ART

Hitherto, tape recorders using a tape cassette within which a recording medium such as a magnetic tape, for example, for recording information signals have been widely used. In such tape recorders, a cassette holder adapted so that a tape cassette is inserted thereinto and is held thereby (hereinafter simply referred to as "insertion-held" depending upon circumstances) pivotably disposed in the recorder body which also includes a recording/reproducing unit for carrying out recording/reproduction of information signals with respect to the magnetic tape accommodated within the tape cassette is provided. Thus, the tape cassette is insertion-held by the cassette holder and the cassette holder is pivotted to the recording/reproducing unit side disposed at the recorder body side, whereby the tape cassette is loaded (mounted) at a cassette loading portion constituted at the upper surface side of the recording/reproducing unit.

At the cassette loading portion, there are disposed a pair of reel drive shafts which are relatively engaged with a pair of tape reels on which a magnetic tape rotatably accommodated within the tape cassette is wound, a tape feed mechanism consisting of a capstan shaft and a pinch roller for moving the magnetic tape at a constant velocity, and a magnetic head for recording/reproducing information signals such as music signals, for example, with respect to the magnetic tape fed by the tape feed mechanism.

In this tape recorder, when the tape cassette is loaded into the cassette loading portion of the recording/reproducing unit, the reel drive shafts are engaged with the tape reels of the tape cassette side to rotationally operate the tape reels, and to allow the pinch roller to be in pressure-contact with the capstan shaft to move, at a constant velocity, the magnetic tape accommodated within the tape cassette to further allow the magnetic head to be in sliding contact with the magnetic tape so that recording/reproduction of information signals can be carried out.

The size of tape recorders have been miniaturized down to dimensions substantially equal to the outside shape of the tape cassette.

In the tape recorders of the kind conventionally used, the cassette holder for loading (mounting) the tape cassette into the cassette loading portion is of a structure that the tape cassette is inserted with one side of two opposing long sides being an insertion end. Namely, insertion/withdrawal (removal) of the tape cassette with respect to the cassette holder is carried out with the tape cassette being laterally disposed in such a manner that the lengthwise portion serves as the insertion end.

This is because since the tape cassette has an opening for facing a portion of the magnetic tape toward the external is formed at a side surface along one side of the two opposing long sides, the recording/reproducing unit of the tape recorder is constituted so that the magnetic head is advanced and withdrawn with respect to the exposed portion of the magnetic tape where the opening faces the magnetic head.

Further, in tape recorders adapted so that insertion/withdrawal of the tape cassette is carried out in the state where the tape cassette is laterally disposed with respect to the cassette holder, insertion/withdrawal of the tape cassette is carried out with respect to the cassette holder with the opposing short sides being held (grasped). In addition, since insertion/withdrawal of the tape cassette with respect to the cassette holder is carried out in the state where the tape cassette is laterally disposed, the user grasping area is small. From actual circumstances, there are instances where an operation for holding the tape cassette to carry out insertion/withdrawal thereof with respect to the cassette holder becomes difficult, and it thus becomes difficult to securely load the tape cassette into the cassette loading portion.

DISCLOSURE OF THE INVENTION

In view of the above, an object of this invention is to provide a novel recording and/or reproducing apparatus which eliminates problems associated with associated with the tape cassette being laterally disposed in such a manner that a lengthwise portion is caused to be an insertion end, thus making it possible to easily carry out insertion/withdrawal of the tape cassette.

Another object of this invention is to provide a recording and/or reproducing apparatus which can securely load the tape cassette at the loading position within the apparatus body.

A further object of this invention is to provide a recording and/or reproducing apparatus adapted for allowing the head for carrying out recording and/or reproduction of information signals to be moved close to the tape cassette or away therefrom in a insertion/withdrawal operation of the tape cassette to thereby realize protection of the head.

A still further object of this invention is to provide a recording and/or reproducing apparatus adapted so that insertion/withdrawal of the tape cassette is prevented from being erroneously carried out during recording and/or reproducing of information signals so that protection of the tape cassette and the head or other mechanical parts constituting the recording and/or reproducing means of the recording and/or reproducing apparatus can be securely conducted.

A still more further object of this invention is to provide a recording and/or reproducing apparatus adapted so that after the tape cassette is loaded into a cassette loading portion, or after the tape cassette is caused to be away (detached) from the cassette loading portion, movement operation of a head is carried out to thereby realize protection of a tape-shaped recording medium such as a magnetic tape, for example, accommodated within, with tape cassette and the head constituting the recording and/or reproducing means.

In order to attain the objects as described above, a recording and/or reproducing apparatus according to this invention comprises a body formed to have a rectangular plane surface a recording and/or reproducing unit provided within the body and including a head such as a magnetic head, for example, for carrying out recording and/or reproduction of information signals with respect to a tape-shaped recording medium such as a magnetic tape, for example, disposed within a tape cassette, and a cassette holding mechanism like a cassette holder into which the tape cassette is inserted such that the rectangular plane surface is inserted with one side of a pair of opposing short sides being a front end in the insertion direction thereof. More specifically, the cassette holding mechanism is disposed such that a short side of the body is a pivoting end, and is pivotably supported by the body for extending between a position where the tape cassette inserted into the cassette holding mechanism is loaded into the recording and/or reproducing unit and a position where the tape cassette inserted into the cassette holding mechanism is caused to be away (detached) from the recording and/or reproducing unit.

Moreover, the recording and/or reproducing unit of the recording and/or reproducing apparatus according to this invention comprises a head adapted for carrying out recording and reproduction of information signals with respect to the tape-shaped recording medium of the tape cassette and provided so that it is movable between the position where the tape cassette is inserted into the cassette holding mechanism and the position where the tape cassette is caused to be away (detached) from the cassette holding mechanism. Further, the recording and/or reproducing unit includes a movement mechanism such that when the cassette holding mechanism moves from the position where it loads the tape cassette into the recording and/or reproducing unit to the position where it allows the tape cassette to be away (detached) therefrom, the movement mechanism moves the head from the loading position of the tape cassette to the detachment position thereof, that is, the position where tape cassette is away (detached) therefrom.

Further, the cassette holding mechanism comprises a cassette holder provided with a first holding portion for holding one long side of a pair of opposing long sides of the tape cassette, and a second holding portion for holding the other long side at a position where insertion of the tape cassette has been completed, and adapted for holding the tape cassette inserted into the cassette holding mechanism, and a cover body disposed at the short side where the cassette holding mechanism is provided on the body and pivotted along with the cassette holder between a cover opening position where the recording and/or reproducing unit is uncovered and a cover closing position where the recording and/or reproducing means is covered.

Furthermore, the recording and/or reproducing apparatus according to this invention comprises an operation mechanism for allowing the cover body to undergo movement operation to the cover opening position of the recording and/or reproducing unit, whereby when the operation mechanism is operated, the movement mechanism which carries out movement operation of the head moves the head from the loading position side of the tape cassette to the detachment position, or the position where the tape cassette is away or detached therefrom.

Moreover, when the cover body is located at the position where it covers the recording and/or reproducing unit, the cover body is locked by a lock mechanism. In addition, when locking of the cover body by the lock mechanism is released, the head is caused to be away from the loading position of the tape cassette by the head movement mechanism.

Further, the recording and/or reproducing apparatus of this invention is adapted so that when the recording and/or reproducing unit is in the state where it permits recording and/or reproduction of information signals with respect to the tape-shaped recording medium within the tape cassette, operation for releasing of the locked state of the cover body by the lock mechanism is prevented (blocked).

Furthermore, the cassette holding mechanism includes a cassette movement operation mechanism such that when the cassette holding mechanism is subjected to movement operation by insertion operation of the tape cassette so that it is moved to the position away from the recording and/or reproducing unit, the cassette movement operation mechanism carries out movement operation of the tape cassette held by the cassette holding mechanism in a direction to eject the tape cassette from the cassette holding mechanism.

This cassette movement operation mechanism is movably provided on the cassette holding mechanism, and comprises a movement portion subjected to movement operation by the tape cassette inserted into the cassette holding mechanism, a biasing member for biasing the movement portion in a direction to eject the tape cassette from the cassette holding mechanism, and a lock portion for locking the movement portion at the position where insertion of the tape cassette into the cassette holding mechanism is completed. In addition, when the cassette holding mechanism is moved the position for inserting the tape cassette into the recording and/or reproducing unit, the lock portion releases the locked state of the movement portion.

Furthermore, a recording and/or reproducing apparatus according to this invention comprises a body within which a tape-shaped recording medium is accommodated such that the principal surface of the body has substantially the same shape as the plane surface shape of a tape cassette having a pair of reels on which the tape-shaped recording medium is wound, a recording and/or reproducing unit provided with a pair of reel drive shafts engaged with the pair of reels within the cassette and adapted for carrying out recording and/or reproduction of information signals with respect to the tape-shaped recording medium within the tape cassette, in which the pair of reel drive shafts are disposed in the body so that they are projected from the principal surface of the body, and a cassette holder into which the tape cassette is inserted with one of a pair of short sides of the tape cassette being the front end in the insertion direction thereof. The cassette holder is pivotably supported with one of the short sides of the body serving as the pivoting end, and is pivotted between a first position where the pair of reels of the tape cassette inserted into the cassette holder are respectively engaged with the pair of reel drive shafts, and a second position where engagement with respect to the pair of reel drive shafts and the pair of reels is released.

The recording and/or reproducing apparatus further comprises a cover body disposed at the side of short side where the cassette holder is provided on the body. When the cassette holder is located at the first position where it allows the pair of reels of the tape cassette to be respectively engaged with the pair of reel drive shafts, the cover body covers the principal surface where the recording and/or reproducing unit is disposed in the body, and is pivotted along with the cassette holder.

Further, in the recording and/or reproducing apparatus, an opening/closing mechanism to which the cover body is attached so that it can be opened and closed is provided. In addition, the cover body is attached to a hing portion of the opening/closing mechanism and the cassette holder.

Furthermore, the recording and/or reproducing apparatus is provided with a biasing member for biasing the tape cassette held by the cassette holder toward the recording and/or reproducing unit side. This biasing means is provided at a back side of the cover body and is adapted to bias the tape cassette held by the cassette holder through an opening portion formed in the cassette holder.

Furthermore, a recording and/or reproducing apparatus according to this invention is adapted for use with a rectangular tape cassette within which a tape-shaped recording medium is accommodated. The tape cassette includes a pair of reels on which the tape-shaped recording medium is wound, and an opening portion for allowing a portion of the tape-shaped recording medium wound between the pair of reels to face externally is formed at a side surface thereof. This recording and/or reproducing apparatus comprises a body in which a principal surface thereof is formed so as to have substantially the same shape as a plane surface shape of the tape cassette, a recording and/or reproducing unit including pair of reel drive shafts respectively engaged with a pair of reels within the tape cassette disposed within the body so as to project from the principal surface of the body, a head disposed at a long side of the body adapted so that it engages the tape cassette through the opening portion of the tape cassette, and a cassette holder into which the tape cassette is inserted with one of a pair of opposing short sides being the front end in the insertion direction thereof. This cassette holder is disposed at a short side of the body so that it can be pivotted between a first position where the pair of reels of the inserted tape cassette and the pair of reel drive shafts are respectively engaged with each other and the magnetic head is permitted to engage the tape cassette through the opening portion of the tape cassette and a second position where engagement with respect to the pair of reel drive shafts and the pair of reels of the tape cassette inserted into the cassette holder is released.

Furthermore, a recording and/or reproducing apparatus according to this invention comprises: a body having a plane surface with a rectangular shape, a recording and/or reproducing unit for carrying out recording and/or reproduction of information signals with respect to a tape-shaped recording medium contained within a tape cassette; a cassette holding mechanism into which the tape cassette is inserted with one of a pair of opposing short sides of the tape cassett being the front end in the insertion direction thereof, and disposed at a short side of the body so that it can be pivotted between a position where the inserted tape cassette is loaded into the recording and/or reproducing unit and a position where the inserted tape cassette is caused to be away or detached from the recording and/or reproducing unit; and a cassette movement operation mechanism that is caused to undergo movement operation by insertion operation of the tape cassette such that when the cassette holding mechanism is moved from the position where the tape cassette is loaded into the recording and/or reproducing unit to the position where the tape cassette is caused to be away or detached from the recording and/or reproducing unit, the cassette movement operation mechanism allows the tape cassette held by the cassette holding mechanism to move in a direction to eject the tape cassette from the cassette holding mechanism. This cassette movement operation mechanism is provided in the cassette holding mechanism.

Moreover, the cassette movement operation mechanism comprises a movement portion movably provided in the cassette holding mechanism and caused to undergo movement operation by the tape cassette inserted into the cassette holding mechanism, a biasing member for biasing the movement portion in a direction to eject the tape cassette from the cassette holding mechanism, and a lock portion for locking the movement portion at the position where insertion of the tape cassette into the cassette holding mechanism is completed. When the cassette holding mechanism is moved to the position for inserting the tape cassette into the recording and/or reproducing unit, the locked portion releases lock state of the movement portion.

Furthermore, a recording and/or reproducing apparatus according to this invention comprises: a body formed to have a plane surface with a rectangular shape; a recording and/or reproducing unit provided in the body for carrying out recording and/or reproduction of information signals with respect to a tape-shaped recording medium contained within a tape cassette; a cassette holding mechanism into which the tape cassette is inserted with one of a pair of opposing short sides of the tape cassette being the front end in the insertion direction thereof, and disposed at a short of the body so that it can be pivotted between a position where the inserted tape cassette is loaded into the recording and/or reproducing unit and a position where the inserted tape cassette is away or detached from the recording and/or reproducing unit; a cover body disposed at the short side of short sides where the cassette holding mechanism is provided of, and pivotted along with the cassette holding mechanism between a cover opening position where the recording and/or reproducing unit is uncovered and a cover closing position where the recording and/or reproducing unit is covered; and a lock mechanism provided with a pressing operation portion and disposed at another of the short sides of the body to lock the cover body at the cover closing position, and to release the locked state of the cover body by pressing operation of the pressing operation portion.

BEST MODE FOR CARRYING OUT THE INVENTION

A more practical embodiment of this invention will now be described with reference to the attached drawings.

In the embodiment disclosed below, this invention is applied to a tape recorder which is a recording/reproducing apparatus using a tape cassette within which a tape-shaped magnetic tape recording medium for information signals is accommodated.

[1] Tape Cassette

The tape cassette used in the tape recorder of this embodiment will now be described. This tape cassette 201 is a tape cassette of the standard size and is of so called Phillips type.

Figure 1:
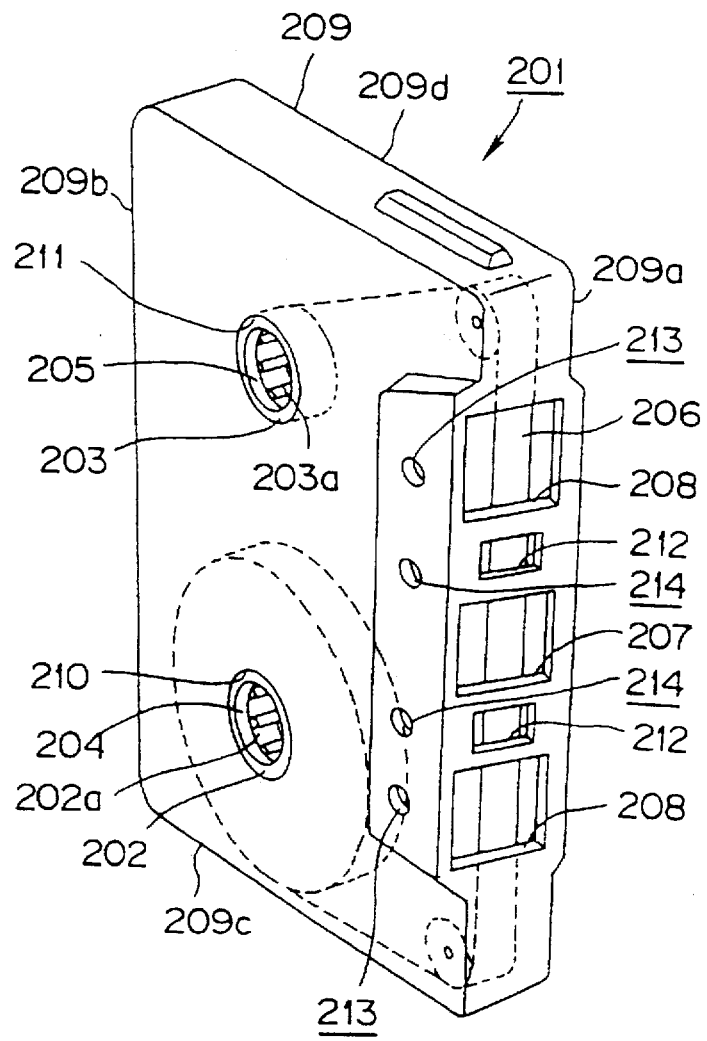
FIG. 1 is a perspective view showing a tape cassette used as a recording medium of a tape recorder according to this invention.

This tape cassette 201 is provided, as shown in FIG. 1, with a cassette case 209 formed so as to have a thin box shape such that the plane surface shape is rectangular. A pair of tape reels 202, 203 are rotatably supported within the cassette case 209. A magnetic tape 206 is wound between these tape reels 202, 203. At a front surface side along one long side 209a of a pair of opposing long sides 209a, 209b of the cassette case 209, a magnetic head insertion hole 207 and a pinch roller insertion hole 208 are opened. Further, the portion of the magnetic tape 206 extending between the pair of tape reels 202, 203 and accommodated within the cassette case 209 faces externally from the cassette case 209 through the magnetic head insertion hole 207 and the pinch roller insertion hole 208.

Moreover, at the plane surface portion of the cassette case 209, a pair of reel shaft insertion holes 210, 211 which allow reel hubs 202a, 203a formed at the central portions of the pair of tape reels 202, 203 to face externally are opened.

[2] Tape Recorder

The tape recorder of this embodiment using the tape cassette 201 shown in FIG. 1 as a recording medium is constituted as a thin parallelapiped in which the plane surface shape is rectangular as shown in FIGS. 2 to 5 in correspondence with the plane surface shape of the tape cassette 201 loaded thereinto. This tape recorder comprises a recorder body 1 in which a cassette loading portion 4 into which the tape cassette 201 is loaded is constituted, and a recording/reproducing unit adapted so that it allows the magnetic tape 206 contained within the tape cassette 201 loaded into the cassette loading portion 4 to undergo traveling operation and a magnetic head for carrying out recording/reproduction of information signals with respect to the magnetic tape 206 is disposed; and a cover body 5 pivotably supported at the recorder body 1.

Figure 6:
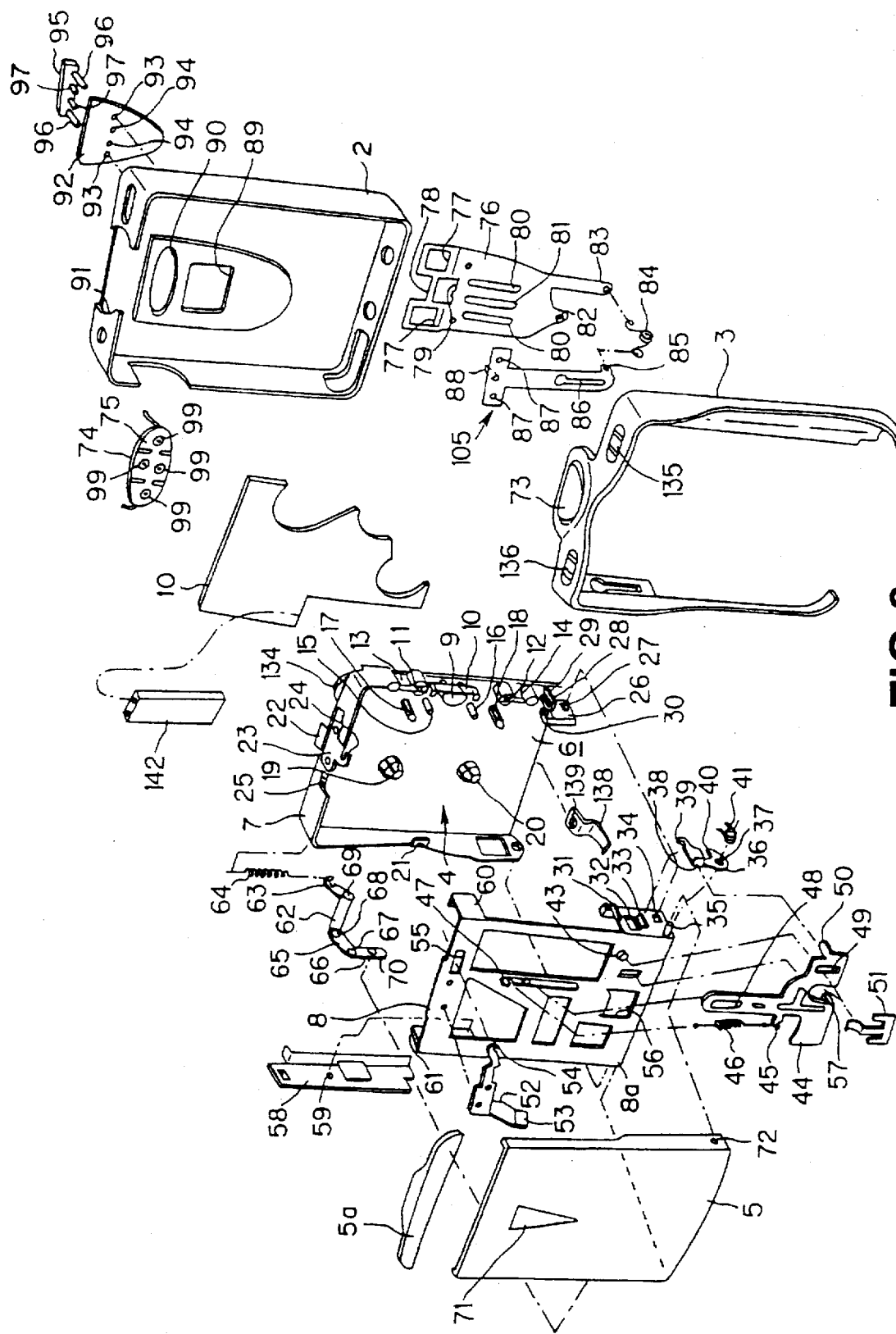
FIG. 6 is an exploded perspective view showing the tape recorder according to this invention.

The recorder body 1 is composed of a housing 2 in which a mechanical portion such as tape traveling mechanism, for example, for allowing the magnetic tape 206 to undergo traveling operation is disposed, and an outer frame 3, having a channel (or U)-shape, disposed so that it fits over (with respect to) the outer circumferential side of the housing 2. The housing 2 constituting the recorder body 1 is formed by punch-bending a thin metal plate, and is formed so as to have a box shape with a rectangular plane surface shape substantially corresponding to the plane surface shape of the tape cassette 201 loaded into the tape recorder. Moreover, the outer frame 3 is formed by molding synthetic resin, and is formed to have channel-(or U)shaped, as shown in FIG. 6, so that it fits over (with respect to) the outer circumferential side extending over a pair of opposing long sides and straddling from one side of a pair of opposing short sides of the housing 2 which takes rectangular shape.

The cover body 5 is pivotably supported and attached at a portion of the recorder body 1 so as to open/close a principal surface side of the housing 2 constituting the recorder body 1. Namely, the cover body 5 is formed so as to have dimensions sufficient to cover the cassette loading portion 4 constituted at the opened principal surface side of the housing 2, and is formed to take a rectangular shape substantially corresponding to the plane surface shape of the tape cassette 201 loaded into the cassette loading portion 4. Moreover, the cover body 5 is supported by a hinge portion constituted by rotational (rotary) shaft 45 which will be described later provided at one short side of a pair of opposing short sides of the recorder body 1. Thus, the cover body 5 is caused to undergo pivot operation in directions indicated by arrows A1 and A2 in FIG. 3 about the hinge portion to open and close the cassette loading portion 4.

Within the housing 2 constituting the recorder body 1, there is disposed a chassis 6 in which there are constituted a tape traveling mechanism for traveling, at a constant velocity, the magnetic tape 206 accommodated within the tape cassette 201 loaded into the cassette loading portion 4, and a mechanism section constituting a recording/reproducing unit such as a magnetic head for carrying out recording/reproduction of information signals in slide contact with the traveling magnetic tape 206. This chassis 6 is formed by punching a thin metal plate to bend a portion thereof.

At one principal surface side of the chassis 6 disposed within the housing 2, the cassette loading portion 4 into which the tape cassette 201 is loaded is constituted. At the cassette loading portion 4, there are disposed a pair of positioning pins 15, 16 for carrying out positioning of the tape cassette 201 to load it thereinto, a magnetic head 9 for carrying out recording/reproduction of information signals with respect to the magnetic tape 206 in slide contact with the magnetic tape 206 accommodated within the tape cassette 201 loaded into the loading portion 4, a pair of first and second capstan shafts 17, 18 and a pair of first and second pinch rollers 11, 12 for allowing the magnetic tape 206 accommodated within the tape cassette 201 to travel at a constant velocity the magnetic tape 206 put therebetween, and a pair of reel drive shafts 19, 20 engaged with reel housings 202a, 203a of the tape reels 202, 203 within the tape cassette 201 to allow these tape reels 202, 203 to undergo rotational operation.

A pair of positioning pins 15, 16 are vertically provided so as to project toward one principal surface side of the chassis 6, and are respectively engaged with a pair of positioning holes 214, 214 provided in the cassette case 209, thereby carrying out positioning of the loading position of the tape cassette 201 loaded into the cassette loading portion 4. Moreover, first and second capstan shafts 17, 18 are rotatably attached at the chassis 6, and are caused to undergo rotational operation at a constant rotational velocity by a drive motor disposed at the other principal surface side of the chassis 6. It is to be noted that rotational directions of the first and second capstan shafts 17, 18 are opposite to each other. These capstan shafts 17, 18 face the backward side of the magnetic tape 206 traveling within the cassette case 209 through a pair of capstan shaft insertion holes 213, 213 provided in the cassette case 209. Further, respective pinch rollers 11, 12 are disposed on the chassis 6 and are rotatably are supported, and they can be moved in a direction away from respective capstan shafts 17, 18. These pinch rollers 11, 12 are admitted into the cassette case 209 through respective pinch roller insertion holes 208, 208 formed at the front surface side of the cassette case 209. Thus, the pinch rollers 11, 12 with the magnetic tape 206 located therebetween in cooperation with respective capstan shafts 17, 18 allow the magnetic tape 206 to travel at a constant velocity. Furthermore, the magnetic head 9 is admitted into the cassette case 209 through a magnetic head insertion hole 207 formed at the front surface side of the cassette case 209 to come into slide contact with the magnetic tape 206 to carry out recording or reproduction of information signals on the magnetic tape 206.

Figure 3:
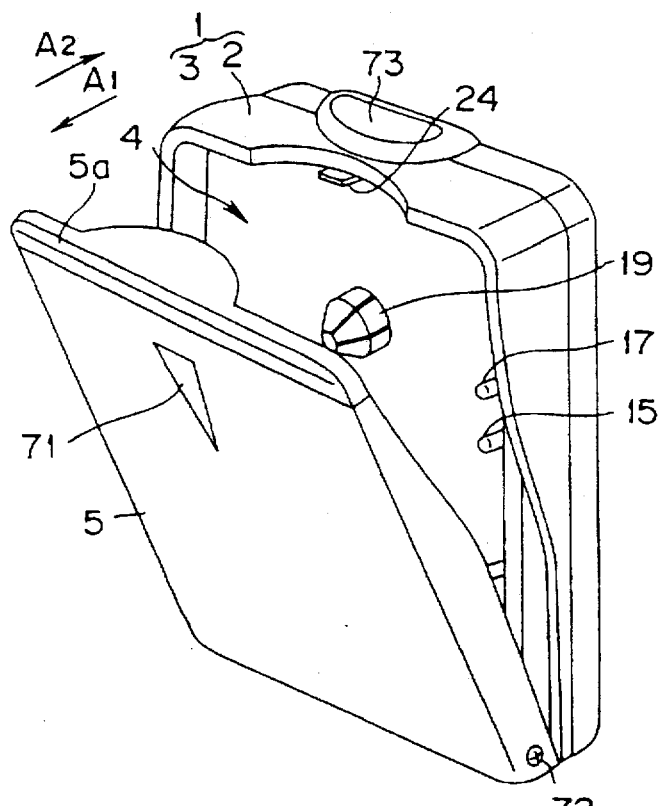
FIG. 3 is a perspective view showing the state where the cover body of the tape recorder shown in FIG. 2 is opened.

At the inside surface opposite to the cassette loading portion 4 of the cover body 5 pivotably supported by the recorder body 1, a cassette holder 8 having a principal surface 8a which has a rectangular shape substantially corresponding to the plane surface shape of the tape cassette 201 is disposed in an overlapping manner. When the cover body 5 is placed, as shown in FIG. 3, in a state where it is pivotted to a position where the cassette loading portion 4 is opened, the tape cassette 201 is inserted into the cassette holder 8 from one of the short sides of the tape cassette 201 when the cover plate 5 is pivotted away from the cassette loading portion 4. Namely, the tape cassette 201 is inserted into the cassette holder 8 with one short side 209c of opposing a pair of short sides 209c, 209d being the insertion end. When the cassette holder 8 into which the tape cassette 201 is inserted is pivotted to close the cassette loading portion 4, it engages positioning pins 15, 16 with positioning holes 214, 214 of the tape cassette 201 to allow the tape cassette 201 to undergo positioning so that it is in proper correspondence with the cassette loading portion 4.

Moreover, as shown in FIG. 6, a side plate 7 which has a substantially channel shape is attached to the peripheral edge of the chassis 6 so as to surround the principal surface of the chassis 6, and an outer frame 3 is attached to the outer circumferential surface of the side plate 7 in a manner to overlap therewith. Further, the housing 2 is disposed so as to fit a rising peripheral wall 2a formed at the peripheral edge into a portion of the outer frame 3, and is attached so that the rising peripheral wall 2a is fixed to the side plate 7 by a set screw, for exaple.

At the plane surface positioned at the housing 2 side which is the other principal surface side opposite to the principle surface where the cassette loading portion 4 is constituted in the chassis 6, there is disposed an electronic circuit board 10 on which a control circuit section for carrying out setting of respective operation modes of the tape recorder, for example, to control traveling of the magnetic tape 206 is constituted (provided).

[3] Operation Button

At the outside surface side opposite to the side where the cassette loading portion 4 is constituted of the housing 2, an operation (push) button 74 constituting an operation section for selecting the operation mode of the tape recorder is disposed. This operation button 74 is faced externally from the housing 2 through an opening portion 90. This operation button 74 is provided with four pressing portions respectively corresponding to constant speed (velocity) traveling mode (Play) for traveling the magnetic tape 206 at constant speed (velocity) in the forward direction or in the reverse direction, stop mode (Stop), fast feed mode (FF) and rewinding mode (Rew). These pressing portions are opposite to sheet switches provided on the electronic circuit board 10 disposed on the chassis 6 as shown in FIG. 6. By allowing any one of pressing portions corresponding to respective operation modes of the operation button 74 to undergo pressing operation, the sheet switch is subjected to pressing operation. Thus, the operation mode corresponding to the pressing portion is selected.

Figure 4:
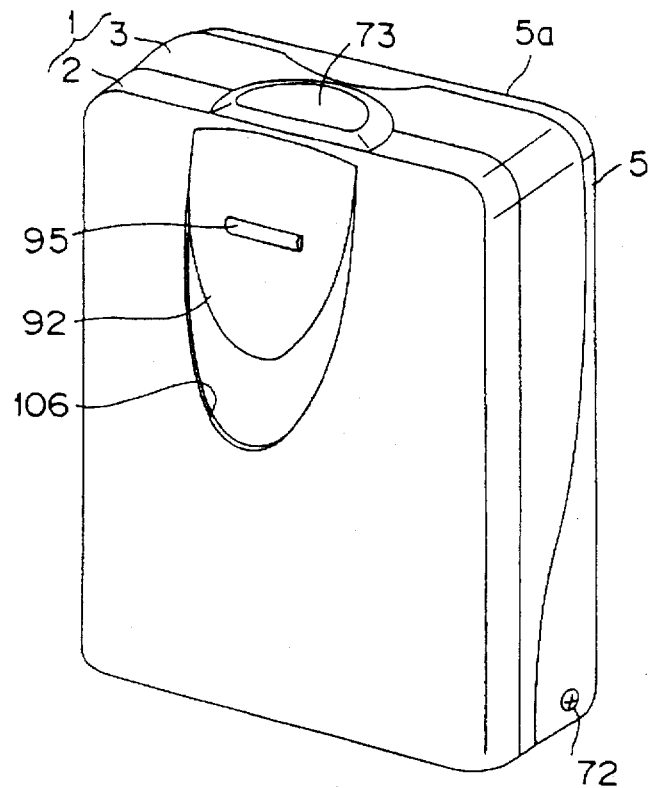
FIG. 4 is a perspective view of the tape recorder according to this invention from the side where operation button is disposed.
Figure 5:
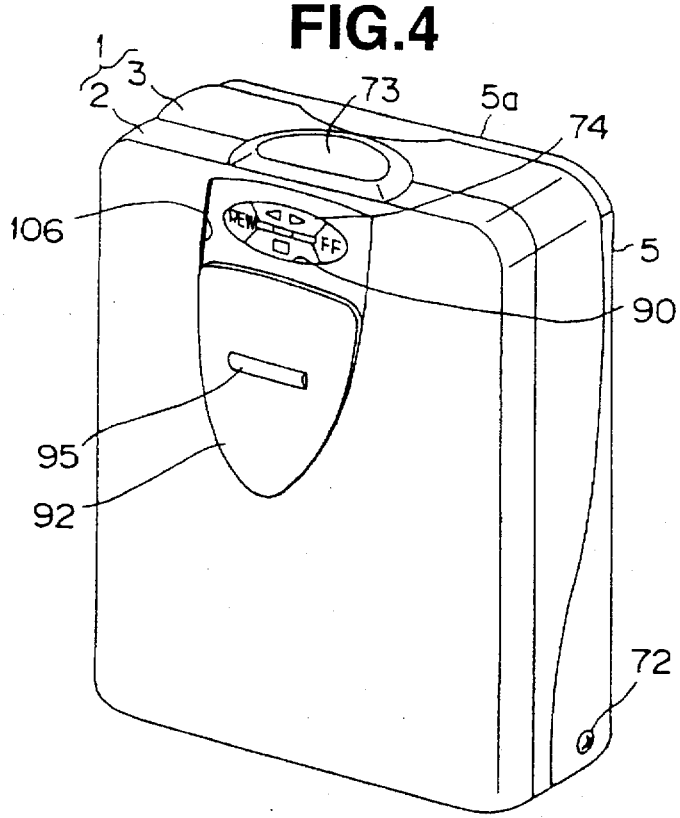
FIG. 5 is a perspective view showing the state where the operation button covered by chassis plate is faced.

Moreover, the operation button 74 is covered, as shown in FIGS. 4 and 5, by a shutter plate 92 slidably attached to the housing 2. This shutter plate 92 is formed of a metal plate, and is slidably disposed at the outer side surface of the housing 2. In this example, the shutter plate 92 is disposed within a recessed portion 106 provided at the outer side surface of the housing so as to become flush with the outer side surface of the housing 2. Thus, the shutter plate 92 is caused to undergo slide operation within the range of the recessed portion 106 to open or close the operation button 74.

Meanwhile, a connection member 95 provided with a pair of connection pins 96, 96 and a pair of attachment pins 97, 97 integrally formed is attached to the shutter plate 92. This connection member 95 is attached to the shutter plate 92 by inserting respective attachment pins 97, 97 into a pair of attachment holes 94, 94 provided in the shutter plate 92 to caulk the front end sides of these attachment pins 97, 97. Moreover, the connection member 95 respectively insert the connection pins 96, 96 into a pair of through-holes 93, 93 bored in the shutter plate 92. Respective connection pins 96, 96 are projected into the housing 2 through an opening portion 89 formed in the housing 2. A slide guide plate 76 is attached to the inner side surface of the housing 2 in correspondence with the opening portion 89. At the slide guide plate 76, a pair of elongated grooves 80, 80 and a slide guide groove 81 are bored. The connection pins 96, 96 are respectively inserted into the elongated grooves 80, 80, and are projected inwardly into the housing 2 through the slide guide plate 76.

At one end side of the slide guide plate 76, the operation button 74 is attached. This operation button 74 is attached toward one end of the slide guide plate 76 through a leaf spring 75 attached to the inside of the housing 2. This leaf spring 75 is attached to the inside surface of the housing 2 opposite to the slide guide plate 76, and is pressure-supported at the inside surface of the housing 2 by the slide guide plate 76. Moreover, at the leaf spring 75, a plurality of through holes 99 are bored in correspondence with respective pressing portions of the operation button 74. These through holes 99 serve to project respective pressing portions of the operation button 74 internally into the housing 2. Further, through holes 77, 77, 79 and a cut portion 78 are formed toward one end of the slide guide plate 76. These through holes 77, 77, 79 and cut portion 78 serve to project respective pressing portions of the operation button 74 facing the through holes 99 bored in the leaf spring 75 internally into the housing 2.

Further, projections are formed at the back side of respective pressing portions of the operation button 74. These projections serve to allow the sheet switches disposed on the electronic circuit board 10 to undergo pressing operation when respective pressing portions of the operation button 74 are caused to undergo pressing operation.

Toward the front end of respective connection pins 96, 96 of the connection member 95, a supportin metal plate 105 having a flat plate shape with attachment holes 87, 87 bored by punching the metal plate is attached. This supporting plate 105 is attached to the connection member 95 by respectively inserting connection pins 96, 96 into attachment holes 87, 87 to caulk the front end of these connection pins 96, 96.

At the supporting plate 105, a guide pin 88 is projected internally into the housing 2 and is positioned between respective attachment holes 87, 87. This guide pin 88 is inserted from inside of the housing 2 into the slide guide groove 81.

Moreover, at the supporting plate 105, a guide groove 86 is bored in parallel with the slide guide groove 81. A guide pin 82 projected internally into the housing 2 at the other end of the slide guide plate 76 is insertion-engaged with the guide groove 86.

The shutter plate 92 is slidably supported with respect to the housing 2 and guided by the slide guide groove 81 and the guide groove 86. This shutter plate 92 is caused to undergo slide operation extending between the position where it covers the operation button 74 shown in FIG. 4 and the position where the operation button 74 shown in FIG. 5 is uncovered.

Between a holding pin 83 projected at a side of the slide guide plate 76 and a holding pin 85 projected at a side of the supporting plate 105, respective arm portions of a toggle spring 84 are respectively held. This toggle spring 84 biases the supporting plate 105 in a direction away from the central position of the slidable range of the supporting plate 105. Namely, the shutter plate 92 is caused to undergo biasing force of the toggle spring 84 SO that it is biased in either the direction where it covers the operation button 74 or the direction where the operation button 74 is uncovered.

It is to be noted that the portion of the connection member 95 projecting from the surface of the shutter plate 92 functions as a finger holding portion when the shutter plate 92 is caused to undergo movement operation by finger.

[4] Select Mechanism for Operation Mode

Figure 7:
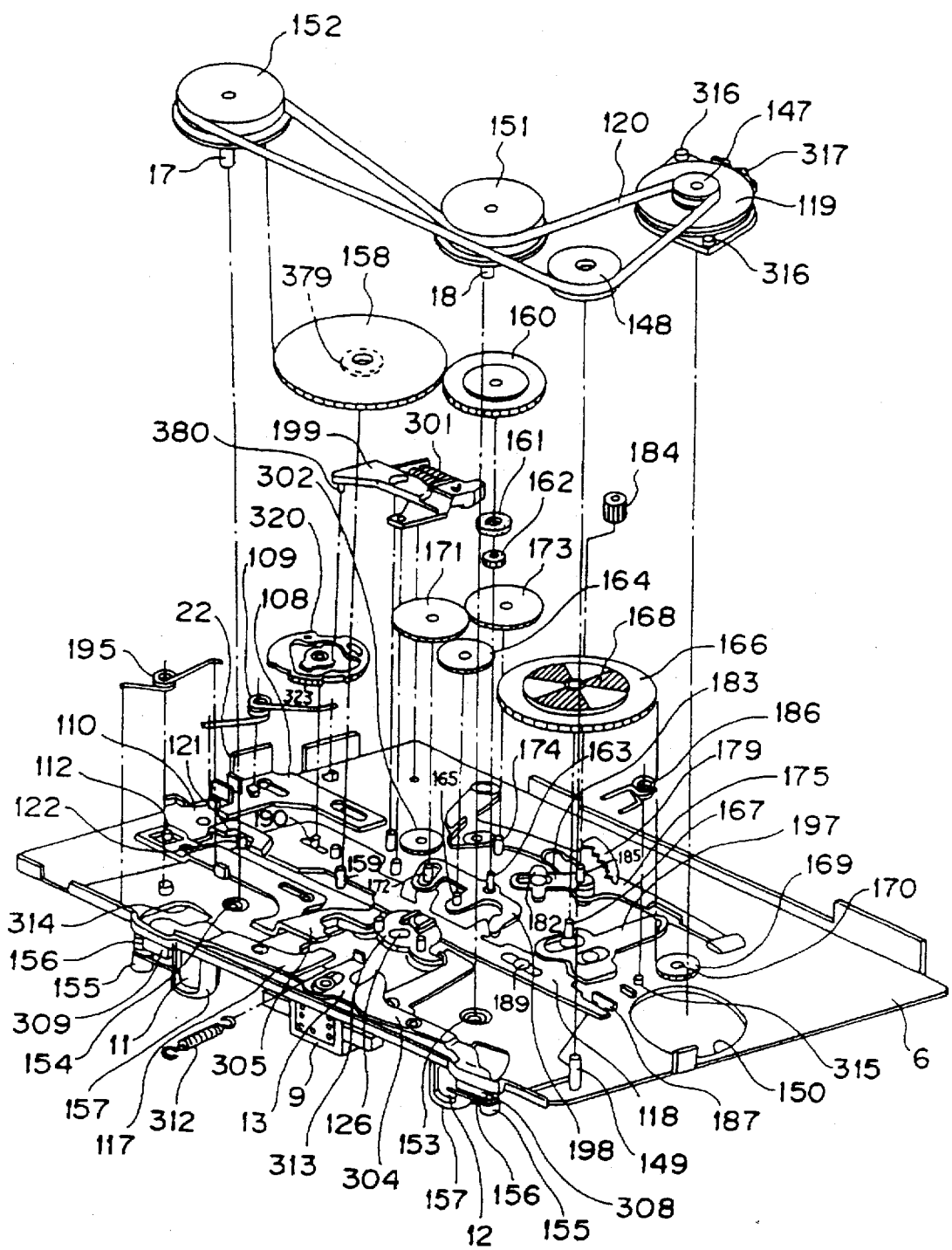
FIG. 7 is an exploded perspective view showing a mode select (switching) mechanism constituted within the recorder body.
Figure 8:
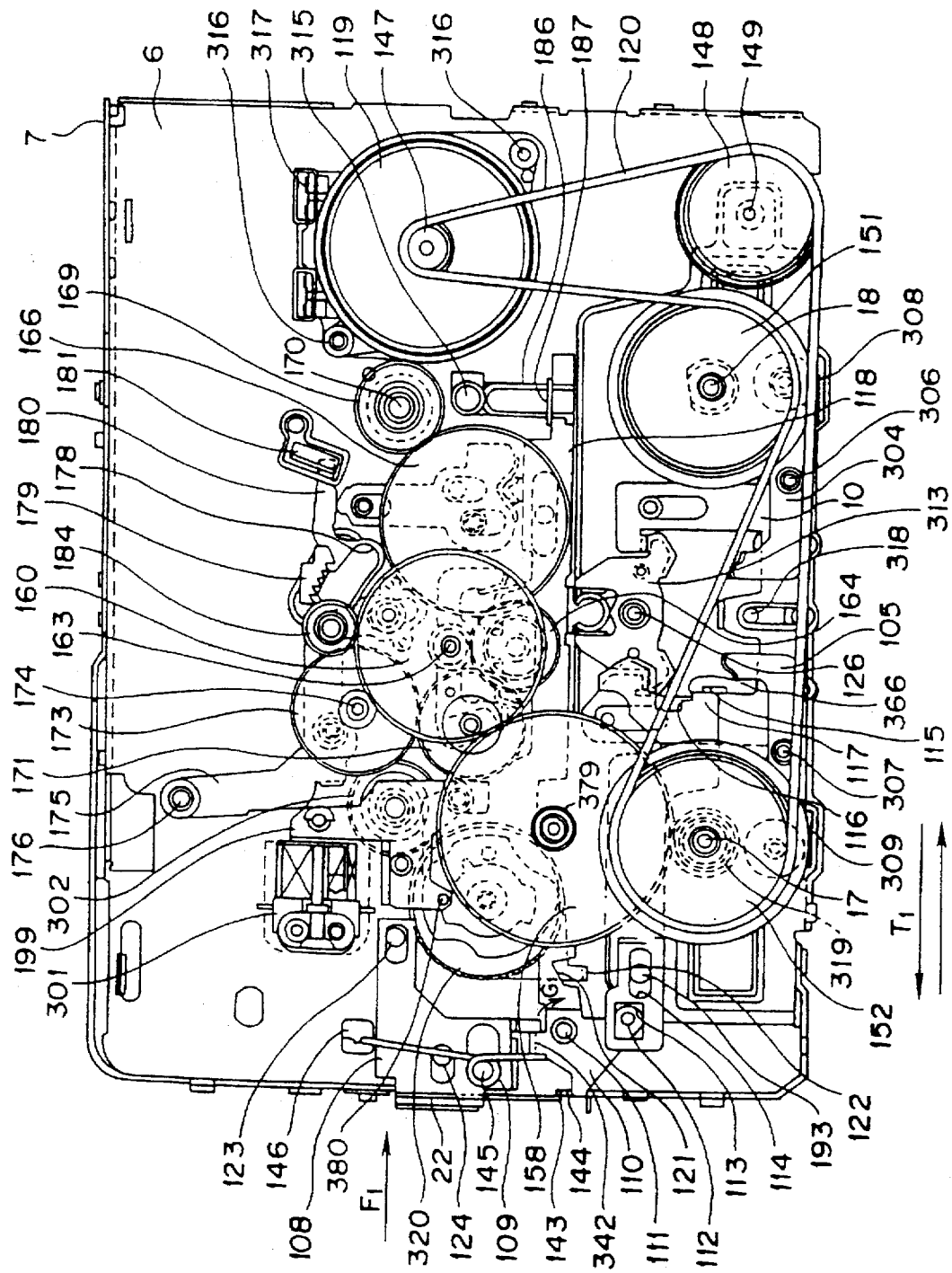
FIG. 8 is a plan view showing a principal surface of the chassis.
Figure 9:
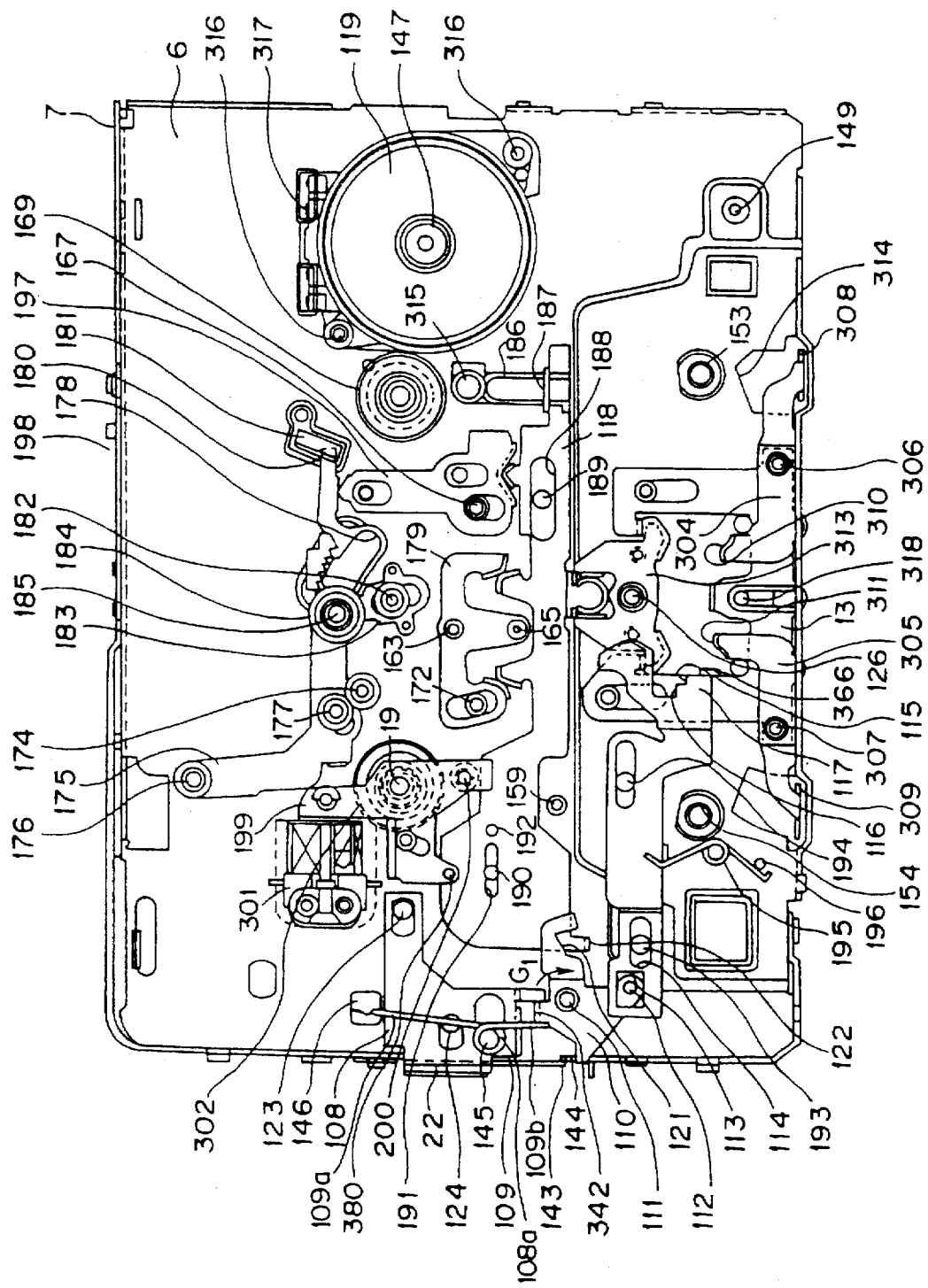
FIG. 9 is a plan view showing the mode select mechanism of the tape recorder.

At the other principal surface side facing inward from the housing 2 opposite to the principal surface of the cassette loading portion 4 of the chassis 6, as shown in FIGS. 7 to 9, is disposed a drive motor 119 and a select mechanism for selecting an operation mode which selectively transmits a drive force from the drive motor 119 to respective reel drive shafts 19, 20 and first and second capstan shafts 17, 18 in accordance with the selected operation mode. This select mechanism is provided with a solenoid plunger 301 and a cam gear 320 operative at the time of selecting respective operation modes. This cam gear 320 is rotationally operated by the drive force of the drive motor 119, and is stopped at rotational angles corresponding to respective operation modes. In this example, the select mechanism is constituted between the chassis 6 and the electronic circuit board 10.

At the drive shaft of the drive motor 119, a pulley 147 is attached. An endless drive belt 120 is wound on the pulley 147. This drive belt 120 is wound on a transmission pulley 148 rotatably supported at the other principal surface side of the chassis 6 and a flywheel at the forward side. Moreover, a flywheel 151 at the reverse side which forms a pair with the flywheel 152 of the forward side is in contact with the drive belt 120. In addition, the transmission pulley 148 is rotatably supported through a support shaft 149 vertically provided at the other principal surface side of the chassis 6.

Further, capstan shafts 17, 18 are respectively vertically provided at central portions of respective flywheels 152, 151, and base ends of these capstan shafts 17, 18 are supported by bearings 154, 153 attached to the chassis 6 so that they are rotatably supported by the chassis 6. The first and second capstan shafts 17, 18 respectively vertically provided on the respective flywheels 152, 151 are projected toward the cassette loading portion 4 constituted at one principal surface side of the chassis 1 through respective bearings 154, 153. When the drive motor 119 is rotationally driven, respective flywheels 152, 151 and respective capstan shafts 17, 18 vertically provided integrally with these flywheels 152, 151, are rotationally operated in directions opposite to each other.

At the plane surface side opposite to the flywheel 152 at the forward side, a drive gear 319 is integrally provided. This drive gear 319 is meshed with a first transmission gear 158 rotatably supported through a support shaft 159 vertically provided at the other principal surface side of the chassis 6. At the central portion of the first transmission gear 158, a cam drive gear 379 having a diameter smaller than that of the first transmission gear 158 is integrally provided. This cam drive gear 379 is faced to the outer circumferential portion of the cam gear 320 rotatably supported by a support shaft 190 vertically provided at the other principal surface side of the chassis 6, and is permitted to be meshed with the gear portion 323 formed at the outer circumferential edge portion of the cam gear 320.

Selection of respective operation modes in this tape recorder is carried out in accordance with the rotational angular position of the cam gear 320. Namely, at the other principal surface of the chassis 6, an operation mode select lever 118 subjected to movement (shift) operation by the cam gear 320 is disposed. This operation mode select lever 118 is disposed on the chassis 6 so that it can be moved within the range of elongated holes 191, 188 by insertion-supporting support shafts 190, 189 vertically provided on the chassis 6 and engaged with elongated holes 191, 188 bored with their length directions along the diameter of the support shafts 190, 189.

The operation mode select lever 118 is such that, at one end thereof, a spring contact piece 187 is formed in a rising manner (hereinafter referred to as rising-formed depending upon circumstances), and that respective arm portions of a torsional coil spring 186 supported on the chassis 6 are respectively in pressure-contact with the both sides of the spring contact piece 187. This torsional coil spring 186 is supported at the coil portion thereof by a support shaft 315 vertically provided on the chassis 6, and holds the operation mode select lever 118 at a neutral position by allowing a pair of arm portions to pressure-support the spring contact piece 187 from both sides through biasing forces directed opposite to each other. In the case where any one of the stop mode, the fast feed mode and the rewind mode is selected, the operation mode select lever 118 is held at the neutral position. In the state where the reproduction mode or the recording mode is selected, when the forward mode where the magnetic tape 206 is traveled in the forward direction is selected, the operation mode select lever 118 is subjected to movement operation in the direction of indicated by arrow $T_1$ in FIG. 8 against the biasing force of the torsional coil spring 186. In addition, when the reverse mode where the magnetic tape 206 is traveled in the reverse direction is selected, the operation mode select lever 118 is subjected to movement operation in the direction indicated by $T_2$ of FIG. 8.

Figure 18:
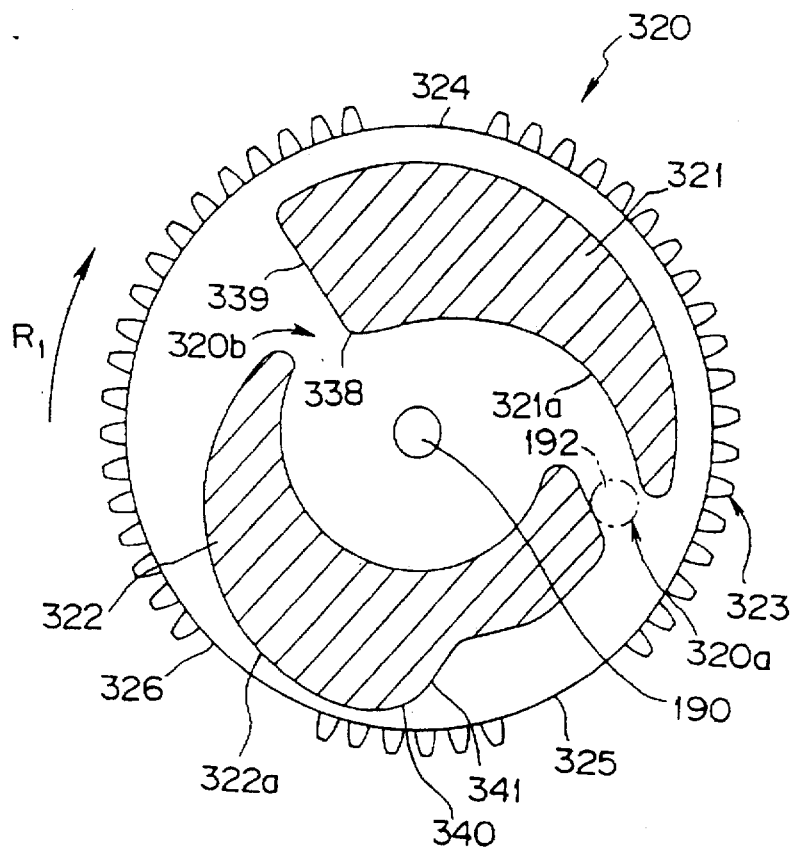
FIG. 18 is a plan view of one principal surface side of the cam gear constituting the mode select mechanism.
Figure 19:
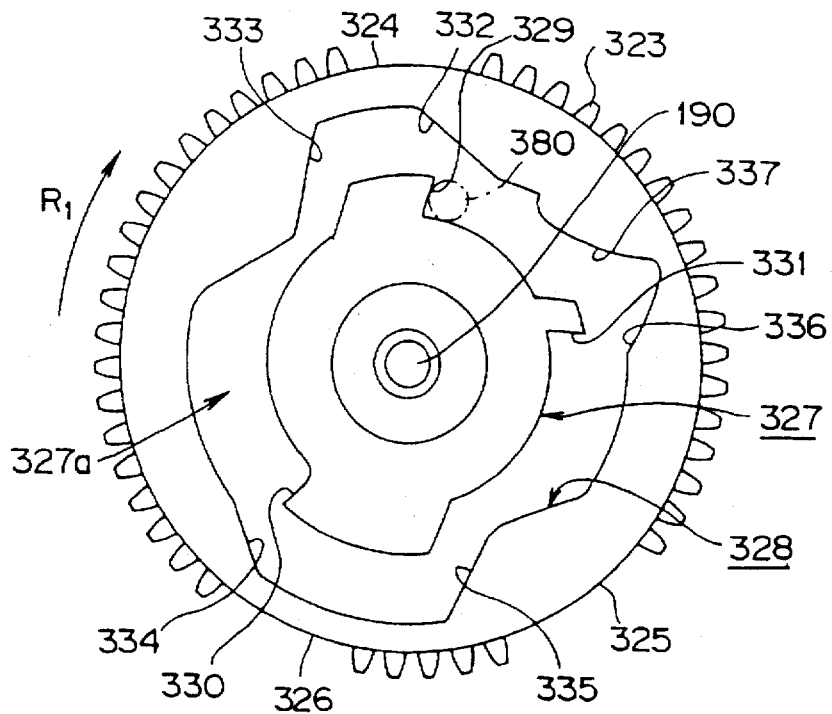
FIG. 19 is a plan view showing the other principal surface side of the cam gear shown in FIG. 18.

Moreover, as shown in FIGS. 18 and 19, the cam gear 320 is provided with a gear portion 323 formed at the outer circumferential portion thereof, and three tooth missing portions 325, 324, 326 are formed between the gear portions 323. When any one of respective tooth missing portions 325, 324, 326 is opposite to the cam driver gear 379, even if the cam drive gear 379 is rotated, drive force is not transmitted to the cam gear 320. Thus, this cam gear 320 is placed in an inoperative state. In addition, when the gear portion 323 is opposite to the cam drive gear 379, the cam gear 320 allows the gear portion 323 to be meshed with the cam drive gear 379. When the cam drive gear 379 is rotated, drive force is transmitted to the cam gear 320. Thus, this cam gear 320 is subjected to rotational operation.

At one principal surface side opposite to the other principal surface of the chassis 6 of the cam gear 320, first and second cam portions 321 and 322 for allowing the operation mode select lever 118 to undergo movement operation against biasing force of the torsional coil spring 186 are formed in a manner as shown in FIG. 18. The first cam portion 321 is such that the plane surface of the inner circumferential side opposite to the support shaft 190 which rotatably supports the cam gear 320 is formed as a first cam surface 321a with which a cam follower 192 provided at the operation mode select lever 118 is in slide contact, and the second cam portion 322 is such that the plane surface of the outer circumferential side facing the outer circumferential edge of the cam gear 320 is formed as a second cam surface 322a with which the cam follower 192 provided at the operation mode select lever 118 is in slide contact.

In this example, the cam follower 192 in slide contact with first and second cam portions 321, 322 is provided in a projected manner (hereinafter simply referred to as projected depending upon circumstances) at the other end portion extended between the cam gear 320 of the operation mode select lever 118 and the chassis 6.

Figure 10:
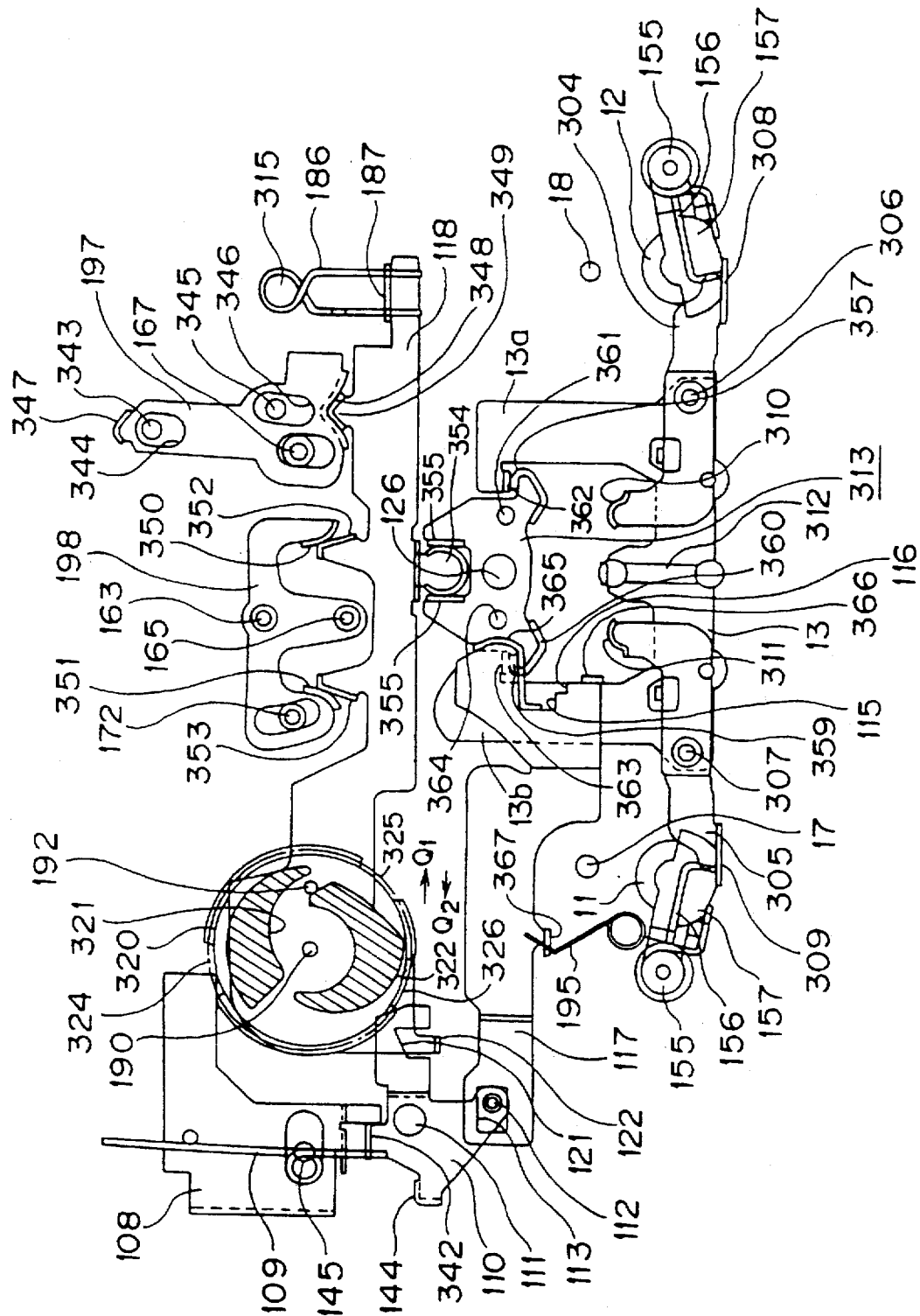
FIG. 10 is a plan view showing the configuration of the essential part of the mode select mechanism.

When the cam gear 320 is placed in the state where it is rotated at the initial position shown in FIG. 10, it allows the cam follower 192 to be positioned at a cam follower admitting portion 320a constituted between end portions of the first and second cam portions 321, 322, thus placing the operation mode select lever 118 at the neutral position. When the cam gear 320 is at the initial position, the cam drive gear 379 is opposite to the first tooth missing portion 325.

When the cam gear 320 is rotated in a clockwise direction which is the direction indicated by $R_1$ in FIG. 18 from the initial position shown in FIG. 10, the cam follower 192 is admitted into the portion between first and second cam portions 321, 322 from the cam follower admitting portion 320a, and comes into slide contact with the first cam surface 321a. When the cam gear 320 is further rotated in the direction indicated by arrow $R_1$ in FIG. 18, the cam follower 192 is moved closer to the support shaft 190 while being guided by the first cam surface 321a. As a result, the operation mode select lever 118 is moved in the direction indicated by arrow $B_1$ in FIG. 11 against the biasing force of the torsional coil spring 186. When the cam gear 320 is rotated by 130° in the direction indicated by arrow $R_1$ in FIG. 18, it allows the cam follower 192 to come into slide contact with a maximum projected portion 338 of the first cam surface 321a to move the operation mode select lever 118 up to the maximum movement position in the direction indicated by $B_1$ in FIG. 11. When the cam gear 320 is further rotated by 5° in the direction indicated by arrow $R_1$ in FIG. 18, i.e., by 135° from the initial position, the cam follower 192 climbs over the maximum projected portion 338 and comes into contact with an inclined surface portion 339 following the maximum projected portion 338. When the cam follower 192 comes into contact with the inclined surface portion 339, the operation mode select lever 118 is caused to undergo biasing force of the torsional coil spring 186 so that it is slightly subjected to return movement in the direction indicated by arrow $B_2$ in FIG. 11 to select (switch) the operation mode of the tape recorder to the recording/reproduction mode in the forward direction in which the magnetic tape 206 is traveled at a constant velocity in the forward direction so that recording or reproduction is carried out. At this time, the cam drive gear 379 is opposed to the second tooth missing portion 324 of the cam gear 320.

Figure 11:
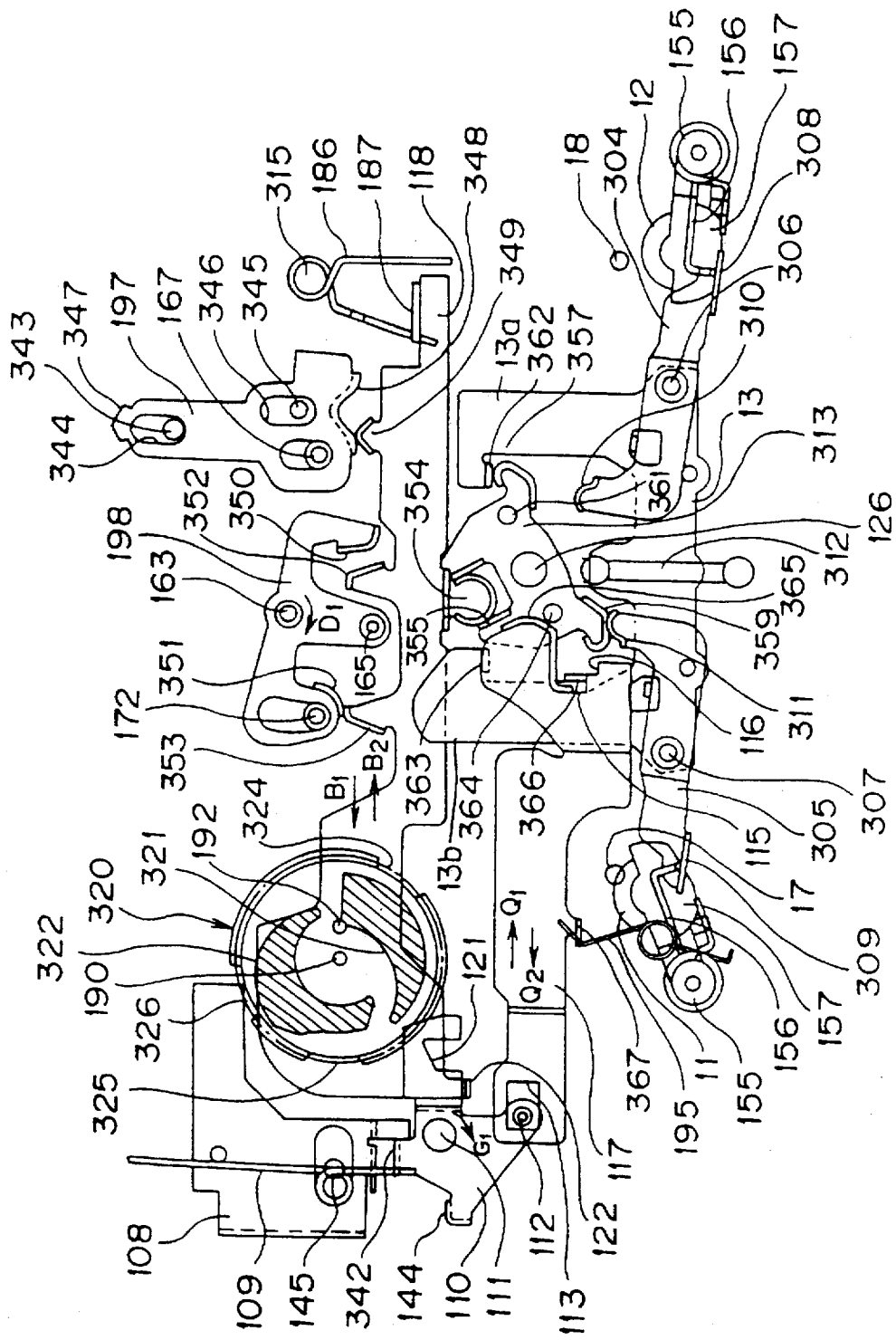
FIG. 11 is a plan view of the mode select mechanism showing the state where the recording and/or reproducing mode in the forward mode is selected.

When the cam gear 320 is further rotated in the direction indicated by arrow $R_1$ in FIG. 18 from the position where the operation mode select lever 118 is moved in the direction indicated by arrow $B_1$ in FIG. 11 so that the recording/reproduction mode in the forward direction is selected, the cam follower 192 comes to a cam follower withdrawal portion 320b constituted between the other end portions of the first and second cam portions 321, 322, and is thus placed in the state where it is not in contact with both the first and second cam surfaces 321a, 322a. When pressing state of the cam follower 192 by the cam gear 320 is released, the operation mode select lever 118 is caused to undergo the biasing force of the torsional coil spring 186 so that it is returned to the neutral position. When the cam gear 320 is further rotated in the direction indicated by arrow $R_1$ in FIG. 18 from the above-mentioned state, the cam follower 192 climbs over the second cam surface 322a. When the cam gear 320 is further rotated in the direction indicated by arrow $R_1$ in FIG. 18 from the initial position, the cam follower 192 is moved in a direction away from the support shaft 190 while being guided by the second cam surface 322a. As a result, the operation mode select lever 118 is moved in the direction indicated by arrow $B_1$ in FIG. 12 against the biasing force of the torsional coil spring 186. When the cam gear 320 is rotated by 130° in the direction indicated by $R_1$ in FIG. 18, it allows the cam follower 192 to be in slide contact with a maximum projected portion 340 of the second cam surface 322a to move the operation mode select lever 118 up to the maximum movement position in the direction indicated by arrow $B_2$ in FIG. 12. When the cam gear 320 is further rotated by 5° in the direction indicated by arrow $R_1$ in FIG. 18, i.e., by 270° from the initial position, the cam follower 192 climbs over the maximum projected portion 340 to come into contact with the inclined surface portion 341 following the maximum projected portion 340. When the cam follower 192 comes into contact with the inclined surface portion 341, the operation mode select lever 118 is caused to undergo the biasing force of the torsional coil spring 186 so that it is slightly subjected to return movement in the direction indicated by arrow $B_1$ in FIG. 12, to thus select (switch) the operation mode of the tape recorder to the recording/reproduction mode in the reverse direction where the magnetic tape 206 is traveled at a constant velocity in the reverse direction so that recording or reproduction is carried out. At this time, the cam drive gear 379 is opposite to the third tooth missing portion 326 of the cam gear 320.

When the cam gear 320 is further rotated in the direction indicated by arrow $R_1$ in FIG. 18, i.e., is rotated by 360° from the initial position from the position where it is rotated up to the position where the operation mode select lever 118 is moved in the direction indicated by arrow $B_2$ in FIG. 11 so that recording/reproduction mode in the reverse direction is selected, the cam follower 192 comes to the initial position faced to the cam follower admitting portion 320a constituted between end portions of the first and second cam portions 321, 322. Then, the operation mode select lever 118 is caused to undergo the biasing force of the torsional coil spring 186 so that it is returned to the neutral position. It is to be noted that when the operation mode select lever 118 is located at the initial position, the stop mode, the fast feed mode or the rewind mode is selected in this tape recorder.

At the other principal surface side of the cam gear 320 for allowing the operation mode select lever 118 to undergo movement operation, as shown in FIG. 19, there is formed a cam groove 327a with which a cam follower 380 provided at the other end side of a rotational lever 199 having one end connected to a plunger rod 377 of a solenoid plunger 301 and rotationally operated by driving of the solenoid plunger 301 is engaged. This cam groove 327a is ring-shaped with the support shaft 190 being the center, and is adapted so that the plane surface of the outer circumferential side is a third cam surface 327 and the plane surface of the inner circumferential side is a fourth cam surface 328.

Meanwhile, the solenoid plunger 301 for rotationally operating the rotational lever 199 which engages the cam follower 380 with the cam groove 327a is disposed at the other principal surface side of the chassis 6 as shown in FIGS. 7, 8 and 14 to 16. When this solenoid plunger 301 is in an OFF state which is an inoperative state, it biases the plunger rod 377 in a drawing direction. When there results ON state as the result of energizing, the solenoid plunger 301 projects the plunger rod 377. The rotational lever 199 rotationally operated by the solenoid plunger 301 is rotatably attached with a support shaft 200 being the center by allowing one end thereof to be engaged with an engagement portion 373 formed at the front end of the plunger rod 377, allowing the cam follower 380 projected at the other end side to be engaged with cam groove 327a of the cam gear 320, and allowing the middle portion to be supported by the support shaft 200 vertically provided on the chassis 6.

Moreover, at the other principal surface side of the chassis 6, a gear shift lever 175 for carrying out shift (movement) operation of the select gear 184 in the tape traveling direction which will be described later is disposed. This gear shift lever 175 is such that one end portion thereof is rotatably supported through the support shaft 176 vertically provided on the chassis 6, and that a contact piece 376 formed at the middle portion is opposed to a pressing piece 374 provided in the middle portion of the rotational lever 199. In addition, the rotational range of the gear shift lever 175 is limited by allowing an engagement piece 180 formed by bending the other end portion to be engaged with a rotation limit groove 181 bored in the chassis 6.

Respective arm portions of a torsional coil spring 368 rotatably supported about a support shaft 375 are engaged with the gear shift lever 175 and the rotational lever 199 in the state where the coil portion is wound on the support shaft 375 vertically provided on the chassis 6. The rotational lever 199 is such that the other end is rotationally biased in a direction away from the solenoid plunger 301 by allowing one arm portion of the torsional coil spring 368 to be engaged with an engagement portion 370 provided at the other side. Moreover, the gear shift lever 175 is rotationally biased in a direction to allow the contact piece 376 to become closer to the pressing piece 374 of the rotational lever 199 by allowing the other arm portion of the torsional coil spring 368 to be engaged with an engagement piece 369 provided in the vicinity of the support shaft 176.

Since the torsional coil spring 368 is such that the distance from the support shaft 176 of the gear shift lever 175 to the contact piece 376 is longer than the distance from the support shaft 176 to the engagement piece 369, and the distance from the support shaft 200 of the rotational lever 199 to the pressing piece 374 is shorter than the distance from the support shaft 200 to the engagement portion 370, a rotation torque greater than the rotation torque produced by the gear shift lever 175 is produced with respect to the rotational lever 199.

Figure 15:
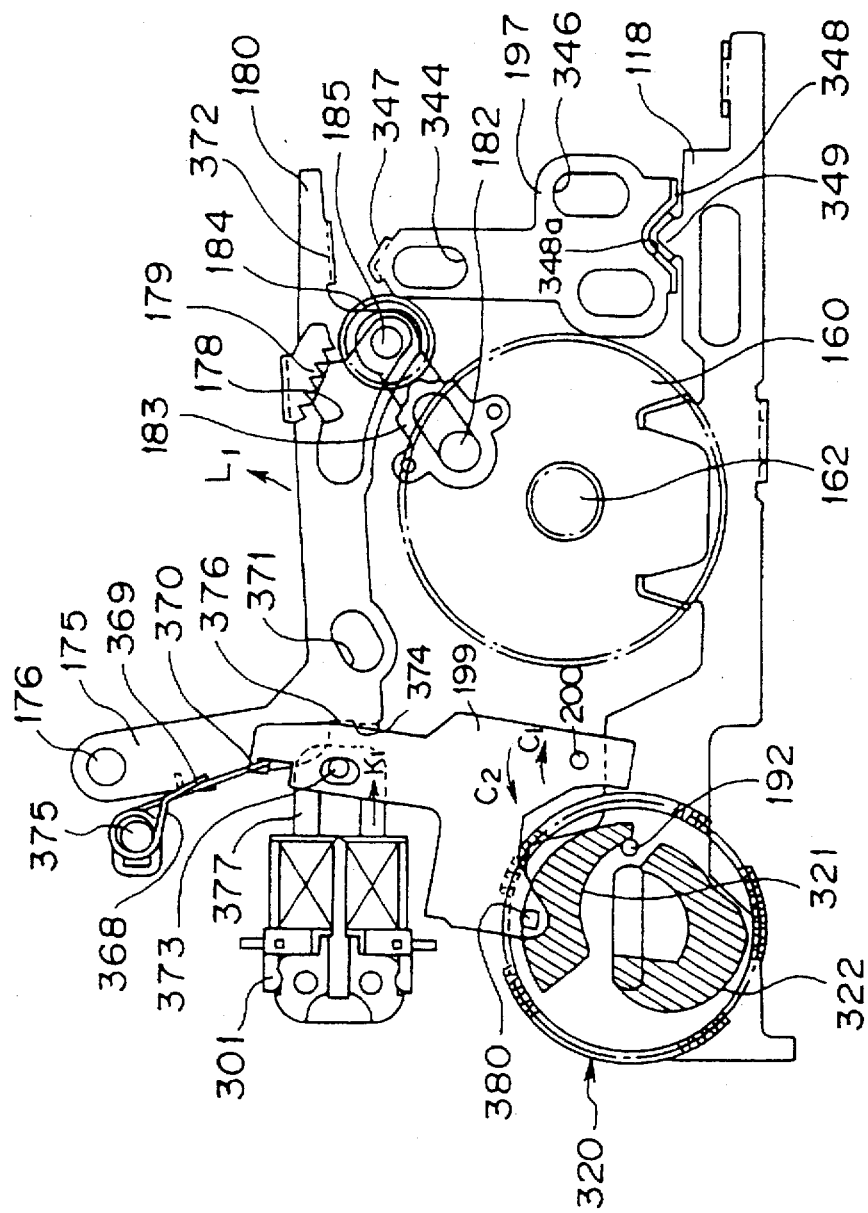
FIG. 15 a plan view showing the state where the solenoid plunger for allowing the gear shift lever to undergo movement operation is operated.

Accordingly, in the case where the solenoid plunger 301 is energized so that an ON state results as shown in FIG. 15, when the plunger rod 377 is projected toward the rotational lever 199, the torsional coil spring 368 rotates the other end of the rotational lever 199 in the direction indicated by arrow $C_1$ in FIG. 15 away from the solenoid plunger 301 to allow the pressing piece 374 of the rotational lever 199 to come into contact with the contact piece 376 of the gear shift lever 175 to rotate the gear shift lever 175 against the biasing force of the torsional coil spring 368. At this time, the cam follower 380 provided at one end of the rotational lever 199 is placed in the state where it is in slide contact with the fourth cam surface 328 of the outer circumferential side of the cam gear 320.

Moreover, when the solenoid plunger 301 is in the OFF state where energization thereto is interrupted, and the plunger rod 377 is in a drawn state, the rotational lever 199 is rotated in the direction indicated by $C_2$ in FIG. 15 where the other end becomes closer to the solenoid plunger 301, and the cam follower 380 provided at one end is placed in the state where it is in slide contact with the third cam surface 317 of the cam gear 320.

When the cam gear 320 is located at the initial position, the cam follower 380 provided at the rotational lever 190 is in contact and engaged with the first holding portion 329 formed at the third cam surface 327 as shown in FIG. 19 so that rotation in the direction indicated by arrow $R_1$ in FIG. 19 is limited. When the cam gear 320 is located at the initial position, the cam drive gear 379 is opposite to the first tooth missing portion 325.

When the solenoid plunger 301 is energized so that it is placed in the ON state, and the plunger rod 377 is thus projected so that the rotational lever 199 is rotationally operated in the direction indicated by arrow $C_1$ in FIG. 15, the cam follower 380 is moved toward the outer circumferential side of the cam gear 320 to release engagement with the first holding portion 329, and to come into contact with a first inclined surface 332 formed at the fourth cam surface 328 of the outer circumferential side of the cam groove 327a to press the first inclined surface 332. When the cam follower 380 presses the first inclined surface 332, the cam gear 320 is slightly rotated in the direction indicated by arrow $R_1$ in FIG. 19, so the gear portion 323 is meshed with the cam drive gear 379. Then, drive force from the cam drive gear 379 is transmitted to the cam gear 320. By this cam drive gear 379, the cam gear 320 is placed in the state where it can be rotated in the direction indicated by arrow $R_1$ in FIG. 19. When the cam drive gear 379 is driven from the above-mentioned state so that the cam gear 320 is further rotationally operated in the direction indicated by arrow $R_1$ in FIG. 19, and it is rotated up to the position to allow the cam follower 380 to be in contact with the second inclined surface 333 of the fourth cam portion 328, energization to the solenoid plunger 301 is interrupted so that it is placed in the OFF state. As a result, the plunger rod 377 is moved in the drawing direction to rotate the rotational lever 199 in the direction indicated by arrow $C_2$ in FIG. 15 to move the cam follower 380 to the third cam surface 327 of the inner circumferential side of the cam groove 327a.

When the cam gear 320 is rotated by 135° in the direction indicated by arrow $R_1$ in FIG. 19 from the initial position, the cam follower 380 is engaged with the second holding portion 330 of the third cam plate 327 to limit rotation of the cam gear 320. At this time, a biasing force of the torsional coil spring 186 for biasing the operation mode select lever 118 which allows the cam follower 192 to come into contact with first and second cam portions 321, 322 formed at one principal surface side with respect to the cam gear 320 is transmitted through the cam follower 192 and the inclined surface 339 of the first cam surface 321a. Then, the cam gear 320 is placed in the state where it is rotationally biased in the direction indicated by arrow $R_1$ in FIG. 19. At this time, the cam drive gear 379 is opposite to the second tooth missing portion 324 of the cam gear 320.

When the solenoid plunger 302 is energized for a second time so that it is placed in the ON state, the rotational lever 199 is rotated in the direction indicated by arrow $C_1$ in FIG. 15. As a result, the cam follower 380 provided at the rotational lever 199 is moved toward the outer circumferential side of the cam gear 320. Thus, engagement with respect to the second holding portion 330 is released. Then, the cam follower 380 presses the third inclined surface 334 formed at the fourth cam surface 328 formed at the outer circumferential side of the cam groove 327a. When the cam follower 380 presses the third inclined surface 334, the cam gear 320 is caused to undergo pressing force from the cam follower 380 so that it is slightly rotated in the direction indicated by arrow $R_1$ in FIG. 19. As a result, the gear portion 323 of the cam gear 320 is meshed with the cam drive gear 379. Thus, the cam gear 320 is caused to undergo drive force from the cam drive gear 379 so that it is placed in the state where it can be rotated in the direction indicated by arrow $R_1$ in FIG. 19. When the cam drive gear 379 is driven from this state so that the cam gear 320 is further rotationally operated in the direction indicated by arrow $R_1$ in FIG. 19, and it is rotated up to the position to allow the cam follower 380 to be in contact with the fourth inclined surface 335 of the fourth cam portion 328, energization to the solenoid plunger 301 is interrupted so that it is placed in the OFF state. As a result, the plunger rod 377 is moved in the drawing direction to rotate the rotational lever 199 in the direction indicated by arrow $C_2$ in FIG. 15 to move the cam follower 380 to the third cam surface 327 of the inner circumferential side of the cam groove 327a.

When the cam gear 320 is rotated by 270° in the direction indicated by arrow $R_1$ in FIG. 19 from the initial position, the cam follower 380 is engaged with the third holding portion 331 of the third cam surface 327 to limit rotation of the cam gear 320. At this time, the biasing force of the torsional coil spring 186 which biases the operation mode select lever 118 is transmitted to the cam gear 320 through the cam follower 192 and the inclined surface 341 of the second cam surface 322a. Thus, the cam gear 320 is placed in the state where it is rotationally biased in the direction indicated by arrow $R_1$ in FIG. 19. At this time, the cam drive gear 379 is opposed to the third tooth missing portion 326 of the cam gear 320. When the solenoid plunger 302 is energized for a second time so that it is placed in the ON state, the rotational lever 199 is rotated in the direction indicated by arrow $C_1$ in FIG. 15. As a result, the cam follower 380 is moved toward the outer circumferential side of the cam gear 320. Thus, engagement with respect to the third holding portion 331 is released. Then, the cam follower 380 presses a fifth inclined surface 336 formed at the fourth cam surface 328 formed at the outer circumferential side of the cam groove 327a. When the cam follower 380 presses the fifth inclined surface 336, the cam gear 320 is caused to undergo pressing force from the cam follower 380 so that it is slightly rotated in the direction indicated by arrow $R_1$ in FIG. 19. As a result, the gear portion 323 of the cam gear 320 is meshed with the cam drive gear 379. Thus, the cam gear 320 is caused to undergo drive force from the cam drive gear 379 so that it is placed in the state where it can be rotated in the direction indicated by arrow $R_1$ in FIG. 19.

When the cam drive gear 379 is driven from the above-mentioned state so that the cam gear 320 is further rotationally operated in the direction indicated by arrow $R_1$ in FIG. 19, and it is rotated up to the position where it allows the cam follower 380 to be in contact with a sixth inclined surface 337 of the fourth cam portion 328, energization to the solenoid plunger 301 is interrupted so that it is placed in the OFF state. As a result, the plunger rod 377 is moved in the drawing direction to move the rotational lever 199 in the direction indicated by arrow $C_2$ in FIG. 15, thus to move the cam follower 380 to the third cam surface 327 of the inner circumferential side of the cam groove 327a.

When the cam gear 320 is rotated by 360° in the direction indicated by arrow $R_1$ in FIG. 19 from the initial position, i.e., until it is returned to the initial position, the cam follower 380 is engaged with the first holding portion 329 of the third cam surface 327 to limit rotation of the cam gear 320. At this time, the cam drive gear 379 is opposed to the first tooth missing portion 325 of the cam gear 320.

Meanwhile, as shown in FIGS. 10 to 13, a head movement lever 313 rotatably attached on the chassis 6 is connected to the operation mode select lever 118 through the support shaft 126 vertically provided on the chassis 6. This head movement lever 313 is rotationally operated in accordance with movement of the operation mode select lever 118. Namely, the head movement lever 313 is positioned in the vicinity of the operation mode select lever 118, and is connected, with a fitting projection 354 which has a substantially circular shape projected at one side of the operation mode select lever 118 that fits into a fitting recessed portion 355, to the opposite side of the operation mode select lever 118. This head movement lever 313 is rotationally operated with the fitting projection 354 being the center by allowing the operation mode select lever 118 to undergo movement operation. When the head movement lever 313 is rotationally operated with the fitting projection 354 being the center, it moves the head supporting base 13 on which the magnetic head 9 is attached to move the magnetic head 9 toward the cassette loading portion 4. The magnetic head 9 that is moved toward the cassette loading portion 4 side is admitted into the magnetic head insertion hole 207 of the tape cassette 201 loaded into the cassette loading portion 4, and is caused to be in slide contact with the magnetic tape 206 traveling within the tape cassette 201.

It is to be noted that the head supporting base 13 is always biased by a tension spring 312 in a direction to allow the magnetic head 9 to be withdrawn from the cassette 209.

Moreover, at the head supporting base 13, a pair of arm portions 13a, 13b extend toward the operation mode select lever 118 side in a manner such that the head movement lever 313 is positioned therebetween, and first and second pressing pieces 362, 363 opposite to the head movement lever 313 are formed at the front ends of these arm portions 13a, 13b. When the head movement lever 313 is rotationally operated with the support shaft 126 being the center, first or second pressing operation pieces 362, or 363 undergo pressing operation by first or second pressing operation pieces 357 or 359 formed on the both sides of the head movement lever 313, the head supporting base 13 is caused to undergo movement operation in the cassette loading portion 4 direction. Namely, in the recording/reproduction mode in the forward mode, the head movement lever 313 is rotated in the counterclockwise direction in FIG. 11 with the support shaft 126 being the center. Thus, the first pressing operation piece 357 formed at the right in FIG. 11 presses the first pressing piece 362 of the head supporting base 13. Moreover, in the reverse direction reproduction mode, the head movement lever 313 is rotated in the clockwise direction in FIG. 12 with the support shaft 126 being the center. Thus, the second pressing operation piece 359 formed at the left in FIG. 12 presses the second pressing piece 363 of the head supporting base 13.

Moreover, at the other principal surface side of the chassis 6, a head positioning lever 117 for supporting the magnetic head 9, which has been moved toward the cassette loading portion 4, at that movement position is slidably disposed. This head positioning lever 117 is supported on the chassis 6 in such a manner that the front end thereof faces the head supporting base 13 and the head movement lever 313, and that it can be moved in directions indicated by arrows $Q_1$ and $Q_2$ in FIG. 10 which are directions to become closer to the head supporting base 13 and away therefrom. Moreover, the head positioning lever 117 is such that the front end thereof is biased in the direction indicated by arrow $Q_1$ in FIG. 10 to allow the front end to become closer to the head supporting base 13 by the torsional coil spring 195 disposed on the chassis 6 as shown in FIG. 9. It is to be noted that biasing position of the head positioning lever 117 by the torsional coil spring 195 is limited by allowing the contact piece 365 formed at the front end portion thereof to come into contact with the contact pin 364 vertically provided on the head movement lever 313 as shown in FIG. 11.

Further, at the front end portion of the head positioning lever 117, first and second holding step portions 115, 116 at which a holding piece 366 formed at the head supporting base 13 is selectively held are formed in a stair-step form.

In the tape recorder of this embodiment, when the tape recorder is in the stop mode and the magnetic head 9 is located at the position withdrawn from the cassette loading portion 4, the head supporting base 13 is placed in the state where no positioning is carried out by the head positioning lever 117 as shown in FIG. 10. Namely, the holding piece 366 is placed at the position away (spaced) from the first and second holding step portions 115, 116 as shown in FIG. 10.

Figure 12:
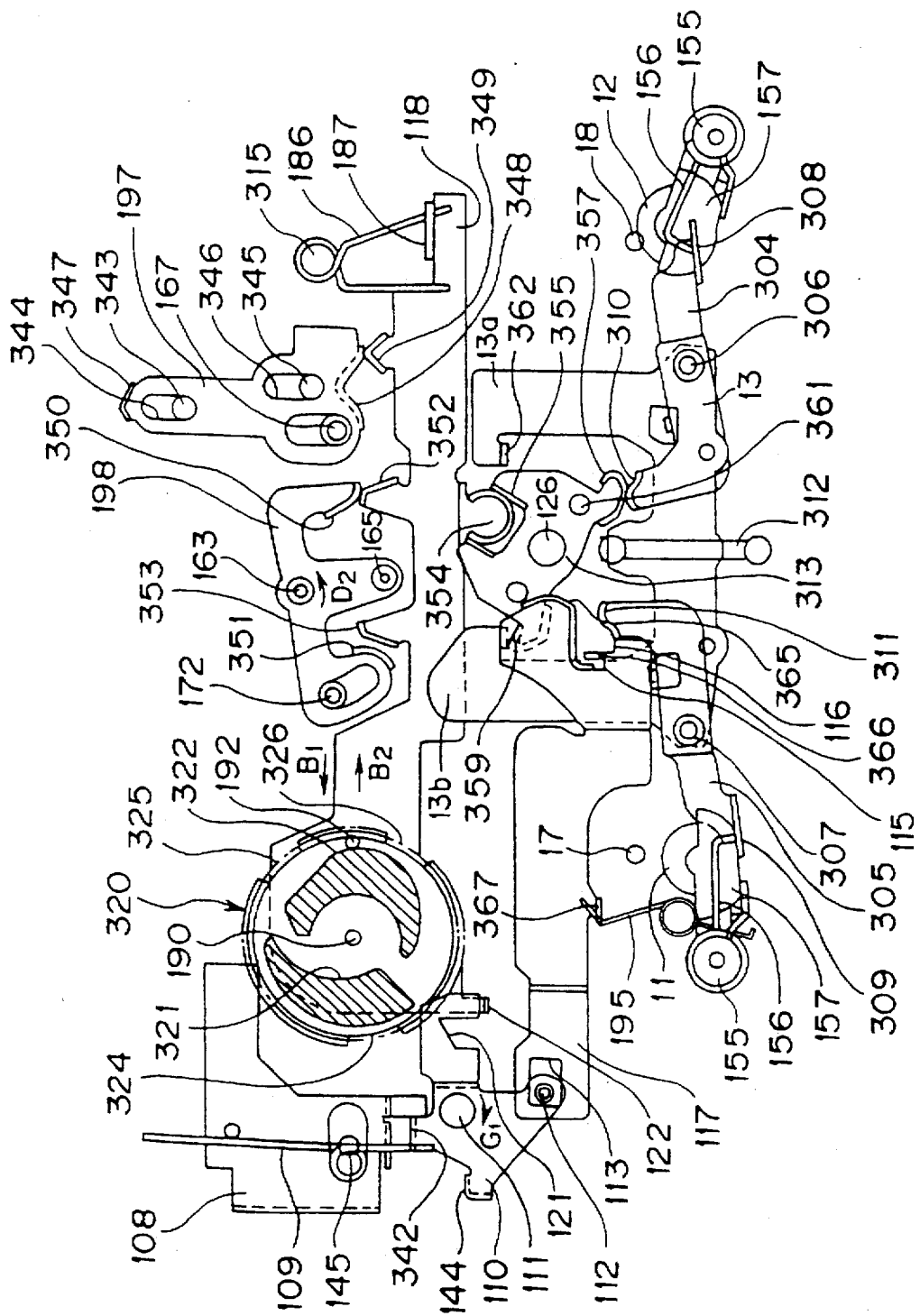
FIG. 12 is a plan view of the mode select mechanism showing the state where the recording and/or reproducing mode in the reverse mode is selected.

In the tape recorder of this embodiment, when recording and/or reproduction mode in the forward direction or in the reverse direction is selected, and the magnetic head 9 is advanced toward the cassette loading portion 4 and is then moved to the position where it is admitted (advanced) into the head insertion hole 207 of the tape cassette 201 loaded into the cassette loading portion 4, the holding piece 366 formed at the head supporting base 13 is held by the first holding step portion 115 as shown in FIGS. 11 and 12, thus to allow the magnetic head 9 to undergo positioning so that it is held at the recording/reproduction position advanced toward the cassette loading portion 4. The positioning hold state of the head supporting base 13 by the head positioning lever 117 is maintained by allowing the head positioning lever 117 to be biased in the direction indicated by arrow $Q_1$ in FIG. 11 by the torsional coil spring 195. On the other hand, release of the positioning hold state of the head supporting base 13 is carried out by rotating the head movement lever 313 to move the head positioning lever 117 in the direction indicated by arrow $Q_1$ in FIG. 11 against the biasing force of the torsional coil spring 195.

Figure 13:
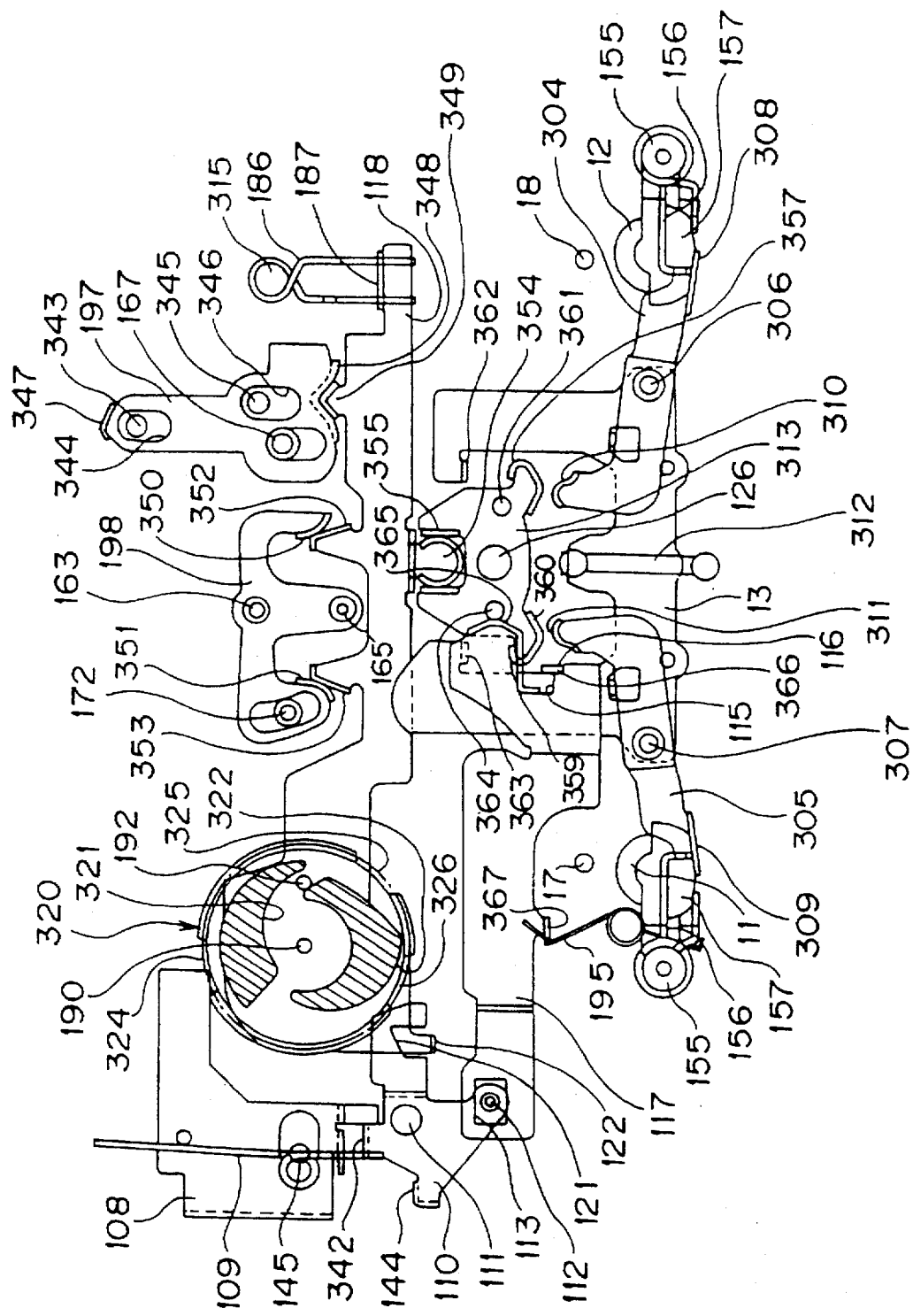
FIG. 13 is a plan view of the mode select mechanism in the stop mode.

Moreover, in the tape recorder of this embodiment, when after the recording/reproduction mode for traveling the magnetic tape 206 at a constant velocity is once set, the stop mode, the fast feed mode, the rewind mode, or the music select mode to travel the magnetic tape 206 at high speed to carry out detection of music which is music signal recorded on the magnetic tape 206 is selected, the head movement (transfer) lever 313 is returned to the initial position, whereby the head positioning lever 117 is also returned to the initial position. However, the holding piece 366 formed at the head supporting base 13 is held by the second holding portion 116 as shown in FIG. 13. Accordingly, at this time, the magnetic head 9 is caused to undergo positioning so that it is held at a wait position which is withdrawn from the recording and/or reproducing position, but is advanced toward the head loading portion 4 with respect to the stop position.

Further, the head movement arm 313 selectively rotationally operates first and second pinch roller rotational operation levers 304, 305 rotatably attached to the chassis 6. These pinch roller rotational operation levers 304, 305 are positioned on both sides of the magnetic head 9 attached on the head supporting base 13, and are rotatably attached with these support shafts 306, 307 being the center in the state where their central portions are supported by support shafts 306, 307 vertically provided on the head supporting base 13.

At one end positioned at the head supporting base 13 side of the first and second pinch roller rotational operation levers 304, 305, contact pieces 310, 311 are formed. At the other end thereof, pressing operation pieces 308, 309 are formed. These pressing operation pieces 308, 309 are projected toward the cassette loading portion 4 side constituted at one principal surface side of the chassis 6 through opening portions 314, 314 opened in the chassis 6.

Moreover, the first and second pinch rollers 11, 12 adapted to selectively come into contact with the first and second capstans 17, 18 or become away therefrom are rotatably attached at one end side of a pinch roller supporting arm 157 rotatably supported through support shafts 155, 155 vertically provided on the chassis 6. These first and second pinch rollers 11, 12 are rotatably supported at one end by the pinch roller supporting arms 157, 157 rotatably supported through the support shafts 155, 155 vertically provided on the chassis 6. These pinch roller supporting arms 157, 157 are rotationally biased in a direction to allow the first and second pinch rollers 11, 12 supported at one end thereof to be respectively in pressure contact with the first and second capstan shafts 17, 18 by torsional coil springs 156, 156 wound on the support shafts 155, 155.

The head movement lever 313 is rotationally operated by allowing the operation mode select lever 118 to undergo movement (transfer) operation. As a result, the first and second pressing operation pieces 357, 359 allow the contact pieces 310, or 311 to undergo pressing operation, thus to rotationally operate the first or second pinch roller rotational operation lever 304 or 305 with the support shaft 306 or 307 being as the center. When the first or second pinch roller movement arm 304 or 305 is rotationally operated, the pressing operation piece 308 or 309 allows one arm portion of the torsional coil spring 156 or 156 to undergo pressing operation toward the first or second capstan shaft 17 or 18 side.

When the tape recorder of this embodiment is set to the recording/reproduction mode in the forward mode, second pressing operation piece 359 of the head movement lever 313 allows the contact piece 311 of the first pinch roller rotational operation lever 305 of the forward side to undergo pressing operation as shown in FIG. 11. In addition, when the recording/reproduction mode in the reverse mode is set, the first pressing operation piece 357 of the head transfer lever 313 allows the contact piece 310 of the second pinch roller rotational operation lever 304 of the reverse side to undergo pressing operation.

In this example, engagement pins 361, 364 with which operation mode detecting switch (not shown) are engaged are provided at the head movement lever 313. This operation mode detecting switch detects rotational direction of the head movement (transfer) lever 313, thus to detect the operation mode that the tape recorder of this embodiment selects among the recording/reproduction mode in the forward mode, the recording/reproduction mode in the reverse mode and the stop mode.

The first transmission gear 158, which is meshed with the drive gear 319 provided at the flywheel 152 of the forward side and is caused to undergo transmission of drive force of the drive motor 119, is meshed with the second transmission gear 160 rotatably supported at the support shaft 163 vertically provided on the other principal surface side of the chassis 6. As shown in FIG. 7, a clutch gear 162 is coaxially attached to the second transmission gear 160 through a friction member 161. When the second transmission gear 160 is rotated, the clutch gear 162 is caused to undergo transmission of drive force through friction force of the friction member 161 interposed between the clutch gear 162 and the second transmission gear 160 SO that it is rotationally operated.

A fluctuation gear 164 rotatably supported by a support shaft 165 vertically provided at the front end of a fluctuation lever 198 with the support shaft 163 which supports the second transmission gear 160 being as the center is meshed with the clutch gear 162. When the fluctuation lever 198 is rotated with the support shaft 165 being as the center, the above-mentioned fluctuation gear 164 is rotated around the clutch gear 162.

The fluctuation lever 198 is as shown in FIG. 11 such that, at the front ends of a pair of arm portions projected on the both sides thereof, first and second contact pieces 350, 351 which are respectively in contact with first and second pressing operation pieces 352, 353 formed at the other side of the operation mode select lever 118 are formed. When the recording/reproduction mode in the forward mode is selected, and the operation mode select lever 118 is slid in the direction indicated by arrow $B_1$ in FIG. 11, the second pressing operation piece 353 presses the second contact piece 351 to rotate the fluctuation lever 198 in the direction indicated by arrow $D_1$ in FIG. 11 with the support shaft 163 being the center. In addition, when the recording/ reproduction mode in the reverse mode is selected, and the operation mode select lever 118 is slid in the direction indicated by arrow $B_2$ in FIG. 11, the first pressing operation piece 352 presses the first contact piece 350 to rotate the fluctuation lever 198 in the direction indicated by arrow $D_2$ in FIG. 12 with the support shaft 163 being the center.

When the tape recorder of this embodiment is set to the recording/reproduction mode in the forward mode, the fluctuation gear 164 is meshed with a third transmission gear 171 rotatably supported through a support shaft 172 vertically provided on the chassis 6. This third transmission gear 171 is meshed with a fourth transmission gear 173 rotatably supported by a support shaft 174 vertically provided on the chassis 6. This fourth transmission gear 173 is meshed with a reel gear 302 of the tape winding side which is the first reel gear attached at the base end portion projected toward the other principal surface side of the chassis 6 of a reverse drive shaft 19 of the tape winding side. Namely, in the recording/ reproduction mode in the forward mode, drive force of the drive motor 119 is transmitted to the reel drive shaft 19 of the tape winding side through the clutch gear 162, and the reel drive shaft 19 is rotationally operated by rotation torque in which the rotation torque transmitted to the clutch gear 162 is caused to be upper limit value.

Moreover, when the tape recorder of this embodiment is set to the recording/reproduction mode in the reverse mode, a fluctuation gear 164 is meshed with a fifth transmission gear 166 rotatably supported through the support shaft 167 vertically provided on the chassis 6. This fifth transmission gear 166 is meshed with a reel gear 169 of the tape supply side which is the second reel gear attached at the base end portion projected toward the other principal surface side of the chassis 6 of the reel drive shaft 20 of the tape supply side. Namely, in the recording/reproduction mode in the reverse mode, drive force of the drive motor 119 is transmitted to the reel drive shaft 20 of the tape supply side through the clutch gear 162. Thus, this reel drive shaft 20 is rotationally operated by rotation torque in which the rotation torque transmitted to the clutch gear 162 is an upper limit value.

In this example, at the fifth transmission gear 166, a speed detection plate 168 for detecting rotational speed of the fifth transmission gear 166 by optical sensor is attached.

In the vicinity of the other end side of the gear shift lever 175, a gear supporting lever 183 which rotatably supports a select gear 184 for selecting (switching) the tape traveling direction is disposed. This gear supporting lever 183 has an elongated hole at the base end thereof, and is rotatably and slidably supported in the state where support shaft 182 vertically provided on the chassis 6 is inserted into the elongated hole. At the front end of the gear supporting lever 183, the select gear 184 is rotatably supported through a support shaft 185. In addition, at the other end of the gear movement lever 175, a groove 178 which takes circular arc shape into which the support shaft 185 for supporting the select gear 184 is inserted is formed.

The select gear 184 is adapted so that it comes into contact with the second transmission gear 160 or moves away therefrom by rotation of the gear movement lever 175.

Moreover, at the gear movement lever 175, a rack gear 179 opposite to the outer peripheral edge of the second transmission gear 160 is provided in a manner to face one side edge of the groove 178 as shown in FIGS. 8 and 9. This rack gear 179 extends over a range shorter than the groove 178. Accordingly, when the support shaft 185 which supports the select gear 184 is moved in the state guided by the groove 178, the select gear 184 is meshed with the rack gear 179. When the support shaft 185 is located at both end portions of the groove 178, the select gear 184 is caused to be off from the rack gear 179.

Figure 14:
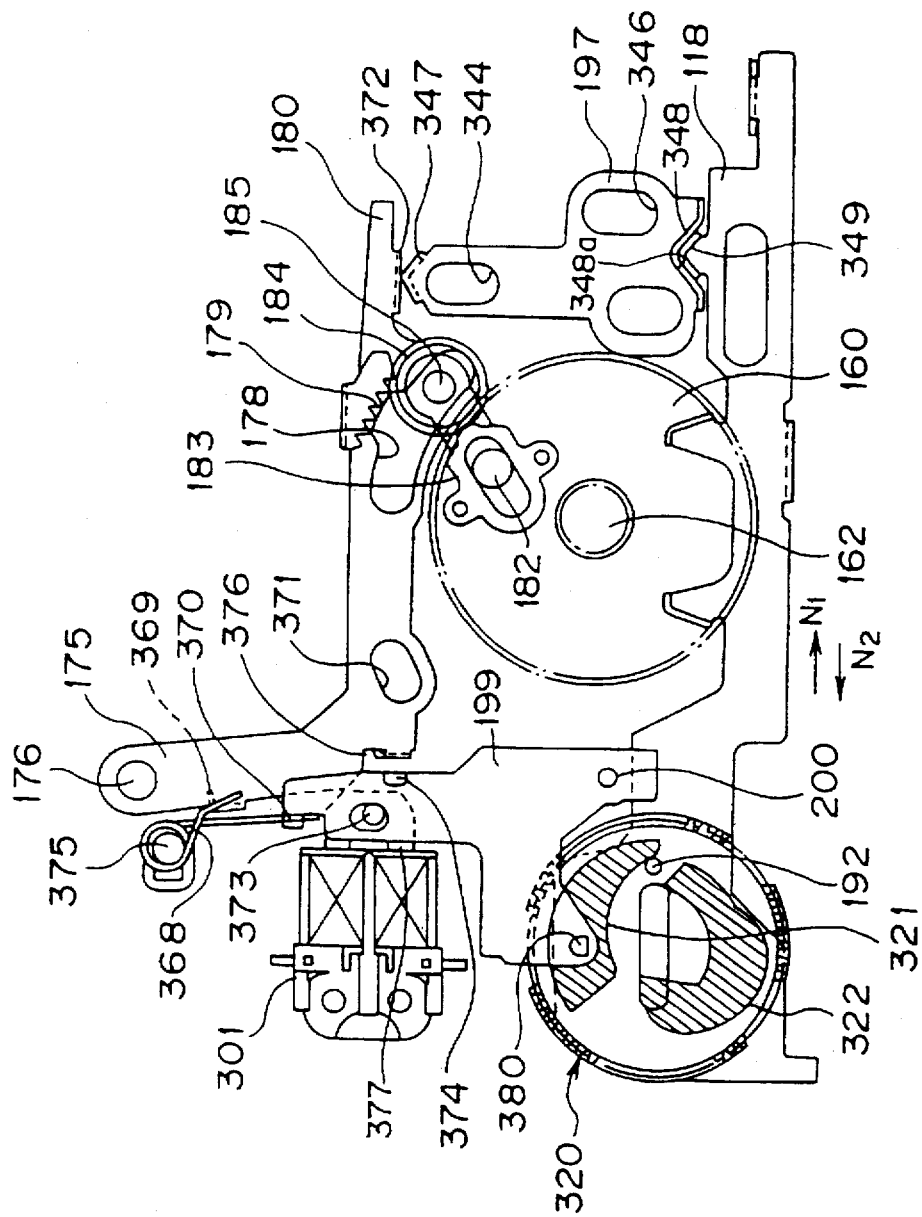
FIG. 14 is a plan view showing the peripheral portion of gear shift (movement) lever constituting the mode select mechanism.

Between the gear movement lever 175 and the operation mode select lever 118, a movement limit lever 197 which limits movement of the gear movement lever 175 is disposed as shown in FIG. 10. This movement limit lever 197 has a pair of elongated holes 344, 346. By inserting the support shafts 343, 345 vertically provided on the chassis 6 into these elongated holes 346, 346, the movement limit lever 197 is supported so that it can be moved (transferred) in a direction extending between the gear movement lever 175 and the operation mode select lever 118. At the end portion of the side facing the gear movement lever 175 of the movement limit lever 197, a pressing operation piece 372 which is in contact with a first contact piece 347 formed at the gear shift lever 175 is formed as shown in FIG. 14. In addition, at the end portion of the side facing the operation mode select lever 118 of the movement limit lever 197, a second contact piece 348 in which the central concave portion is provided. At the portion opposite to the second contact piece 348 of the operation mode select lever 118, an engagement projection 349 engaged with the concave portion of the contact piece 348 is provided.

Figure 17:
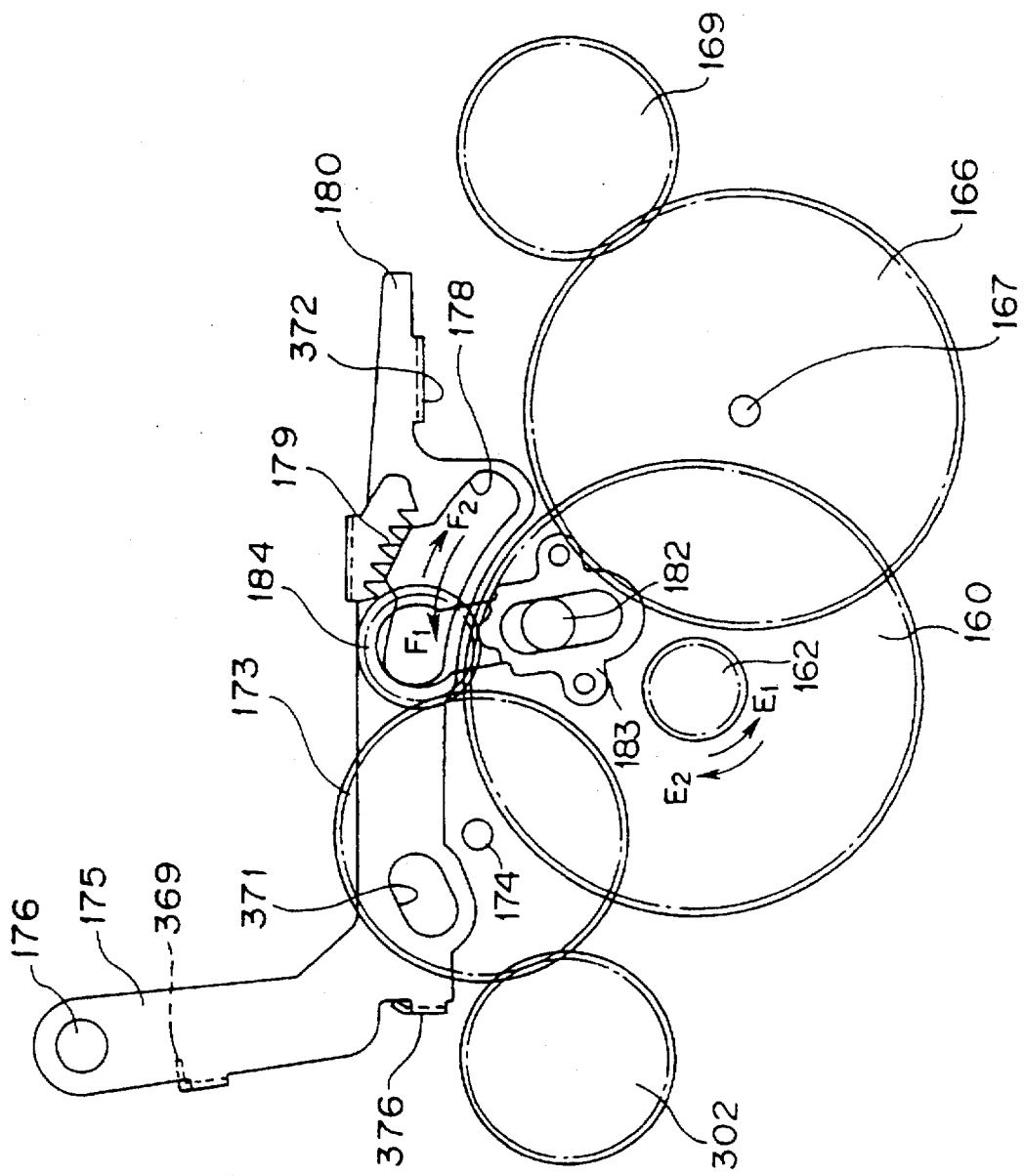
FIG. 17 is a plan view showing the select gear for selecting the tape traveling direction.

When the tape recorder of this embodiment is in the stop mode which is the initial state, since the plunger rod 377 of the solenoid plunger 301 is located at the drawing position as shown in FIGS. 14 and 17, the gear movement lever 175 is caused to undergo the biasing force of the torsional coil spring 368 so that it is rotationally biased to move the select gear 184 in the tape traveling direction toward the second transmission gear 160 side to allow them to be meshed with each other. In this stop mode, when the support shaft 185 is positioned at any end portion of the groove 178, the select gear 184 is meshed with any one of the fifth transmission gear 166 and the fourth transmission gear 173.

In the stop mode, when the second transmission gear 160 is rotated in the direction indicated by arrow $E_1$ or in the direction indicated by $E_2$ in FIG. 17, the select gear 184 maintains the state where it is meshed with the second transmission gear 160 depending upon the rotation direction of the second transmission gear 160. Thus, the select gear 184 is caused to undergo movement operation in the direction indicated by arrow $F_1$ or in the direction indicated by arrow $F_2$ in FIG. 17 about the second transmission gear 160. Namely, in the state where the select gear 184 is meshed with any one of the fourth and fifth transmission gears 173, 166, when the second transmission gear 160 is rotated in a direction to allow the portion meshed with the select gear 184 to be directed to any one of the transmission gears 173 and 166, the select gear 184 is rotated in a direction where it is bored into any one of transmission gears 173 and 166. For this reason, the select gear 184 maintains the meshed state with respect to one gear to hold it to rotate that one gear. When the select gear 184 is meshed with the fourth transmission gear 173 to rotate the fourth transmission gear 173, the fast feed mode where the reel gear 302 of the tape winding side is caused to undergo rotational operation is set. When the select gear 184 is meshed with the fifth transmission gear 166 to rotate the fifth transmission gear 166, rewinding mode where reel gear 169 of the tape supply side is caused to undergo rotational operation is set.

In the state where the select gear 184 is meshed with any one of the fourth and fifth transmission gears 173, 166, when the second transmission gear 160 is rotated in a direction to allow the portion meshed with the select gear 184 to be directed to the other gear of the fourth and fifth transmission gears 173, 166, the select gear 184 is rotated in a direction to escape from the other transmission gear 173, or 166. For this reason, it becomes impossible to hold meshing with respect to one gear because of the load that transmission gear 173, or 166 has. Accordingly, the select gear 184 rotates a gear supporting lever 183 in a direction to become away from the one gear. When the gear supporting lever 183 is rotated even a little in a direction to move away from one of the fourth and fifth transmission gears 173, 166, the select gear 184 is meshed with the rack gear 179. Accordingly, the select gear 184 is placed in the state where it is meshed with the second transmission gear 160 and the rack gear 179. Thus, the select gear 184 is moved until it is meshed with the other gear of the fourth and fifth transmission gears 173, 166 in accordance with rotation direction of the second transmission gear 160.

When the shift gear 184 is not meshed with both the fourth and fifth transmission gears 173, 166, the select gear 184 is placed in the state where it is meshed with the rack gear 179. When the second transmission gear 160 is rotated, the select gear 184 is moved until it is meshed with any one of the fourth and fifth transmission gears 173, 166 in accordance with the rotational direction of the second transmission gear 160.

Namely, in accordance with the tape recorder of this embodiment, when the drive motor 119 is driven in forward or reverse direction in the state where the stop mode is set, the fast feed mode or the rewinding mode is executed.

In the tape recorder of this embodiment, when the recording/reproduction mode is selected to be the forward mode or in the reverse mode, the solenoid plunger 301 is turned ON. As a result, the plunger rod 377 is moved in the direction indicated by arrow $K_1$ in FIG. 15. Thus, the rotational lever 199 is caused to undergo the biasing force of the torsional coil spring 368 so that it is rotated in the direction indicated by arrow $C_1$ in FIG. 15 to rotate the gear shift lever 175 in the direction indicated by arrow $L_1$ in FIG. 15 against the biasing force of the torsional coil spring 368. By rotation of the gear shift lever 175, the select gear 184 moves away from the second transmission gear 160.

Namely, in this tape recorder, when the solenoid plunger 301 is brought into the ON state, the select gear 184 is away from the second transmission gear 160 before the cam gear 320 is caused to undergo rotational operation.

Figure 16:
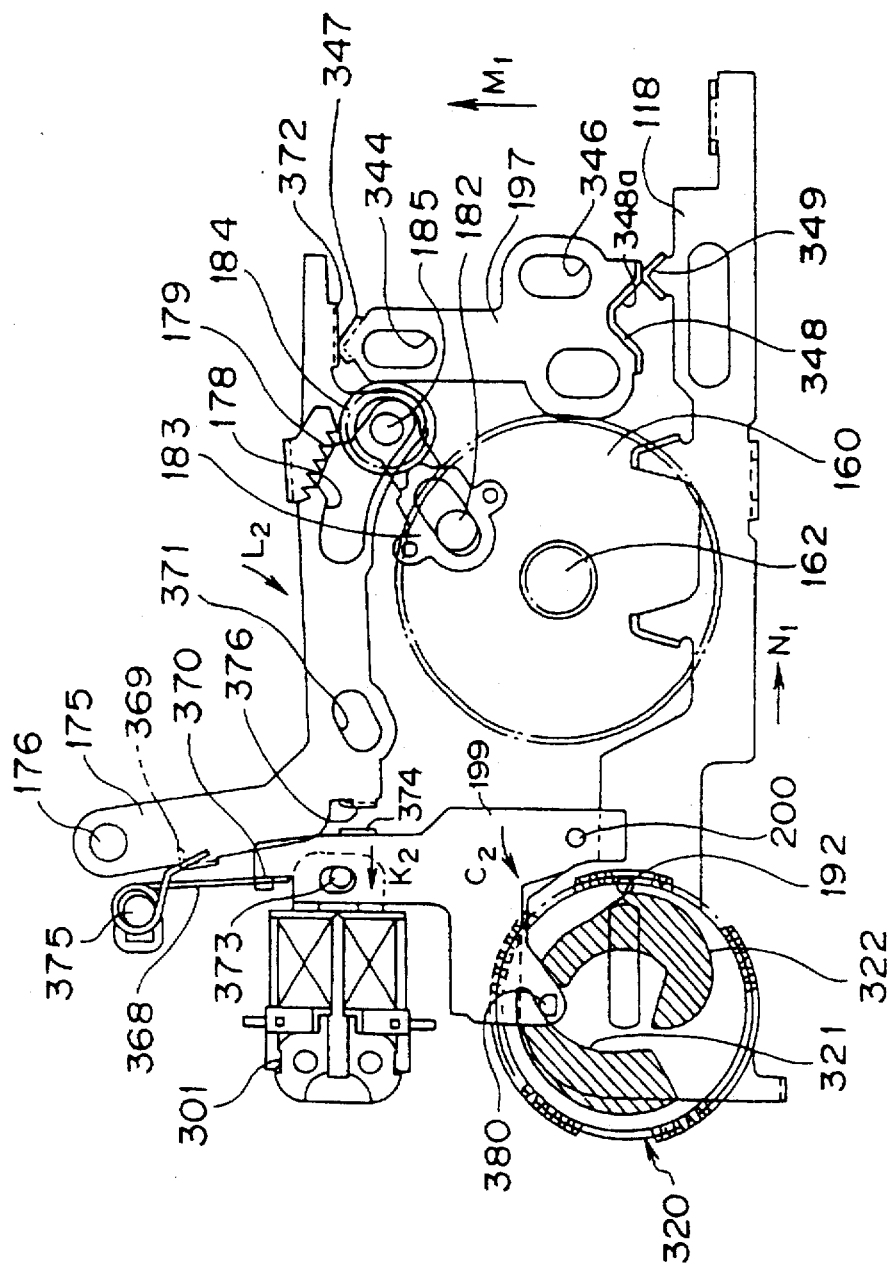
FIG. 16 is a plan view showing the movement position of the gear shift lever when the recording and/or reproducing mode is selected.

When the cam gear 320 is rotationally operated so that recording/reproduction mode in the forward mode or in the reverse mode is set, the rotational lever 199 is rotated in the direction indicated by arrow $L_2$ in FIG. 16 by rotation of the cam gear 320 so that it is returned to the initial position. As a result, the solenoid plunger 301 is placed in the OFF state so that the plunger rod 377 is moved in the direction indicated by arrow $K_2$ in FIG. 16. Thus, the operation mode select lever 118 is caused to undergo movement operation in the direction indicated by $N_1$ in FIG. 16.

When the recording/reproduction mode is set, and the rotational lever 199 is returned to the initial position, the gear shift lever 175 is caused to undergo the biasing force of the torsional coil spring 368 so that it is rotationally biased in the initial position direction which is the direction indicated by arrow $L_2$ in FIG. 16 where the select gear 184 is caused to be meshed with the second transmission gear 160. In this case, rotation in the initial position direction is limited by the movement limit lever 197. Namely, when the operation mode select lever 118 is caused to undergo movement operation from the state where it is supported by the torsional coil spring 186 so that it is located at the neutral position in the direction indicated by arrow $N_1$ or in the direction indicated by arrow $N_2$ in FIG. 14, the movement limit lever 197 allows the engagement projection 349 to come into contact with the position where the engagement projection 349 is away from a concave portion 348a of a second contact piece 348 as shown in FIG. 16. Thus, the movement limit lever 197 is moved in the direction indicated by arrow $M_1$ in FIG. 16. The movement limit lever 197 allows the first contact piece 347 to come into contact with the pressing operation piece 372 of the gear shift lever 175 to thereby hold the position of the gear shift lever 175 so that the select gear 184 is located at the position away (spaced) from the second transmission gear 160.

Namely, in the tape recorder of this embodiment, when recording/reproduction mode is set in the forward mode or in the reverse mode, the select gear 184 is caused to be away from the second transmission gear 160. When the operation mode select lever 118 is located at the neutral position and the rotational lever 199 is located at the initial position, the select gear 184 is pressed with respect to the second transmission gear 160, whereby it is meshed with the second transmission gear 160 for a second time.

[5] Cover Lock Mechanism

The cover lock mechanism for locking, at the closing position, the cover body 5 for opening and closing the cassette loading portion 4 will now be described.

This cover lock mechanism is disposed at the short side opposite to the short side of the recorder body 1 in which the hinge portion for supporting the cover body 5 is disposed, i.e., at the position opposite to the opening end of the cover body 5. This cover lock mechanism includes, as shown in FIGS. 7 to 9, and FIGS. 23, 25 and 26, an eject operation lever 108, and a lock lever 23 engaged with the cover body 5. The eject operation lever 108 is disposed on the chassis 6 and is operated by inserting slide guide pins 124, 123 vertically provided on the chassis 6 into a pair of elongated holes 132, 133 having long diameter in the movement direction, whereby it can be moved in the direction indicated by arrow $F_1$ and in the direction indicated by arrow $F_2$ in FIG. 23 within the range of elongated holes 132, 133. At one end facing externally from the short side of the recorder body 1 of the eject operation lever 108, a pressing operation piece 22 is bent and formed.

Figure 23:
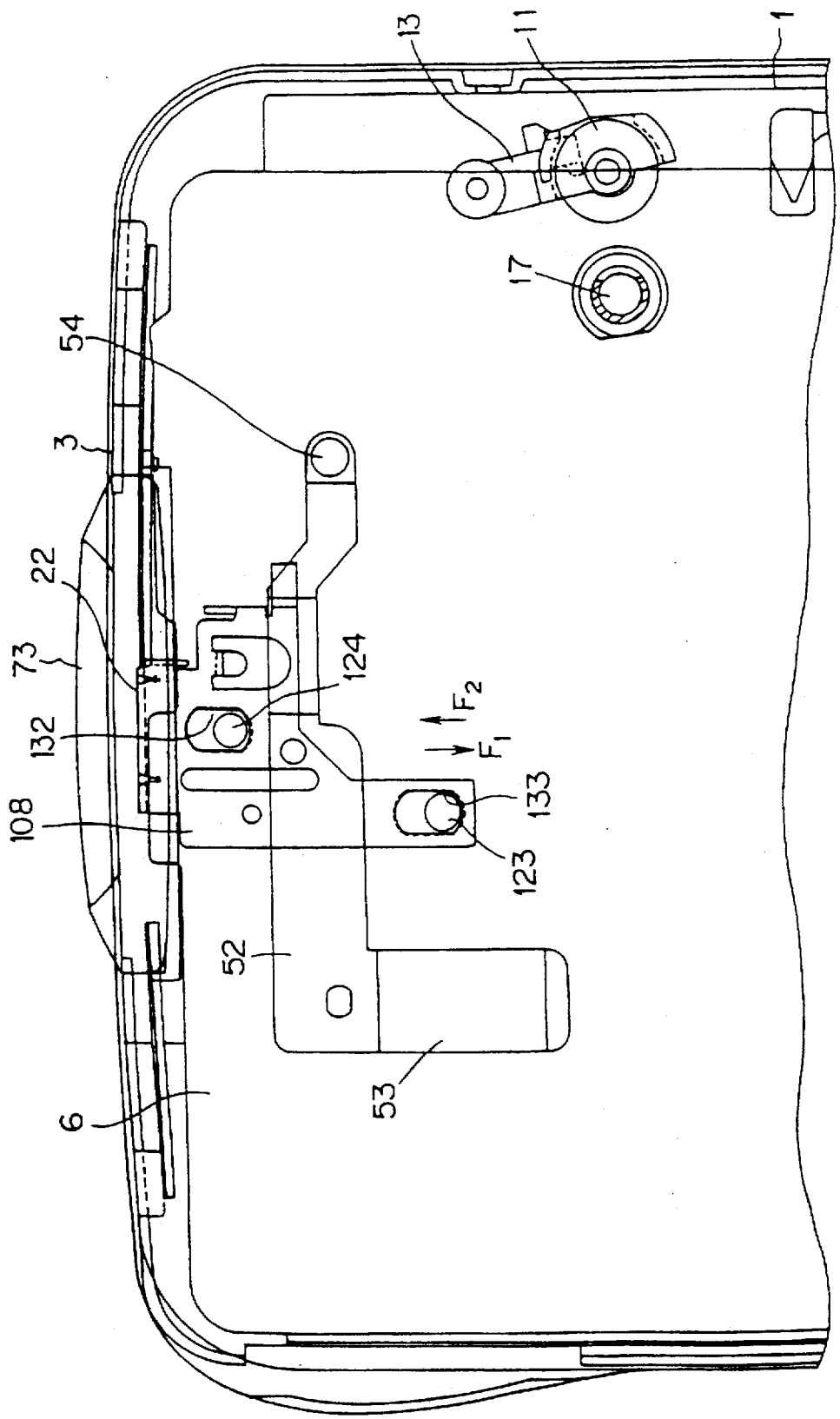
FIG. 23 is a plan view showing the essential part of the lock mechanism of the cover body.

Moreover, the eject operation lever 108 is caused to undergo movement biasing in a direction to project from the recorder body 1 in the direction indicated by arrow $F_2$ in FIG. 23, as shown in FIGS. 8 and 9, by a torsional coil spring 109 attached so that the coil portion is supported on a spring supporting portion 145 formed at the eject operation lever 108, one arm portion 109a is held by a spring holding piece 146 formed at the chassis 6, and the other arm portion 109b is held by a spring holding piece 108a formed at the eject operation lever 108. The eject operation lever 108 is caused to undergo movement operation inwardly of the recorder body 1 in the direction indicated by arrow $F_1$ in FIG. 23 against the biasing force of the torsional coil spring 109 when a pressing operation piece 22 is subjected to pressing operation.

It is to be noted that the pressing operation piece 22 of the eject operation lever 108 is caused to undergo pressing operation through and eject button 73 attached at the outer frame 3.

The other arm portion 109b of the torsional coil spring 109 for biasing the eject operation lever 108 is further extended from the spring holding piece 108a formed at the eject operation lever 108, and is engaged with engagement piece 342 formed at one end of an eject lever 110 rotatably attached through a support shaft 111 vertically provided on the chassis 6. When the pressing operation piece 22 is caused to undergo pressing operation through the eject button 73 and the eject operation lever 108 is moved in the direction indicated by arrow $F_1$ in FIG. 8 against the biasing force of the torsional coil spring 109, the eject lever 110 is pressed by the other arm portion 109b of the torsional coil spring 109 so that it is rotationally operated in the direction indicated by $G_1$ in FIG. 9 with the support shaft 111 being the center.

Figure 25:
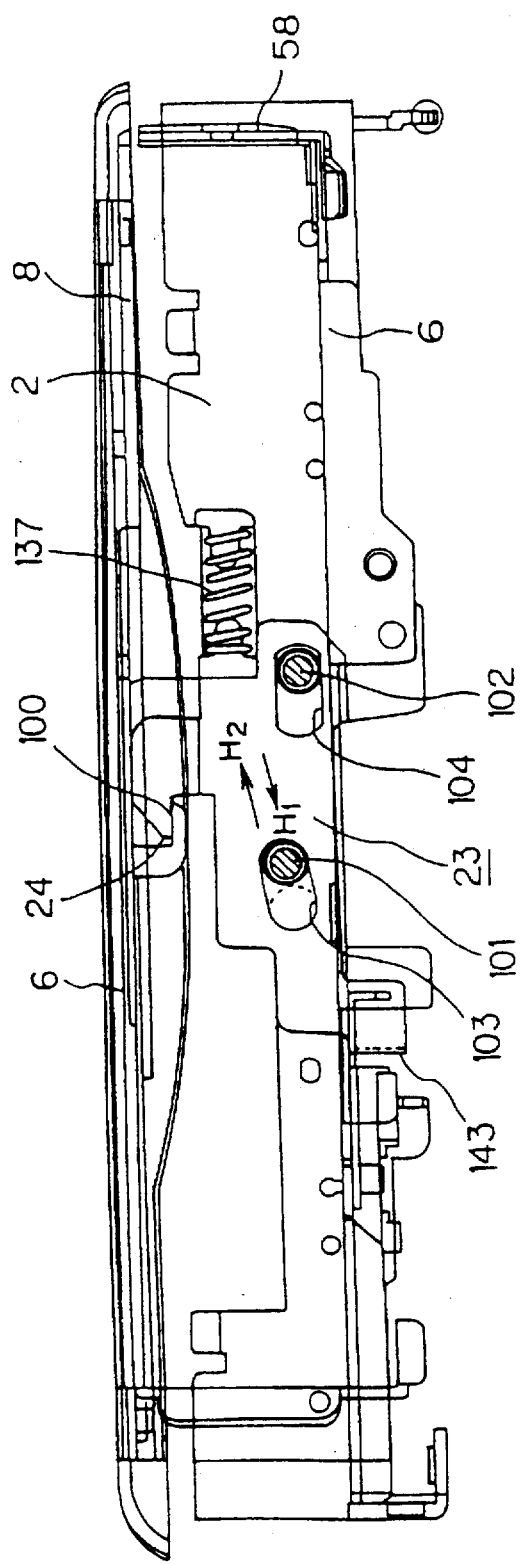
FIG. 25 is a front view showing the lock mechanism of the cover body.
Figure 26:
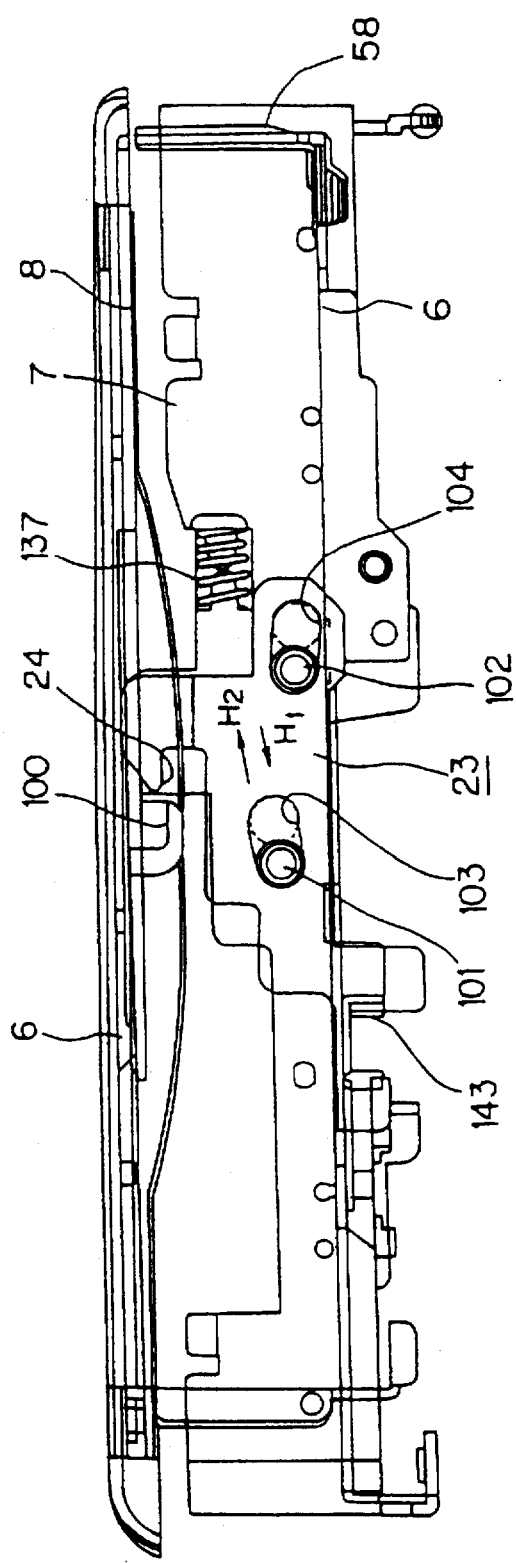
FIG. 26 is a front view showing the state where the locked state of the cover body is released.
Figure 27:
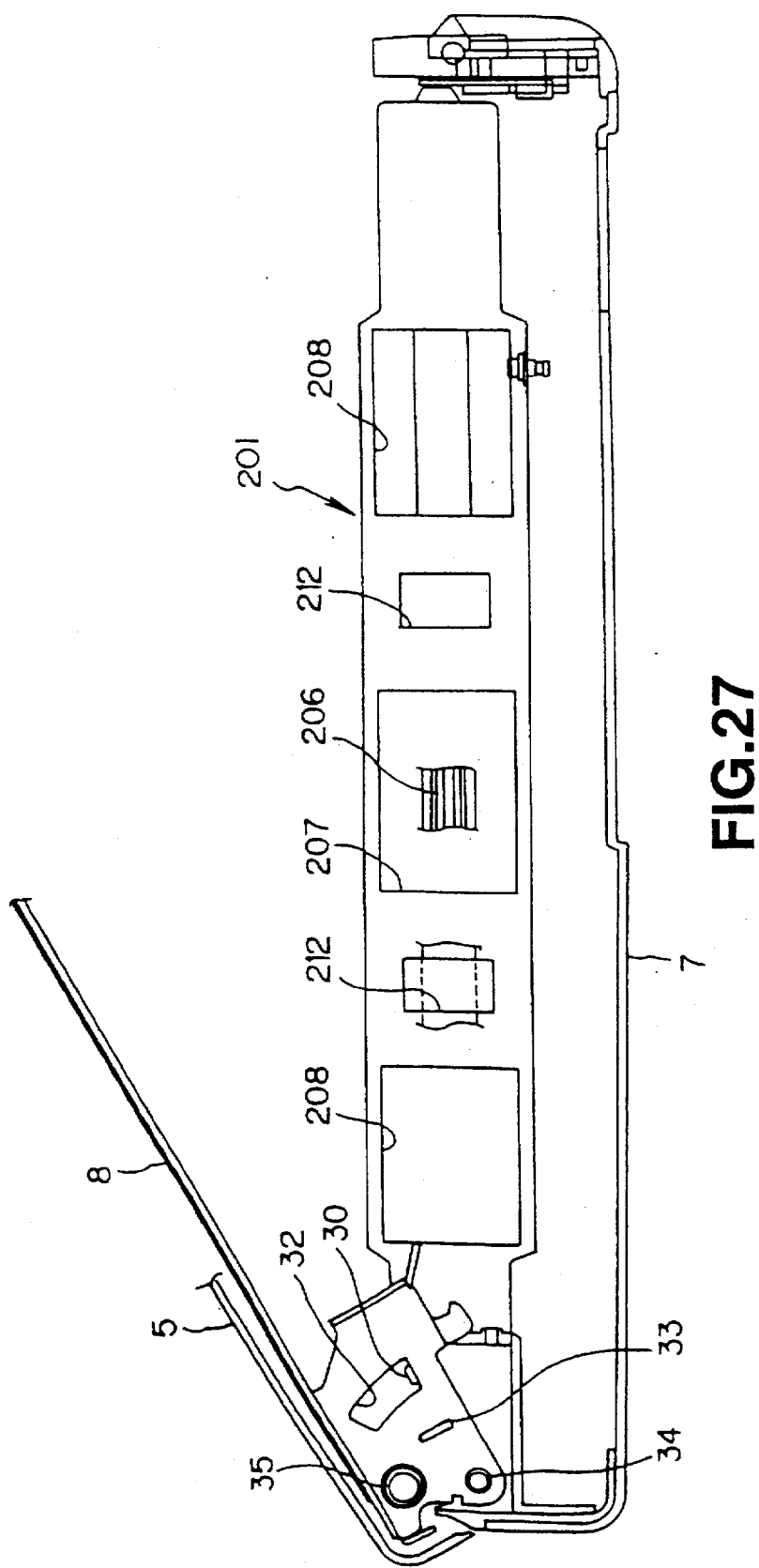
FIG. 27 is a side view showing the state where the tape cassette is loaded into the cassette loading portion.

Moreover, the lock lever 23 is slidably attached to the side plate 2 along the short side of the chassis 6 as shown in FIGS. 6, 25 and 26. This lock lever 23 is movably supported on the side plate 7 in the direction indicated by $H_1$ and in the direction indicated by $H_2$ in FIGS. 25 and 26 in the state where a pair of supporting pins 101, 102 vertically provided on the side plate 7 are inserted into first and second elongated holes 103, 104 as shown in FIGS. 25 and 26. This lock lever 23 is movably biased in the direction indicated by arrow $H_1$ in FIGS. 25 and 26 which is the direction where a lock piece 24 is engaged with an engagement portion 100 by a compression coil spring 137 interposed between the lock lever 23 and the side plate 7. Further, a lock piece 24 which is relatively engaged with the engagement portion 100 provided at the opening end of the cover body 5 is formed at the lock lever 23. This lock lever 23 locks the cover body 5 at the closing position by allowing the lock piece 24 to be engaged with the engagement portion 100.

Meanwhile, since the first elongated hole 103 formed at the lock lever 23 is formed in a manner inclined with respect to the principal surface of the chassis 6 as shown in FIGS. 25 and 26, when the lock lever 23 is slid in a direction to allow the lock piece 24 to be engaged with the engagement portion 100 or to be disengaged therefrom, the lock lever 23 is moved in the direction indicated by arrow $H_1$ and in the direction indicated by arrow $H_2$ in FIGS. 25 and 26 in such a manner that it rotates with the supporting pin 102 inserted through the second elongated hole 104 being as the center. Accordingly, an amount of movement of the lock lever 23 when engagement/disengagement between the lock piece 24 and the engagement portion 100 is carried out can be reduced. Thus, miniaturization of the cover lock mechanism is realized.

In this case, the engagement portion 100 provided at the cover body 5 side is formed integrally with one portion of a decorative plate 5a formed of synthetic resin or a metal plate attached to the front end portion of the cover body 5.

Moreover, at one end portion of the lock lever 23, there is projected a pressing piece 143 opposite to a pressing operation piece 144 formed at the eject lever 110. The lock lever 23 which has caused the lock piece 24 to be engaged with the engagement portion 100 and has locked the cover body 5 at the position where the cassette loading portion 4 constituted at one principal surface side of the chassis 6 is closed is such that when the eject operation lever 108 is caused to undergo movement operation in the direction indicated by arrow $F_1$ in FIG. 8 against the biasing force of the torsional coil spring 109 and the eject lever 110 is rotated in the direction indicated by arrow $G_1$ in FIG. 9, the pressing piece 143 is caused to undergo pressing operation through the pressing operation piece 144 formed at the eject lever 110. When the pressing piece 143 is caused to undergo pressing operation, the lock lever 23 is moved in the direction indicated by $H_2$ in FIG. 25 against the biasing force of the compression coil spring 137 to release engagement with respect to the engagement 100 of the lock piece 24, thus allowing the cover body 5 to be placed in the state where it can be opened.

Meanwhile, when the recording and/or reproducing mode is selected, even if the eject operation lever 108 is caused to undergo movement operation, movement of the lock lever 23 is limited by the operation mode select lever 118 constituting the operation mode select mechanism. As a result, the engagement state between the lock piece 24 and the engagement portion 100 is maintained. Thus, opening operation of the cover body 5 is limited. Namely, at the other end portion of the operation mode select lever 118, a rotation limit piece 122 is formed to face one side of the eject lever 110 as shown in FIGS. 7 and 8, thus limiting rotation in the eject direction which is the direction indicated by $G_1$ in FIGS. 8 and 9 with the support shaft 111 of the eject lever 110 being the center.

When the tape recorder of this embodiment is set to the recording/reproduction mode, and the operation mode select lever 118 is moved in the direction indicated by $B_1$ or in the direction indicated by $B_2$ in FIGS. 11 and 12 against the biasing force of the torsional coil spring 186, the rotation limit piece 122 is opposite to one side of the eject lever 110 to limit rotation in the direction indicated by $G_1$ in FIGS. 11 and 12 of the eject lever 110 to prohibit the eject operation. By limiting the rotation of the eject lever 110, movement of the lock lever 23 is also limited. Thus, opening operation of the cover body 5 is limited.

Moreover, in the case where the tape recorder of this embodiment is set to any one of operation modes of the stop mode, the fast feed mode, the rewinding mode and the music select mode, the operation mode select lever 118 is caused to undergo the biasing force of the torsional coil spring 186 as previously described so that it is placed at the neutral position. At this time, the rotation limit piece 122 formed at the operation mode select lever 118 is opposed to a cut portion 121 formed at one side of the eject lever 110 to permit rotation in the direction indicated by arrow $G_1$ in FIGS. 11 and 12 of the eject lever 110 so that the eject operation can be made.

It is to be noted that in the case where the eject operation lever 108 is caused to undergo pressing operation in the state where rotation of the eject lever 110 is limited, the torsional coil spring 109 is caused to undergo elastic (resilient) displacement to absorb pressing force to limit that large load applied to the eject lever 110.

In order to carry out opening operation of the cover body 5 which is in the position where the cassette loading portion 4 is closed (covered), when the eject operation lever 108 is caused to undergo pressing operation so that rotational operation in the direction indicated by arrow $G_1$ in FIGS. 11 and 12 of the eject lever 110 is carried out, the magnetic head 9 is withdrawn from the cassette loading portion 4 such that it is not in contact with the tape cassette 201 held by the cassette holder 8 before the cover body 5 starts pivoting in the opening direction. Namely, at the eject lever 110, there is provided an engagement pin 112 engaged with an engagement hole 113 provided at the back end side portion of the head positioning lever 117 as shown in FIGS. 8 and 9. When the eject lever 110 is rotated by the eject operation lever 108 through the torsional coil spring 109, it withdraws the head positioning lever 117 through the engagement pin 112 to release engagement with respect to the head supporting base 13 of the head positioning lever 117.

Figure 22:
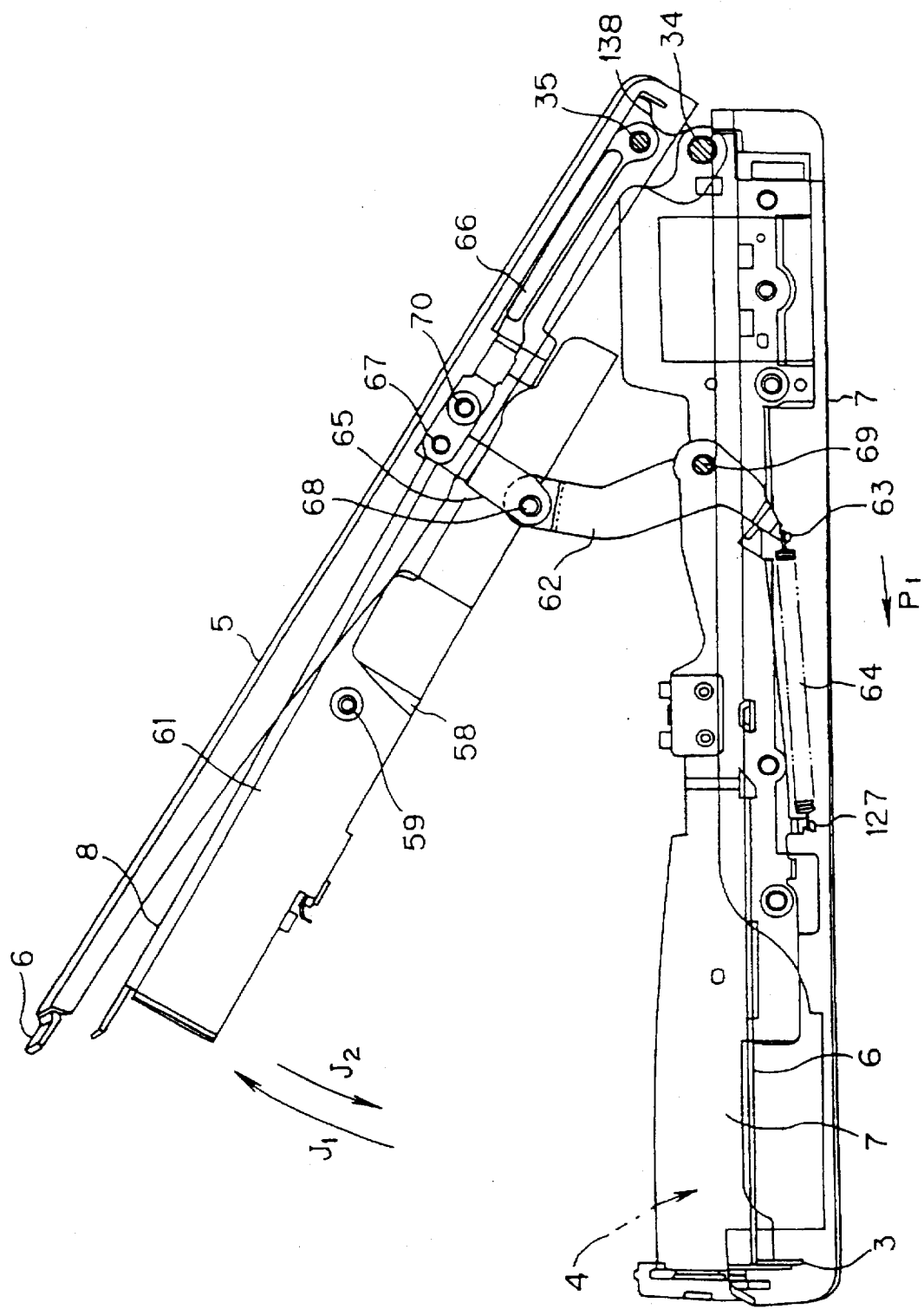
FIG. 22 is a side view showing the state where the cassette loading portion is opened.

The opening operation of the cover body 5 is carried out by the biasing force of a tension spring 64 and a spring 138 when the locked state of the lock lever 23 is released as shown in FIG. 22. Timing of the start of the opening operation of the cover body 5 and withdrawal to the withdrawal position from the cassette loading portion 4 of the magnetic head 9 are prescribed (limited) by the shape of the eject lever 110 and the positional relationship of the eject lever 10, the lock lever 23 and the operation mode select lever 118.

Figure 24:
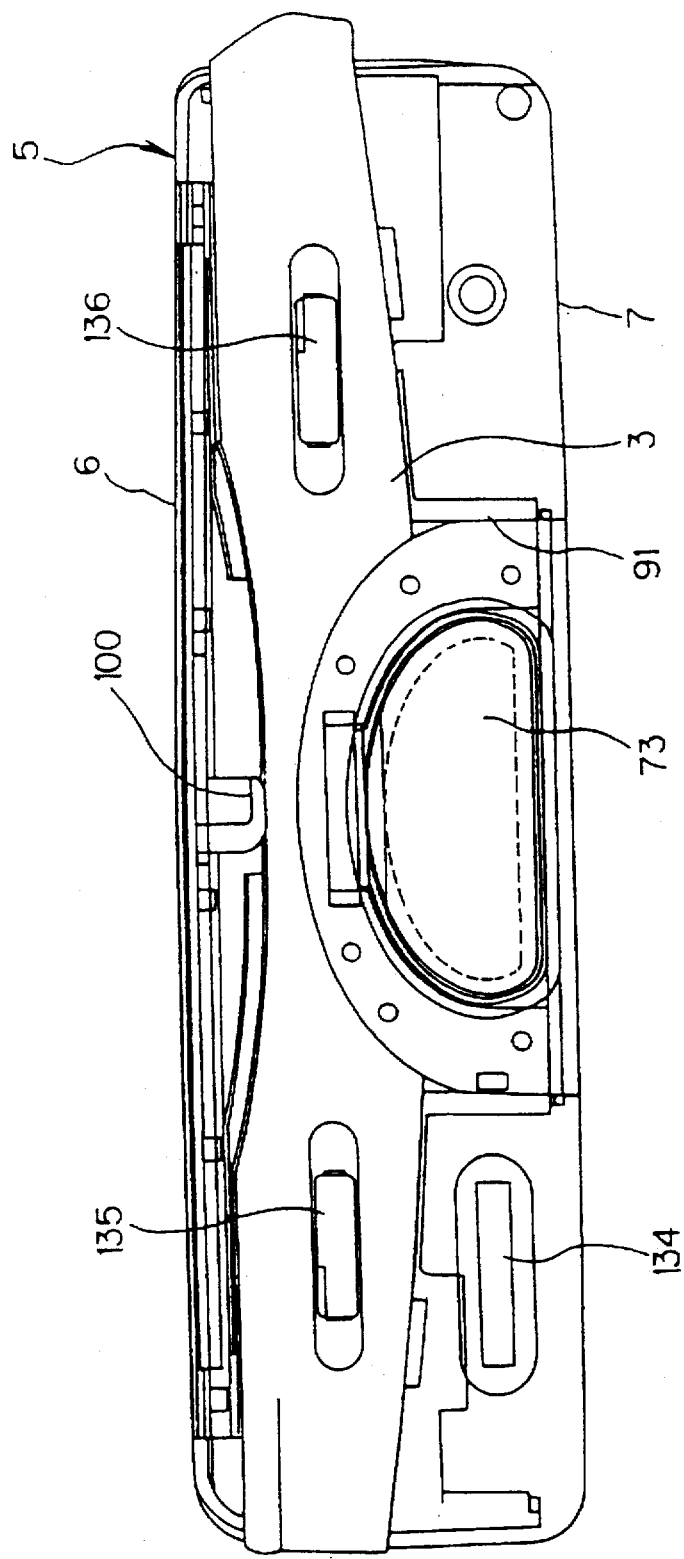
FIG. 24 is a front view showing the front face of the eject button for carrying out opening operation of the cover body.

In this example, the eject operation button 73 which operates the cover lock mechanism to carry out opening/closing operation of the cover body 5 is disposed at the front face which faces the short side opposite to the short side of the recorder body 1 which pivotably supports the cover body 5. In addition, at the front face of the recorder body 1 where the eject operation button 73 is disposed, there are disposed, as shown in FIG. 24, a forward and reverse select switch 135 for selecting (switching) traveling direction of the magnetic tape 206, a select switch 136 for the recording/reproducing system, and a volume 134 for adjustment of reproduction sound quantity.

[6] Cassette Holder

The cassette holder 8 constituting a cassette holding mechanism to allow the tape cassette 201 to undergo loading operation into the cassette loading portion 4 and to hold the tape cassette 201 within the cassette loading portion 4 will now be described.

Figure 28:
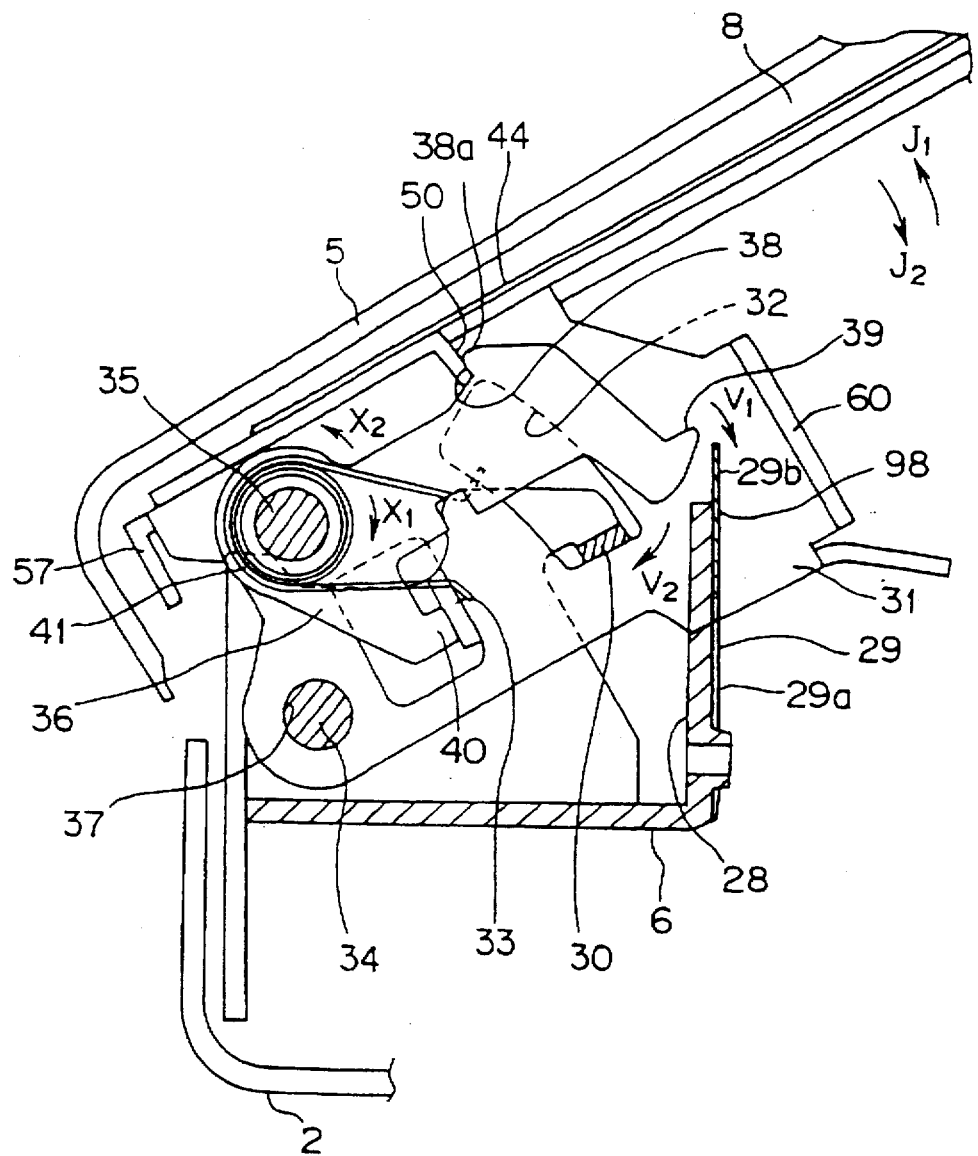
FIG. 28 is a side view showing the lock mechanism for locking the cassette eject lever.

The cassette holder 8 constituting the cassette holding mechanism is pivotably supported, as shown in FIGS. 6 and 20, and FIGS. 21 to 23, by a pair of supporting pieces 26 with the support shaft 34 being as the center of rotation by inserting a pair of left and right support shafts 34 provided on both sides of the base end into penetration holes 27 bored into a pair of left and right supporting pieces 26 formed at both sides of a short side of the side plate 7. At the supporting piece 26, as shown in FIG. 28, a limit piece 30 for limiting the pivoting range with the support shaft 34 of the cassette holder 8 being the center is projected. This limit piece 30 is engaged with a pivoting range limit groove 32 formed so as to have a circular arc shape, with the support shaft 34 being the center, at the base end of the cassette holder 8 to limit the pivoting range of the cassette holder 8.

This cassette holder 8 is formed rectangular in correspondence with the plane surface shape of tape cassette 201 inserted into the cassette holder 8. At the of a pair of long sides opposite to each other, first and second cassette holding portions 60, 61 bent so that they are L-shaped in cross section are respectively formed. The cassette holder 8 is pivotably attached to the recorder holder 1 by a projecting support shaft 34 at the side of one of a pair of opposing short sides; with the base end portion supporting the support shaft 34 by the supporting piece 26. At the other short side, or the front end of the cassette holder 8, a cassette insertion/withdrawal hole is constituted.

The tape cassette 201 is inserted into the cassette holder 8 or is withdrawn therefrom through the cassette insertion/withdrawal opening with one of the opposing short sides being the insertion end. The tape cassette 201 which has been inserted into the cassette holder 8 is held by first and second cassette holding portions 60, 61. At the internal side where the tape cassette 201 is inserted; the second cassette holding portion 61 for supporting the back side opposite to the front face where the magnetic head insertion hole 206 is located, which is at one of of a pair of opposing long sides of the tape cassette 201, a cassette holding body 58 is disposed. This cassette holding body 58 is formed by bending a thin metal plate to have a channel shape in cross section, and is formed to have a length sufficient to hold the tape cassette 201 over substantially the entire length of the insertion/withdrawal range of the tape cassette 201 with respect to the cassette holder 8. Moreover, the cassette holding body 58 can be fluctuated, as shown in FIG. 22, with the support shaft 59 being the center, with respect to the second cassette holding portion 61 by allowing the middle portion to be supported by the second cassette holding portion 61 through the support shaft 59. Since this cassette holding body 58 has a length extending over the insertion/withdrawal range of the tape cassette 201 with respect to the cassette holder 8, secure insertion/withdrawal operation with respect to the cassette holder 8 of the tape cassette 201 can be made. Further, the cassette holding body 58 is such that, in allowing the tape cassette 201 held by the cassette holder 8 to undergo loading operation into the cassette loading portion 4, the cassette holding body 58 is fluctuated with the support shaft 59 being the center to thereby control the attitude of the tape cassette 201 held by the cassette holder 8, thus allowing the positioning pins 15, 16 or the capstan shafts 17, 18, etc. to be securely inserted into the tape cassette 201.

The cover body 5 is pivoted by a pair of left and right support shafts 35 projected on both sides of the base end of the cassette holder 8, whereby it can be pivtoably attached to the cassette holder 8. It is to be noted that set screws 72 is screw-connected to the front end of the support shaft 35 so that prevention of slip-off from the support shaft 35 of the cover body 5 is realized. Moreover, at the side of a pair of opposing long sides of the cover body 5, there are provided engagement pawls engaged with the cassette holder 8 in order to permit pivoting of the cassette holder 8 following the pivoting operation when pivoting is carried out in a direction to open the cassette loading portion 4. In addition, the engagement pawl serves to limit the pivoting range with respect to the cassette holder 8 of the cover body 5. The pivoting range with respect to the cassette holder 8 of the cover body 5 is several degrees to 10 degrees.

Further, at the upper surface side of the cassette holder 8, first and second leaf springs 51, 52 are attached. At the first leaf spring 51, there is provided a cassette pressing piece 51a attached to the base end portion of the cassette holder 8 and projected inwardly of the cassette holder 8 through a through-hole 130 bored in the cassette holder 8. Moreover, at the second leaf spring 52, there is provided a cassette pressing piece 54 attached to the front end of the cassette holder 8 and projected inwardly of the cassette holder 8 through a though-hole 128 bored at the cassette holder 8. Respective cassette pressing pieces 51a, 54 of these first and second leaf springs 51, 52 allow the plane surface of the tape cassette 201 to undergo pressing supporting when the tape cassette 201 insertion-held by the cassette holder 8 is pivoted toward the cassette loading portion 4 along with the cassette holder 8, and is then loaded into the cassette loading portion 4. The tape cassette 201 is such that when it is subjected to pressing support by cassette pressing pieces 51a, 54, positioning is carried out such that the tape cassette 201 is in correspondence with the cassette loading portion 4. Thus, the state where the tape cassette 201 is loaded thereinto is maintained.

Moreover, at the second leaf spring 52, there is provided, in addition to the cassette pressing piece 54, a cover pressing piece 53 projected toward the cover body 5 disposed in such a manner to be overlaid on the cassette holder 8. This cover pressing piece 53 is such that when the cover body 5 is pivoted in a direction to open the cassette loading portion 4 by elastically biasing the cover body 5 with respect to the cassette holder 8, the cover pressing piece 53 allows the cassette holder 8 to have away from the cover body 5.

Further, the cover body 5 is attached to the recorder body 1 in the state where it is rotationally biased in a direction to open the cassette loading portion 4. At the inside surface of one of the long sides of the cover body 5, there is attached, as shown in FIG. 22, a fixed arm 66 of which a base end portion is pivoted by one support shaft 35 provided at the cassette holder 8 which pivotably supports the cover body 5.

At the front end portion of the fixed arm 66, the base end side of the connection arm 65 is pivotably supported through a support shaft 67. At the front end of the connection arm 65, one end of the rotational arm 62 is pivotably supported through a support shaft 68. This rotational arm 62 is such that the central portion thereof is rotatably supported at the side plate 7 through a support shaft 69, and a spring holding portion 63 is formed at the other end thereof. Between the spring holding portion 63 and a spring holding pawl formed at the side plate 7, a tension spring 64 is stretched. This tension spring 64 serves to rotationally bias the rotational arm 62 in a direction indicated by arrow $P_1$ in FIG. 22 where one end which is the supporting side to the connection arm 65 of the rotational arm 62 is away from the cassette loading portion 4 side, and to pivotably bias the cover body 5 in an opening direction which is the direction indicated by arrow $J_1$ in FIG. 22. In this example, the fixed arm 66 is fixed to the cover body 5 by screw 70.

Figure 2:
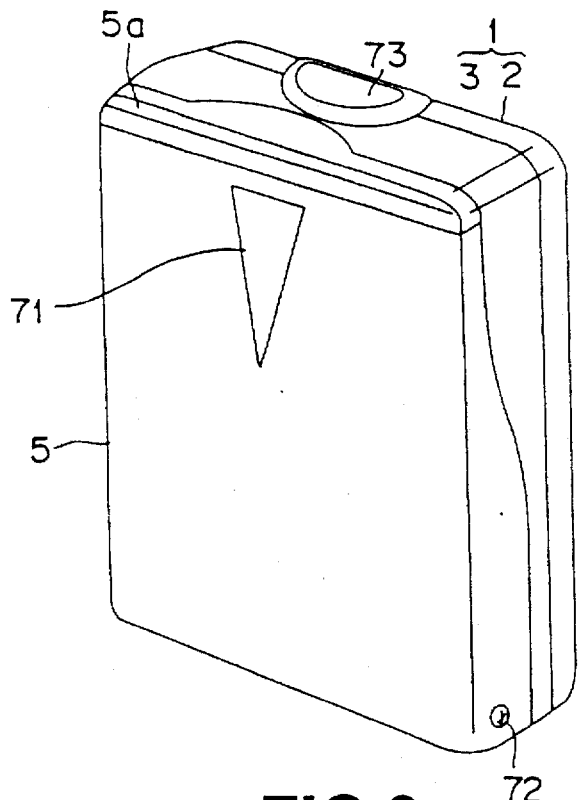
FIG. 2 is a perspective view of the tape recorder according to this invention from the side where the cover body is disposed.

Moreover, at the cover body 5, there is provided a window 71 for allowing a portion of the tape cassette 201 loaded into the cassette loading portion 4 to be externally visible external as shown in FIG. 2.

Further, at the chassis 6, there is attached a leaf spring 138 for pressing the side surface of the base end of the cover body 5 to bias the cover body 5 in the opening direction which is the direction indicated by arrow $J_1$ in FIG. 22. Since when the cover body 5 is pivoted open by a predetermined angle or more with respect to the chassis 6, the leaf spring 138 is caused to move away therefrom by the cover body 5, it pivotably biases the cover body 5 at the initial stage of opening operation of the cover body 5.

Figure 20:
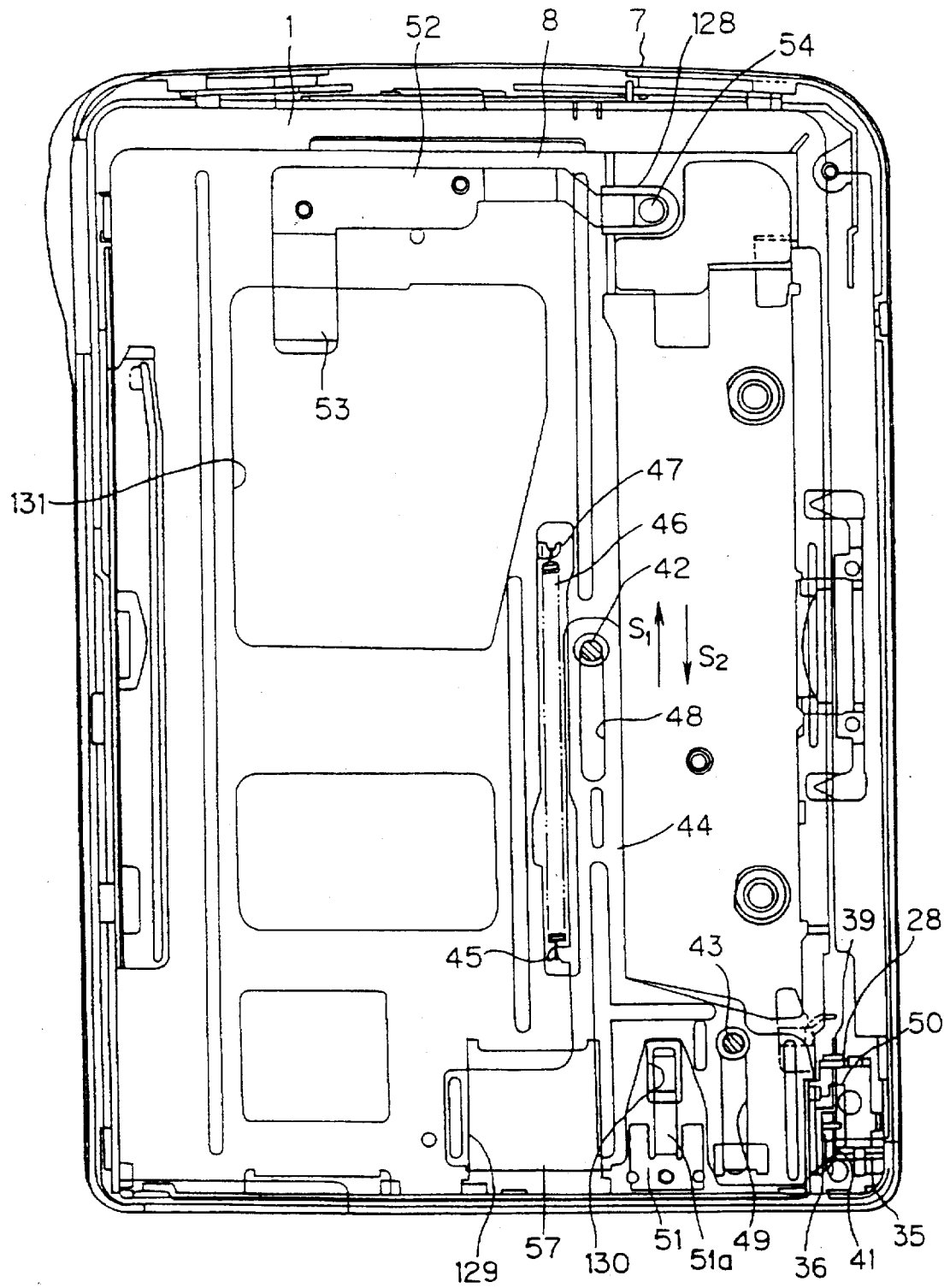
FIG. 20 is a plan view showing the cassette holder constituting the tape recorder of this embodiment.
Figure 21:
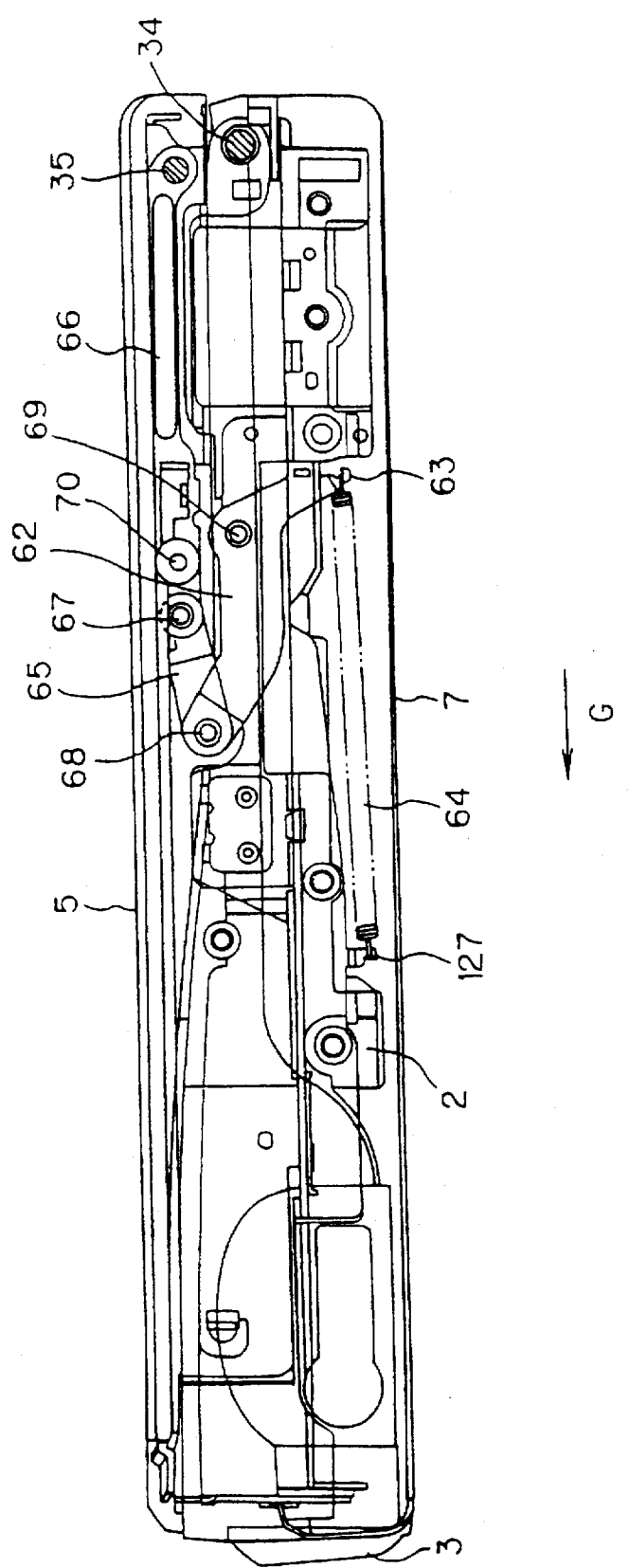
FIG. 21 is a side view showing the attachment state of the cover body and the cassette holder.

At the cassette holder 8, a cassette eject lever 44 is slidably attached. This cassette eject lever 44 is, as shown in FIGS. 6 and 20, formed so as to have a flat plate shape, and that slide guide grooves 48, 49 having a long direction in the slide direction are bored, thus, the cassette eject lever 44 is attached to the cassette holder 8 in the state where it is caused to be slidable in the direction indicated by arrow $S_1$ and in the direction indicated by arrow $S_2$ in FIG. 22 within the range of the slide guide grooves 48, 49 by inserting supporting pins 42, 43 vertically provided on the cassette holder 8 into these slide guide grooves 48, 49. At the base end portion of the cassette eject lever 44, there is formed a pressing operation piece 57 which is pressed by the tape cassette 201 inserted into the cassette holder 8 so that it serves as a movement portion which allows the cassette eject lever 201 to undergo movement operation, and allows the end surface of the insertion end with respect to the cassette holder 8 of the tape cassette 201 held by the cassette holder 8 to undergo pressing operation. This pressing operation piece 57 is faced to the bottom end portion of the cassette holder 8 and is bent toward the cassette loading portion 4. In addition, the cassette eject lever 44 is biased in the direction indicated by arrow $S_1$ in FIG. 20 which is the direction to eject the tape cassette 201 held by the cassette holder 8 from the cassette holder 8 by a tension spring 46 stretched between a spring holding piece 45 bent and formed in the middle portion thereof and a spring holding piece 47 provided on the cassette holder 8.

The cassette eject lever 44 is such that when the tape cassette 201 is caused to undergo inserting operation into the cassette holder 8, the pressing operation piece 57 is subjected to pressing operation by the end surface of the insertion and of the tape cassette 201, whereby the cassette eject lever 44 is moved in the direction indicated by arrow $S_2$ in FIG. 20 against the biasing force of the tension spring 46.

Moreover, the cassette eject lever 44 is such that when the cover body 5 is caused to undergo opening operation so that the cassette holder 8 is rotated in a direction to move away from the cassette loading portion 4, the cassette eject lever 44 is caused to undergo the biasing force of the tension spring 46 so that it is moved in the direction indicated by arrow $S_1$ in FIG. 20 to press the end surface of the insertion side of the tape cassette 201 by the pressing operation piece 57 to project the tape cassette 210 in a direction to eject it from the cassette holder 8.

In the vicinity of the support shaft 35 which rotatably supports the cover body 5, there is provided, as shown in FIG. 28, a lock mechanism such that when the tape cassette 201 is inserted into the cassette holder 8, the lock mechanism locks the cassette eject lever 44 at the position withdrawn from the cassette holder 8. Namely, the lock mechanism serves to hold the tape cassette 201 insertion-held by the cassette holder 8 against the biasing force of the tension spring 46 at the position where no pressing operation is carried out. This lock mechanism is provided with a lock lever 36 rotatably attached with the support shaft 35 for rotatably supporting the cover body 5, which is inserted into insertion hole 37 formed at the base end, being the center. This lock lever 36 is positioned at the internal surface side of the cover body 5 and the cassette holder 8, and is extended toward the internal of the cassette loading portion 4. The lock lever 36 is provided with a first holding portion 38 formed at the plane surface opposite to the internal surface side of the cover body 5 and a second holding portion 39 formed in such a manner that it is projected toward the above with respect to the chassis 6.

The lock lever 36 is rotationally biased in the direction indicated by arrow $J_2$ in FIG. 28 which is the opening direction of the cover body 5 by the torsional coil spring 41 wound on the support shaft 35. Namely, the first holding portion 38 is rotationally biased in a direction to move closer to the cassette eject lever 44 disposed at the cassette holder 8. Moreover, the lock lever 36 is such that contact portion 40 of one end is caused to come into contact with a rotation limit piece 33 formed at the side surface of the cassette holding portion 60 provided at the base end of the cassette holder 8 so that rotation biasing by the torsional coil spring 41 is limited.

The lock lever 36 is caused to undergo the biasing force of the torsional coil spring 41, whereby when it is located at the initial position shown in FIG. 28 where the contact portion 40 is caused to be in contact with the rotation limit piece 33, it allows the first holding portion 38 to hold the holding piece 50 provided at the cassette eject lever 44 to lock the cassette eject lever 44 at the position where the lever 44 is moved in the direction indicated by arrow $S_2$ in FIG. 20 against the biasing force of the tension spring 46. In this case, the holding piece 50 is formed at the front end of an extended piece extended toward one side of the base end of the cassette eject lever 44. When the cassette eject lever 44 is placed in the state where it is locked at the lock lever 36, the pressing operation piece 57 provided at the cassette eject lever 44 is located at the position where it is drawn from the cassette holder 8. In addition, the cassette eject lever 44 is such that when engagement of the holding piece 50 with respect to the first holding portion 38 is released, the cassette eject lever 44 is caused to undergo the biasing force of the tension spring 46 so that it is moved in the direction indicated by arrow S, in FIG. 20 to move the pressing operation piece 57 into the cassette holder 8.

Meanwhile, when the cover body 5 is located at the opening position shown in FIG. 28 where the cover body 5 has opened the cassette loading portion 4, the lock lever 36 is located at the initial position where the contact portion 40 is caused to be in contact with the rotation limit piece 33.

When the cover body 5 is located at the cover opening position to insert the tape cassette 201 into the cassette holder 8 which has been rotated to the position where the cassette insertion/withdrawal hole faces externally from the recorder body 1 to allow the pressing operation piece 57 to undergo pressing operation by the end surface of the insertion side of the tape cassette 201, the cassette eject lever 44 is moved in the direction indicated by arrow $S_2$ in FIG. 20 against the biasing force of the tension spring 46 to allow the holding piece 50 to press the front end portion 38a of the first holding portion 38 of the lock lever 36 to rotate the lock lever 36 in the direction indicated by arrow $X_1$ in FIG. 28 with the support shaft 35 being the center against the biasing force of the torsional coil spring 41. When the tape cassette 201 is further inserted inside the cassette holder 8 to further move the cassette eject lever 44 in the direction indicated by arrow $S_2$ in FIG. 20 against the biasing force of the tension spring 46, the holding piece 50 climbs over the front end portion 38a of the first holding portion 38. The lock lever 36 is caused to undergo the biasing force of the torsional coil spring 41 so that it is rotationally returned in the direction indicated by arrow $X_2$ in FIG. 28, thus allowing the holding piece 50 to be engaged with the first holding portion 38. When the engagement piece 50 is held by the first holding portion 38, the cassette eject lever 44 is locked at the position withdrawn from the cassette holder 8 causing the pressing operation piece 57 to be away from the insertion end surface of the tape cassette 201 which was insertion-held by the cassette holder 8.

Moreover, there is provided a rotation limit plate 29 formed by an elastically displaceable leaf spring for limiting rotation of the lock lever 36 in a manner to face the inside of rotation locus of the second holding portion 39 formed at the front end of the lock lever 36 when the lock lever 36 is rotated with the support shaft 35 being the center. This rotation limit plate 29 is formed L-shaped in a manner to project a rotation limit portion 29b from the front end portion of a vertical portion 29a toward the lateral direction thereof. The rotation limit plate 29 is attached in the state where the bottom end portion of the vertical portion 29a is fixed to a rising piece 28 formed by bending a portion of the chassis 6 in such a manner to face the rotation limit portion 29b to the inside of rotation locus of the second holding portion 39. Namely, the rotation limit plate 29 is caused to be elastically displaceable in the direction indicated by arrow $V_1$ in FIG. 28 with the base end portion of the vertical portion 29a fixed at the rising piece 28 being the center.

When the tape cassette 201 is insertion-held by the cassette holder 8 in a manner as described above thereafter to pivot the cover body 5 in the direction indicated by arrow $J_2$ in FIG. 28 where the cassette loading portion 4 is closed, the front end portion of the second holding portion 39 of the lock lever 36 comes into contact with the rotation limit portion 29b provided at the rotation limit plate 29. Further, when the cover body 5 is rotated in the direction indicated by arrow $J_2$ in FIG. 28, the rotation limit plate 29 is subjected to elastic displacement in the direction indicated by arrow $V_1$ in FIG. 28 while the lock lever 36 is pressed. When the cover body 5 is pivotted along with the cassette holder 8 to the position where the cassette loading portion 4 is closed, the rotation limit plate 29 of the lock lever 36 is released. Thus, the second holding portion 39 is projected toward the lower surface of the rotation limit portion 29b. When the rotation limit plate 29 of the lock lever 36 is released, the rotation limit plate 29 is elastically returned in the direction indicated by arrow $V_2$ in FIG. 28. Thus, the second holding portion 39 is engaged with the rotation limit portion 29b.

Moreover, the lock lever 36 is rotated in the direction indicated by arrow $X_1$ in FIG. 28 against the biasing force of the torsional coil spring 41 at the middle stage rotated in the direction indicated by arrow $J_1$ in FIG. 28 where the cover body 5 opens the cassette loading portion 4 to release the locked state of the cassette eject lever 44. Namely, when the cover body 5 is located at the position where it closes the cassette loading portion 4, the lock lever 36 is placed in the state where it allows the rotation limit plate 29 to hold the second holding portion 39. When the cover body 5 is rotated in the direction indicated by arrow $J_1$ in FIG. 28 where the cassette loading portion 4 is opened, the lock lever 36 is pivotted in the direction indicated by arrow $X_1$ in FIG. 28 against the biasing force of the torsional coil spring 41. When the cover body is further pivotted to the position where the tape cassette 201 held by the cassette holder 8 is withdrawn from the first and second capstan shafts 17, 18, the holding state with respect to the holding piece 50 of the cassette eject lever 44 by the first holding portion is released. When the locked state of the lock lever 36 of the cassette eject lever 44 is released, the cassette eject lever 44 is caused to undergo the biasing force of the tension spring 46 so that it moves in the direction indicated by arrow $S_1$ in FIG. 20 to carry out pressing operation by the pressing operation piece 57 in a direction to eject the tape cassette 201 from the cassette holder 8.

When the cover body 5 is further pivotted in a direction to open the cassette loading portion 4, engagement with the rotation limit portion 29b of the second holding portion 39 is released. As a result, the lock lever 36 is caused to undergo the biasing force of the torsional coil spring 41 so that it is rotated in the direction indicated by arrow $X_2$ in FIG. 28. Thus, the lock lever 36 is returned to the initial position. Namely, the lock lever 36 is further rotated in the direction indicated by arrow $X_1$ in FIG. 28 by further pivotting in the cover opening direction of the cover body 5, thus to release engagement with the rotation limit portion 29b of the second holding portion 39.

[7] Operation of the tape recorder

The operation in which the tape cassette 201 is loaded into the tape recorder of this embodiment constituted as described above to carry out recording and/or reproduction of information signals such as a music signal, for example, with respect to the magnetic tape 206 accommodated within the tape cassette 201 will now be described.

In order to load the tape cassette 201 into the cassette loading portion 4 constituted within the recorder body 1, the opening operation of the cover body 5 placed in the state where it closes the cassette loading portion 4 is carried out as shown in FIGS. 2, 4, 5 and 21. In order to open the cover body 5, the eject button 73 is caused to undergo pressing operation. When the eject button 73 is caused to undergo pressing operation, the eject operation lever 108 is moved in the direction indicated by arrow $F_1$ in FIG. 8. Thus, the eject lever 110 is rotationally operated in the direction indicated by arrow $G_1$ in FIG. 9. The lock lever 23 is moved in the direction indicated by arrow $H_1$ in FIG. 25 by rotational operation in the direction indicated by $G_1$ in FIG. 9 of the eject lever 110. As a result, the lock piece 24 is caused to be off from the engagement portion 100 of the cover body 5 to release the lock state of the cover body 5. When the lock state of the cover body 5 by the lock lever 23 is released, the leaf spring 138 presses the side surface of the base end side of the cover body 5. Thus, the cover body 5 is rotated in a direction to open the cassette loading portion 4 which is the direction indicated by arrow $J_1$ in FIG. 22 with the support shaft 35 being as the center. Simultaneously with the pressing operation by the leaf spring 138, the rotational arm 62 is caused to undergo the biasing force of the tension spring 63 so that it is rotated in the direction indicated by arrow $P_1$ in FIG. 22. When the rotational arm 62 is rotated, a connection arm 64 which has been moved in a collapsed (folded) manner with respect to the rotational arm 62 with the support shaft 68 being as the center is rotated with the support shaft 68 being as the center in a manner to extend with respect to the rotational arm 62. When the rotational arm 62 and the connection arm 64 which have been placed in collapsed (folded) state are rotated in such a manner that they both extend, the cover body 5 is pivotted up to the position where the cassette loading portion 4 is opened as shown in FIG. 22 with the support shaft 35 being the center.

When the cover body 5 is pivotted in a direction to open the cassette loading portion 4 which is the direction indicated by arrow $J_1$ in FIG. 22, the cassette holder 8 connected through the engagement pawl to the cover body 5 is also pivotted in the same direction. Namely, when the cover body 5 is pivotted in the direction indicated by arrow $J_1$ in FIG. 22, the cassette holder 8 is also pivotted in a direction to move away from the cassette loading portion 4 along with the cover body 5 with the support shaft 34 being the center. Thus, the cassette insertion/withdrawal opening of the front end where insertion/withdrawal of the tape cassette 210 is carried out faces externally from the recorder body 1.

In the state where the cover body 5 is opened so that the cassette insertion/withdrawal opening of the cassette holder 8 faces externally as described above, loading operation of the tape cassette 201 is carried out. The tape cassette 201 having the rectangular plane surface shape is inserted into the cassette holder 8 through the cassette insertion/withdrawal opening with one of a pair of opposing short sides being the insertion end. At this time, the tape cassette 201 is inserted into the cassette holder 8 in such a manner that the plane surface where the magnetic head insertion hole 207 is formed and a portion of the magnetic tape 206 faces externally is caused to be opposite the magnetic head 9 disposed within the recorder body 1.

When the tape cassette 201 is inserted into the cassette holder 8, the cassette eject lever 44 attached to the cassette holder 8 is subjected to pressing operation from the tape cassette 201, and is caused to undergo movement operation in the direction indicated by arrow $S_2$ in FIG. 20 inwardly of the cassette holder 8 against the biasing force of the tension spring 46. When the tape cassette 201 is inserted into the normal insertion position of the cassette holder 8, the cassette eject lever 44 holds the holding piece 50 by the first holding portion 38 of the lock lever 36. Thus, the cassette eject lever 44 is locked at the position where it is moved internal to the cassette holder 8 in the state where the tension spring 46 is expanded.

When the tape cassette 201 is inserted into the cassette holder 8 to allow the cassette holder 8 to hold it thereafter to pivot, along with the cassette holder 8, the cover body 5 in the direction indicated by arrow $J_2$ in FIG. 22 where the cassette loading portion 4 is closed, first and second capstan shafts 17, 18 are inserted into capstan insertion holes 213, 213 provided in the tape cassette 201 held by the cassette holder 8. Thus, respective reel drive shafts 19, 20 are engaged with reel hubs 202a, 203a of the tape reels 202, 203 through reverse shaft insertion holes 210, 211. Further, positioning pins 15, 16 are inserted through positioning holes 214, 214. In addition, when the cover body 5 is pivotted up to the position where the cassette loading portion 4 is closed, the tape cassette 201 which has been insertion-held by the cassette holder 8 is supported by positioning pins 15, 16 or height positioning pins provided at the cassette loading portion 4 side, whereby loading position into the cassette loading portion 4 is determined after undergoing positioning.

Moreover, when the cover body 5 is pivotted to the position where the cassette loading portion 4 is closed, the engagement portion 100 is engaged with the lock piece 24 of the lock lever 23, whereby the cover body 5 is locked at the position where the cassette loading portion 4 is closed. At this time, the tape cassette 201 which has been insertion-held by the cassette holder 8 is pressure-supported toward the chassis 6 by the cassette pressing pieces 51a, 52a of the first and second leaf springs 51, 52 provided at the cassette holder 8 so that it comes into pressure contact with the positioning pins 15, 16 and the height positioning pins. As a result, precise positioning is carried out. Thus, the state where the tape cassette 201 is loaded into the cassette loading portion 4 is maintained.

After the tape cassette 201 is loaded into the cassette loading portion 4 as described above, the pressing portion for selecting any one of various operation modes that this tape recorder has, which is constituted at the operation button 74 provided at the player body 1, is pushed down (depressed). When the pressing portion is caused to undergo pressing operation, the operation mode corresponding to the pressing portion which has been subjected to pressing operation is selected in this tape recorder. Namely, the tape recorder is set, in accordance with the pressing portion which has been subjected to pressing operation, to the recording and/or reproduction mode for information signals in the forward mode or in the reverse mode for traveling the magnetic tape 206 in the forward direction or in the reverse direction to carry out recording and/or reproduction of information signals, thus to carry out recording and/or reproduction of information signals with respect to the magnetic tape 206. Alternatively, the tape recorder is set to a music select mode for traveling the magnetic tape 206 at a high speed to detect a music information signal recorded on the magnetic tape 206, a fast feed mode for allowing the magnetic tape 206 to undergo high speed feed operation to the tape reel of the winding side, or a rewinding mode for allowing the magnetic tape 206 to undergo rewinding operation to the tape reel of the supply side to carry out the operation corresponding to each operation mode.

In this tape recorder, when there results the state where there is selected the recording and/or reproduction mode to travel the magnetic tape 206 at a constant velocity to permit recording and/or reproduction of information signals with respect to the magnetic tape 206, the operation mode select lever 118 is moved in the direction indicated by arrow $B_1$ or the direction indicated by arrow $B_2$ in FIG. 11 from the neutral position against the biasing force of the torsional coil spring 186, and the rotation limit piece 122 provided at the select lever 118 is caused to be in the state where it is opposite to one side of the eject lever 110 and operation of the eject lever 110 is prohibited. Accordingly, when there is the state where the recording and/or reproduction mode is selected, even if the eject button 73 is caused to undergo pressing operation, movement operation of the eject lever 110 is limited. Thus, the cover opening operation of the cover body 5 is prohibited. Because the cover opening operation of the cover body 5 is restricted, the cassette holder 8 maintains the state where it is pivotted toward the cassette loading portion 4 side to maintain the state where the tape cassette 201 is loaded into the cassette loading portion 4.

As stated above, since an approach is employed to prohibit the eject operation in the recording and/or reproducing mode placed in the state where the magnetic head 9 is advanced toward the cassette loading portion 4, and is admitted into the tape cassette 201 so that constant velocity traveling of the magnetic tape 206 is carried out, it is possible to realize secure protection of the mechanical portion constituting the recording/reproducing unit of this tape recorder, such as, for example, magnetic head 9 and pinch rollers 11, 12.

When an operation is conducted to carry out recording and/or reproduction of information signals such as music, for example, with respect to the magnetic tape 206 of the tape cassette 201 loaded into the cassette loading portion 4 thereafter to allow pressing portion corresponding to the stop mode constituted at the operation button 74 to undergo pressing operation to stop the tape recorder thereafter to allow the eject button 73 to undergo pressing operation, the cover opening operation of the cover body 5 and the operation caused to be moved from the cassette loading portion 4, that is, detachment operation of the cassette holder 8 are carried out.

Meanwhile, when the eject button 73 is caused to undergo pressing operation, the cassette holder 8 is pivotted with the support shaft 34 being the center in a direction to move away (remote) from the cassette loading portion 4 along with the cover body 5, first and second capstan shafts 17, 18 and positioning pins 15, 16 are caused to disengage from the tape cassette 201 held by the cassette holder 8, and the cassette insertion/withdrawal opening of the front end faces externally from the recorder body 1, the lock lever 36 is rotated in the direction indicated by arrow $X_2$ in FIG. 28 which is the direction opposite to the rotation direction of the cover body 5 with the support shaft 35 of the cover body 5 being the center against the biasing force of the torsional coil spring 36a. When the lock lever 36 is rotated in the direction opposite to the pivotting direction of the cover body 5, engagement with the first engagement portion 38 provided at the lock lever 36 of the holding piece 50 provided at the cassette eject lever 44 is released. Thus, the locked state of the cassette eject lever 44 is released. When the locked state of the cassette eject lever 44 by the lock lever 36 is released, the cassette eject lever 44 is caused to undergo the biasing force of the tension spring 46 so that it moves in the direction indicated by arrow $S_1$ in FIG. 20 to press the end surface of the insertion side of the tape cassette 201 by the pressing operation piece 57 to project the tape cassette 210 in a direction to eject it from the cassette holder 8. At this time, the tape cassette 201 is placed in the state where the other short side 209a side opposite to the short side 209c of the insertion side is projected from the cassette holder 8. Accordingly, the portion projected from the cassette holder 8 is grasped, thereby making it possible to easily carry out removal operation of the tape cassette 201.

While explanation has been given by making an example of the tape recorder using the so called Phillips type tape cassette as a recording medium, this invention can be applied to a recording and/or reproducing apparatus using, as a recording medium, a tape cassette has a rectangular plane shape within which a magnetic tape or any other tape-shaped recording medium is accommodated.

Further, tape recorders to which this invention is applied are not only tape recorders which permit both recording and reproduction of information signals, but also tape recorders for carrying out only reproduction of information signals recorded on the tape-shaped recording medium. In addition, this invention can be applied to tape recorders including a radio receiver therein as well.

Industrial Applicability

The recording and/or reproducing apparatus according to this invention is provided with cassette holding mechanism like a cassette holder adapted so that a tape cassette having a rectangular plane surface shape is inserted thereinto with one of a pair of opposing short sides being the front end in the insertion direction thereof, wherein the cassette holding mechanism is disposed with the short side of the body being as the supporting end, and is pivotably supported by the body between a position where the inserted tape cassette is loaded into the recording and/or reproducing unit and a position where the tape cassette inserted into the cassette holding mechanism is caused to be away or detached from the recording and/or reproducing unit. Accordingly, this eliminates the problems that the recording and/or reproducing apparatuses adapted for carrying out insertion/withdrawal of the tape cassette in the laterally disposed position so that the end in the length direction is caused to serve as the insertion end, thus making it possible to easily carry out insertion/withdrawal of the tape cassette.

Moreover, the recording and/or reproducing apparatus according to this invention is adapted so that when the cassette holding mechanism moves from the position where it is loaded into the recording and/or reproducing unit to the position where it is caused to be away or detached therefrom, the head is caused to be moved to the position away from the loading position of the tape cassette, thus making it possible to realize secure protection of the head and/or other mechanism portions and the tape cassette.

Further, the recording and/or reproducing apparatus according to this invention is adapted to carry out movement operation of the head after the tape cassette is loaded into the cassette loading portion, or after the tape cassette is caused to be away or detached from the cassette loading portion to thereby realize protection of the tape-shaped recording medium such as magnetic tape, for example, accommodated within the tape cassette and the head constituting the recording and/or reproducing means.

In addition, when the recording and/or reproducing unit is in the state where it permits recording and/or reproduction of information signals with respect to the tape-shaped recording medium within the tape cassette, the locked state of the cover body is maintained by the lock mechanism. Accordingly, this securely prevents the tape cassette from being ejected in the middle of recording and/or reproduction by erroneous operation, thus making it possible to securely protect the mechanical portions such as the heat or tape traveling mechanism, etc.

What is claimed is:

1. A recording and/or reproducing apparatus comprising:
   a body adapted for receiving a tape cassette therein, wherein
   the body is shaped as a thin rectangular box having a rectangular surface with a long dimension, a short dimension, and a depth, and
   the body has a closed state and an opened state for loading and unloading the tape cassette, and
   the tape cassette has long sides, short sides, and a thickness;
   a cover pivotably attached to the body, the cover having a first position corresponding to the closed state of body and a second position in which the cover is pivotted away from the body corresponding to the opened state of the body, the cover having a pivot axis that is parallel with the short dimension of the body;
   recording and/or reproducing means provided in the body for recording and/or reproducing information signals to/from a tape-shaped recording medium contained within the tape cassette, the recording and/or reproducing means being movable from an operating position when the body is in the closed state and a loading position when the body is in the opened state; and
   cassette holding means disposed within the body for holding the tape cassette such that when the tape cassette is inserted into the cassette holding means of the body the short sides of the tape cassette are parallel with the short dimension of the body and one of the short sides of the tape cassette enters the cassette holding means of the body before other parts of the tape cassette enter the cassette holding means of the body, the cassette holding means being attached to the cover such that the cassette holding means pivots along with the cover, wherein
   the cassette holding means is pivotted between a position in which the tape cassette inserted into the cassette holding means is operatively engaged with the recording and/or reproducing means and a position in which the tape cassette inserted into the cassette holding means is moved away or detached from the recording and/or reproducing means, wherein
   the recording and/or reproducing means includes a head for recording and/or reproducing information signals to/from the tape-shaped recording medium, the head disposed for movement between an operating position in which the head is operatively engaged with the tape cassette and a detached position in which the head is disengaged from the tape cassette, and
   the apparatus further comprises moving means for moving the head between the operating position and the detached position.

2. A recording and/or reproducing apparatus as set forth in claim 1, wherein the cassette holding means includes a holder having a first holding position and provided with a first holding portion for holding one of the long sides of the tape cassette and a second holding portion for holding another of the long sides of the tape cassette when loading of the tape cassette has been completed and the body is in the closed state.

3. A recording and/or reproducing apparatus as set forth in claim 2, wherein the apparatus further comprises lock means for locking the cover in the closed state.

4. A recording and/or reproducing apparatus as set forth in claim 3, wherein the apparatus further comprises preventing means for preventing the cover from unlocking when the recording and/or reproducing means is recording or reproducing.

5. A recording and/or reproducing apparatus as set forth in claim 1, wherein
   the cassette holding means includes cassette moving operation means for moving the tape cassette to an eject position when the cassette holding means is moved to a detachment position and the cover is pivotted to the second position in which the body is in the opened state.

6. A recording and/or reproducing apparatus as set forth in claim 5, wherein the cassette moving operation means includes
   a movement portion provided at the cassette holding means for causing the cassette holding means to undergo movement when the tape cassette is inserted into the cassette holding means, biasing means for biasing the movement portion in a direction to eject the tape cassette inserted into the cassette holding means, and a lock portion for locking the movement portion after insertion of the tape cassette into the cassette holding means is completed, wherein the lock portion unlocks the movement portion when the cassette holding means is moved to the loading position.

7. A recording and/or reproducing apparatus comprising:

a body adapted for receiving a tape cassette therein, wherein the body is shaped as a thin rectangular box having a rectangular surface with a long dimension, a short dimension, and a depth, and the body has a closed state and an opened state for loading and unloading the tape cassette, and the tape cassette has long sides, short sides, and a thickness;

a cover pivotably attached to the body, the cover having a first position corresponding to the closed state of body and a second position in which the cover is pivotted away from the body corresponding to the opened state of the body, the cover having a pivot axis that is parallel with the short dimension of the body;

recording and/or reproducing means provided in the body for recording and/or reproducing information signals to/from a tape-shaped recording medium contained within the tape cassette, the recording and/or reproducing means being movable from an operating position when the body is in the closed state and a loading position when the body is in the opened state; and cassette holding means disposed within the body for holding the tape cassette such that when the tape cassette is inserted into the cassette holding means of the body the short sides of the tape cassette are parallel with the short dimension of the body and one of the short sides of the tape cassette enters the cassette holding means of the body before other parts of the tape cassette enter the cassette holding means of the body, the cassette holding means being attached to the cover such that the cassette holding means pivots along with the cover, wherein the cassette holding means is pivotted between a position in which the tape cassette inserted into the cassette holding means is operatively engaged with the recording and/or reproducing means and a position in which the tape cassette inserted into the cassette holding means is moved away or detached from the recording and/or reproducing means, wherein the cassette holding means includes a holder having a first holding position and provided with a first holding portion for holding one of the long sides of the tape cassette and a second holding portion for holding another of the long sides of the tape cassette when loading of the tape cassette has been completed and the body is in the closed state, and wherein the recording and/or reproducing means includes a head for recording and/or reproducing information signals to/from the tape-shaped recording medium, the head disposed for movement between an operating position in which the head is operatively engaged with the tape cassette and a detached position in which the head is disengaged from the tape cassette, and the apparatus further comprises moving means for moving the head between the operating position and the detached position.

8. A recording and/or reproducing apparatus as set forth in claim 7, wherein the apparatus further comprises operation means for allowing the cover to undergo movement operation to the opened state of the cover and for causing the moving means to move the head from the operating position to the detached position.

9. A recording and/or reproducing apparatus comprising:

a body adapted for receiving a tape cassette therein, wherein the body is shaped as a thin rectangular box having a rectangular surface with a long dimension, a short dimension, and a depth, and the body has a closed state and an opened state for loading and unloading the tape cassette, and the tape cassette has long sides, short sides, and a thickness;

a cover pivotably attached to the body, the cover having a first position corresponding to the closed state of body and a second position in which the cover is pivotted away from the body corresponding to the opened state of the body, the cover having a pivot axis that is parallel with the short dimension of the body;

recording and/or reproducing means provided in the body for recording and/or reproducing information signals to/from a tape-shaped recording medium contained within the tape cassette, the recording and/or reproducing means being movable from an operating position when the body is in the closed state and a loading position when the body is in the opened state; and cassette holding means disposed within the body for holding the tape cassette such that when the tape cassette is inserted into the cassette holding means of the body the short sides of the tape cassette are parallel with the short dimension of the body and one of the short sides of the tape cassette enters the cassette holding means of the body before other parts of the tape cassette enter the cassette holding means of the body, the cassette holding means being attached to the cover such that the cassette holding means pivots along with the cover, wherein the cassette holding means is pivotted between a position in which the tape cassette inserted into the cassette holding means is operatively engaged with the recording and/or reproducing means and a position in which the tape cassette inserted into the cassette holding means is moved away or detached from the recording and/or reproducing means, wherein the cassette holding means includes a holder having a first holding position and provided with a first holding portion for holding one of the long sides of the tape cassette and a second holding portion for holding another of the long sides of the tape cassette when loading of the tape cassette has been completed and the body is in the closed state, wherein the apparatus further comprises lock means for locking the cover in the closed state, and wherein the recording and/or reproducing means includes a head for recording and/or reproducing information signals to/from the tape-shaped recording medium, the head disposed for movement between an operating position in which the head is operatively engaged with the tape cassette and a detached position in which the head is disengaged from the tape cassette, and the apparatus further comprises moving means for moving the head to the detached position by locking the cover from a locked state.

10. A recording and/or reproducing apparatus comprising:

a body adapted surface to receive a tape cassette containing a tape-shaped recording medium therein, wherein the body is shaped as a thin rectangular box having a rectangular principal surface with a long dimension, a short dimension, and a depth, the body has a closed state and an opened state for loading and unloading the tape cassette, and the tape cassette has long sides, short sides, a thickness, and a pair of reels on which the tape-shaped recording medium is wound;

a cover pivotably attached to the body, the cover having a first position corresponding to when the body is in the closed state and a second position in which the cover is pivotted away from the body corresponding to when the body is in the opened state, the cover having a pivot axis that is parallel with the short dimension of the body;

recording and/or reproducing means provided in the body and having a pair of reel drive shafts for engaging the pair of reels of the tape cassette, the recording and/or reproducing means adapted for recording and/or reproducing information signals to/from the tape-shaped recording medium within the tape cassette, the pair of reel drive shafts projecting from the principal surface of the body; and a cassette holder disposed within the body and into which the tape cassette is inserted, the tape cassette being inserted into the cassette holder with the short sides of the tape cassette being parallel with the short dimension of the body such that one of the short sides of the tape cassette enters the cassette holder first before other parts of the tape cassette enter the cassette holder, the cassette holder being attached to the cover such that the cassette holder pivots along with the cover, wherein the cassette holder pivots between a first position in which the pair of reels of the tape cassette is respectively engaged with the pair of reel drive shafts and a second position in which the pair of reels of the tape cassette is respectively disengaged with the pair of reel drive shafts, wherein when the cassette holder is in the first position the cover covers the principal surface of the body and the body is in the closed state, wherein the apparatus further comprises biasing means for biasing the tape cassette held by the cassette holder toward the recording and/or reproducing means, the biasing means being provided at a back side of the cover and adapted to bias the tape cassette held by the cassette holder such that an opening formed in the cassette holder and exposing a portion of the tape-shaped recording medium faces the recording and/or reproducing means, and wherein the recording and/or reproducing means includes a head for recording and/or reproducing information signals to/from the tape-shaped recording medium, the head being disposed for movement between an operating position in which the head is operatively engaged with the tape cassette and a detached position in which the head is disengaged from the tape cassette, and the apparatus further comprises moving means for moving the head to the detached position by unlocking the cover from a locked state.

11. A recording and/or reproducing apparatus as set forth in claim 10, wherein the apparatus further comprises an opening/closing mechanism attached to the cover for opening and closing the cover, the cover being attached to a hinged portion of the opening/closing mechanism and to the cassette holder.

12. A recording and/or reproducing apparatus as set forth in claim 10, wherein the apparatus further comprises lock means for locking the cover in the first position with the body in the closed state.

13. A recording and/or reproducing apparatus as set forth in claim 12, wherein the apparatus further comprises preventing means for preventing the the cover from unlocking when the recording and/or reproducing means is recording or reproducing.

14. A recording and/or reproducing apparatus as set forth in claim 10, wherein the cassette holder includes cassette movement operation means for moving the tape cassette to an eject position when the cassette holder is moved to the second position.

15. A recording and/or reproducing apparatus as set forth in claim 14, wherein the cassette movement operation means includes a movement portion provided at the cassette holding means for causing the cassette holding means to undergo movement when the tape cassette is inserted into the cassette holder, biasing means for biasing the movement portion in a direction to eject the tape cassette inserted into the cassette holder; and a lock portion for locking the movement portion when insertion of the tape cassette into the cassette holder is completed, wherein the lock portion unlocks the movement portion when the cassette holder is moved to the second position.

16. A recording and/or reproducing apparatus for use with a tape cassette having a rectangular shape and containing a tape-shaped recording medium therein, the tape cassette having a pair of reels on which the tape-shaped recording medium is wound, and being provided at a side surface thereof with an opening portion exposing a portion of the tape-shaped recording medium wound between the pair of reels, the apparatus comprising:

a body adapted to receive the tape cassette therein, the body being shaped as a thin rectangular box and having a principal surface with long and short dimensions substantially similar to long and short sides of the tape cassette;

a cover pivotably attached to the body, the cover having a first position corresponding to when the body is in a closed state and a second position in which the cover is pivotted away from the body corresponding to when the body is in an opened state, the cover having a pivot axis that is parallel with the short dimension of the body;

recording and/or reproducing means including a pair of reel drive shafts for engaging the pair of reels of the tape cassette, the reel drive shafts projecting from the principal surface of the body, and a magnetic head disposed along the long dimension of the body and engaging the tape cassette through the opening portion of the tape cassette; and a cassette holder for holding the tape cassette within the body the tape cassette being inserted into the cassette holder with the short sides of the tape cassette being parallel with the short dimension of the body such that one of the short sides of the tape cassette enters the cassette holder first before other parts of the tape cassette enter the cassette holder, the cassette holder being attached to the cover such that the cassette holder pivots along with the cover, wherein the cassette holder is adapted to allow the pair of reels of the tape cassette to engage with the pair of reel drive shafts, the cassette holder pivoting between a first position in which the magnetic head is engaged with the tape-shaped recording medium through the opening portion of the tape cassette and the pair of reel drive shafts is engaged with the pair of reels of the tape cassette and a second position in which the pair of reel drive shafts is disengaged from the pair of reels of the tape cassette, wherein the apparatus further comprises moving means for moving the magnetic head from a position in which the magnetic head is engaged with the tape-shaped recording medium to a position in which the magnetic head is disengaged from the tape-shaped recording medium when the cassette holder and the cover body are moved from the position with the body in the closed state to the second position with the body in the opened state.

17. A recording and/or reproducing apparatus as set forth in claim 16, wherein
the apparatus further comprises operation means for allowing the cover to undergo movement between the first and second positions, and
the operation means causes the moving means to move the magnetic head from the position in which the magnetic head is engaged with the tape-shaped recording medium to the position in which the magnetic head is disengaged from the tape-shaped recording medium.

18. A recording and/or reproducing means as set forth in claim 16, wherein the apparatus further includes lock means for locking the cover in the first position with the body in the closed state.

19. A recording and/or reproducing apparatus as set forth in claim 18, wherein the apparatus further includes preventing means for preventing unlocking of the cover when the recording and/or reproducing means is recording or reproducing.

20. A recording and/or reproducing apparatus as set forth in claim 16, wherein the cassette holder is provided with a first holding portion for holding a long side of the tape cassette, and a second holding portion for holding another long side of the tape cassette when loading of the tape cassette into the body is completed.

21. A recording and/or reproducing apparatus for use with a tape cassette having a rectangular shape and containing a tape-shaped recording medium therein, the tape cassette having a pair of reels on which the tape-shaped recording medium is wound, and being provided at a side surface thereof with an opening portion exposing a portion of the tape-shaped recording medium wound between the pair of reels, the apparatus comprising:
a body adapted to receive the tape cassette therein, the body being shaped as a thin rectangular box and having a principal surface with long and short dimensions substantially similar to long and short sides of the tape cassette;
a cover pivotably attached to the body, the cover having a first position corresponding to when the body is in a closed state and a second position in which the cover is pivotted away from the body corresponding to when the body is in an opened state, the cover having a pivot axis that is parallel with the short dimension of the body;

recording and/or reproducing means including a pair of reel drive shafts for engaging the pair of reels of the tape cassette, the reel drive shafts projecting from the principal surface of the body, and a magnetic head disposed along the long dimension of the body and engaging the tape cassette through the opening portion of the tape cassette; and a cassette holder for holding the tape cassette within the body the tape cassette being inserted into the cassette holder with the short sides of the tape cassette being parallel with the short dimension of the body such that one of the short sides of the tape cassette enters the cassette holder first before other parts of the tape cassette enter the cassette holder, the cassette holder being attached to the cover such that the cassette holder pivots along with the cover, wherein the cassette holder is adapted to allow the pair of reels of the tape cassette to engage with the pair of reel drive shafts, the cassette holder pivoting between a first position in which the magnetic head is engaged with the tape-shaped recording medium through the opening portion of the tape cassette and the pair of reel drive shafts is engaged with the pair of reels of the tape cassette and a second position in which the pair of reel drive shafts is disengaged from the pair of reels of the tape cassette, wherein the apparatus further includes lock means for locking the cover in the first position with the body in the closed state, and wherein the recording and/or reproducing means further includes moving means for moving the magnetic head when the lock means is released and the cover is unlocked from the first position so that the magnetic head disengages from the tape-shaped recording medium.

22. A recording and/or reproducing apparatus comprising:
a body having a planar surface with a rectangular shape and long and short dimensions, the body adapted to house a tape cassette containing a tape-shaped recording medium, the tape cassette having long and short sides;
recording and/or reproducing means provided in the body for recording and/or reproducing information signals on the tape-shaped recording medium within the tape cassette;
a cover pivotably attached to the body, the cover having a first position corresponding to when the body is in a closed state and the recording and/or reproducing means is covered and a second position in which the cover is pivotted away from the body corresponding to when the body is in an opened state when the recording and/or reproducing means is uncovered, the cover having a pivot axis that is parallel with the short dimension of the body;
cassette holding means for holding the tape cassette such that a short side of the tape cassette serves as the front end and is inserted into the cassette holding means first before other parts of the tape cassette, the cassette holding means having an operating position when the tape cassette is loaded into the cassette holding means and a detached position; and
lock means provided with a pressing operation portion disposed at a side of the body to lock the cover in the first position with the body in the closed state and to unlock the cover by pressing the pressing operation portion, wherein the recording and/or reproducing means is provided with a head for recording and/or reproducing information signals on the tape-shaped recording medium of the tape cassette, the head having a first position in which the head is engaged with the tape-shaped recording medium and a second position in which the head is detached from the tape-shaped recording medium, and wherein the recording and/or reproducing means further includes moving means for moving the head between the first and second positions when the cover is unlocked.

23. A recording and/or reproducing apparatus as set forth in claim 22, wherein the recording and/or reproducing means is provided with preventing means for preventing pressing of the pressing operation portion of the lock means when the recording and/or reproducing means is recording or reproducing.

* * * * *